(12) United States Patent
Cappel et al.

(10) Patent No.: US 8,577,773 B2
(45) Date of Patent: Nov. 5, 2013

(54) DOCUMENT PROCESSING SYSTEMS AND METHODS FOR REGULATORY CERTIFICATIONS

(75) Inventors: Benjamin R. Cappel, Jersey City, NJ (US); Robert C. Apfel, Brooklyn, NY (US)

(73) Assignee: Acupay System LLC, New York, NY (US)

( * ) Notice: Subject to any disclaimer, the term of this patent is extended or adjusted under 35 U.S.C. 154(b) by 1184 days.

(21) Appl. No.: 11/906,732

(22) Filed: Oct. 2, 2007

(65) Prior Publication Data

US 2008/0133295 A1 Jun. 5, 2008

Related U.S. Application Data

(60) Provisional application No. 60/872,543, filed on Dec. 1, 2006, provisional application No. 60/873,415, filed on Dec. 6, 2006.

(51) Int. Cl.
*G06Q 20/00* (2012.01)
*G06Q 40/00* (2012.01)

(52) U.S. Cl.
USPC .............................. 705/36 T; 705/19; 705/31

(58) Field of Classification Search
USPC ........................................................ 715/200
See application file for complete search history.

(56) References Cited

U.S. PATENT DOCUMENTS

| | | | |
|---|---|---|---|
| 6,243,480 B1 * | 6/2001 | Zhao et al. ..................... | 382/100 |
| 2001/0037297 A1 * | 11/2001 | McNair ........................... | 705/40 |
| 2002/0032642 A1 * | 3/2002 | Chichilnisky ................. | 705/37 |
| 2002/0046144 A1 * | 4/2002 | Graff .............................. | 705/36 |
| 2002/0080995 A1 * | 6/2002 | Rhoads ........................ | 382/100 |
| 2003/0055754 A1 | 3/2003 | Sullivan | |
| 2004/0049463 A1 * | 3/2004 | Kwon ............................. | 705/50 |
| 2004/0100363 A1 | 5/2004 | Lane et al. | |
| 2005/0038754 A1 | 2/2005 | Geist et al. | |
| 2005/0066172 A1 | 3/2005 | Vorbruggen et al. | |
| 2006/0282356 A1 * | 12/2006 | Andres et al. .................. | 705/35 |

OTHER PUBLICATIONS

Depository Trust Company notification, Santander US Debt, S.A. Unipersonal, CUSIPs: 802815AB6 and 802815AA8, Record Date: Dec. 6, 2005, Payment Date: Dec. 21, 2005, Notification Date: Nov. 16, 2005.

* cited by examiner

*Primary Examiner* — Nathan Hillery
(74) *Attorney, Agent, or Firm* — Lipsitz & McAllister, LLC

(57) ABSTRACT

A processing system is provided for regulatory or tax status certification of investors. Certificates are generated and synchronized with data. The certificates are indicative of entitlements to own or receive income on securities in accord with various governmental, tax or contractually determined constraints. Interest or dividend income can be paid to eligible investors free (or at reduced rates) of withholding tax once a valid certificate is obtained. Certificates can also be provided to permit a certified entity to purchase investments that are otherwise restricted from sale. Investors or investor banking representatives can introduce investor details into the system for use in generating certificates. Such certificates are sent out for execution (e.g., signature), and electronically transmitted back into the system. Tracking elements are provided to allow the certificates to be automatically matched to electronically stored investor data, thus forming the basis of an executed certification.

19 Claims, 20 Drawing Sheets

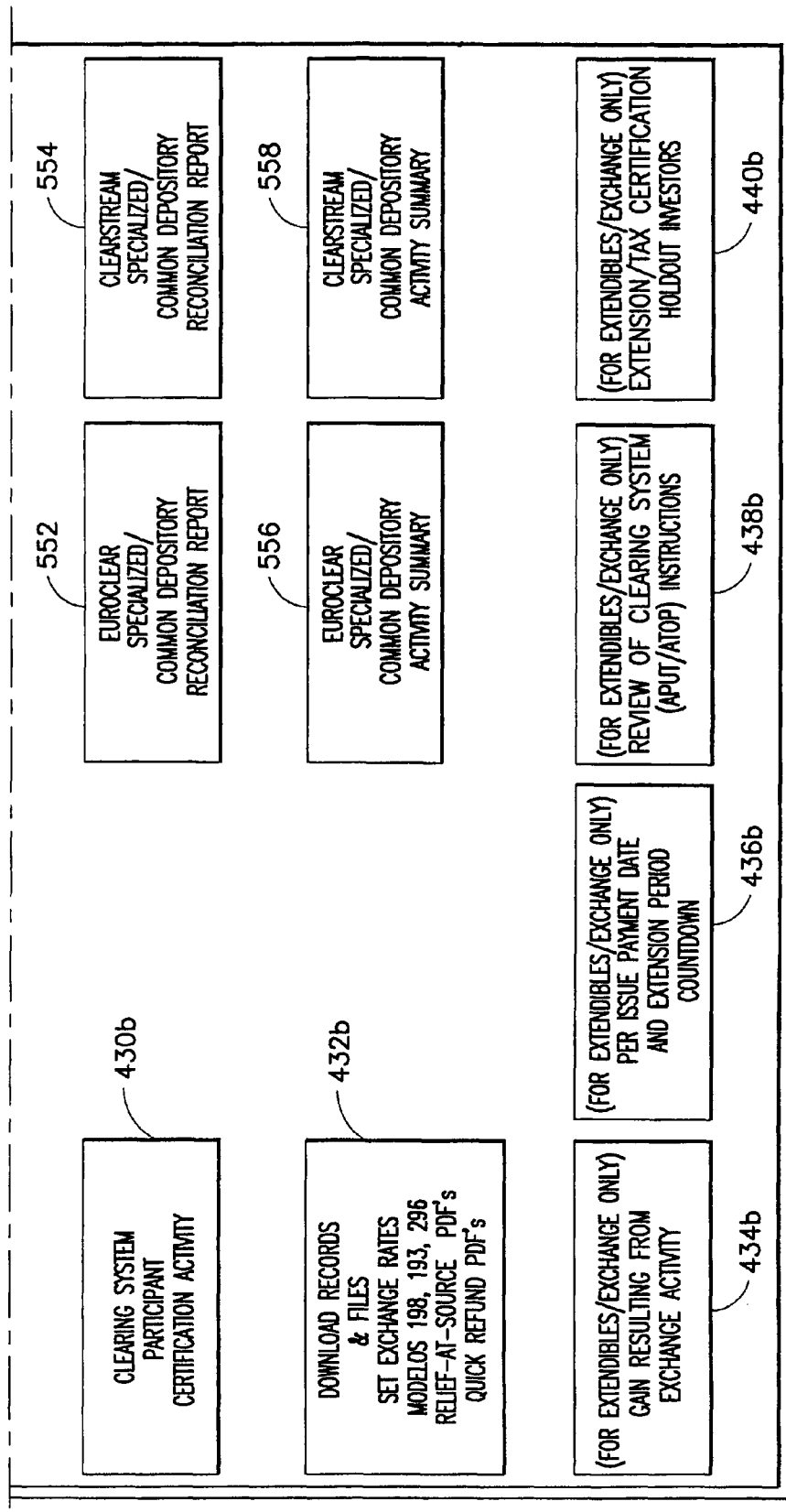

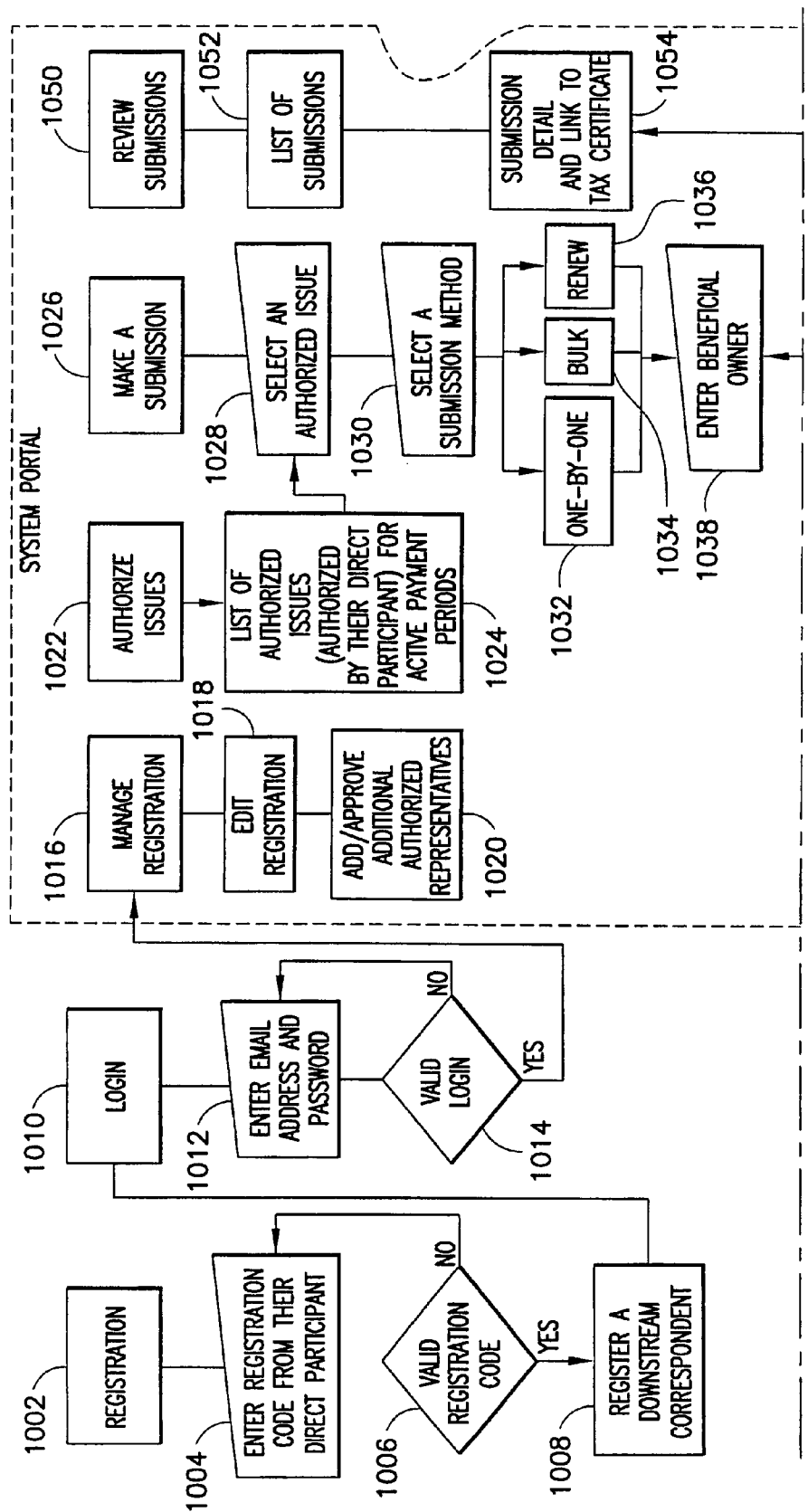

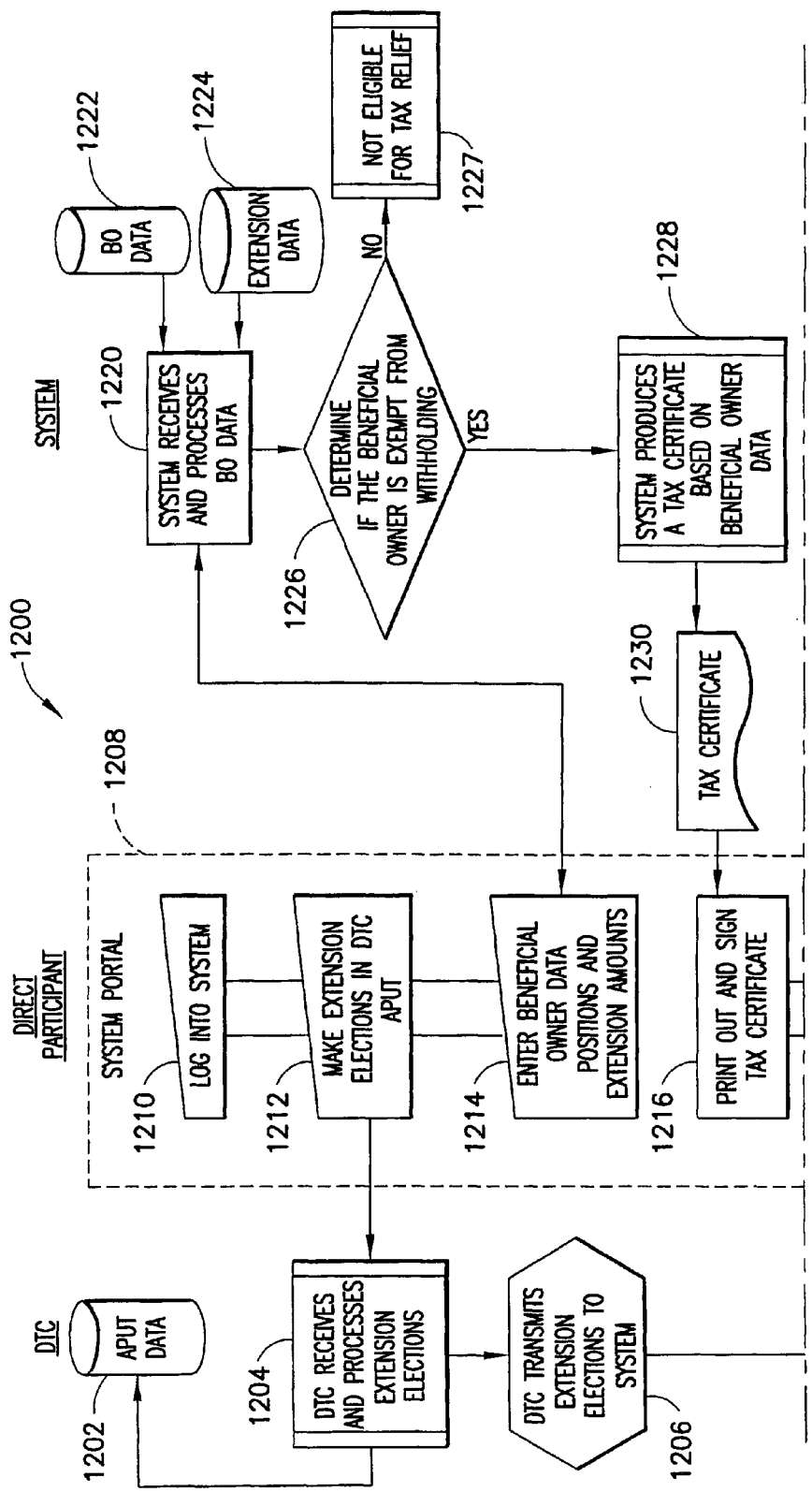

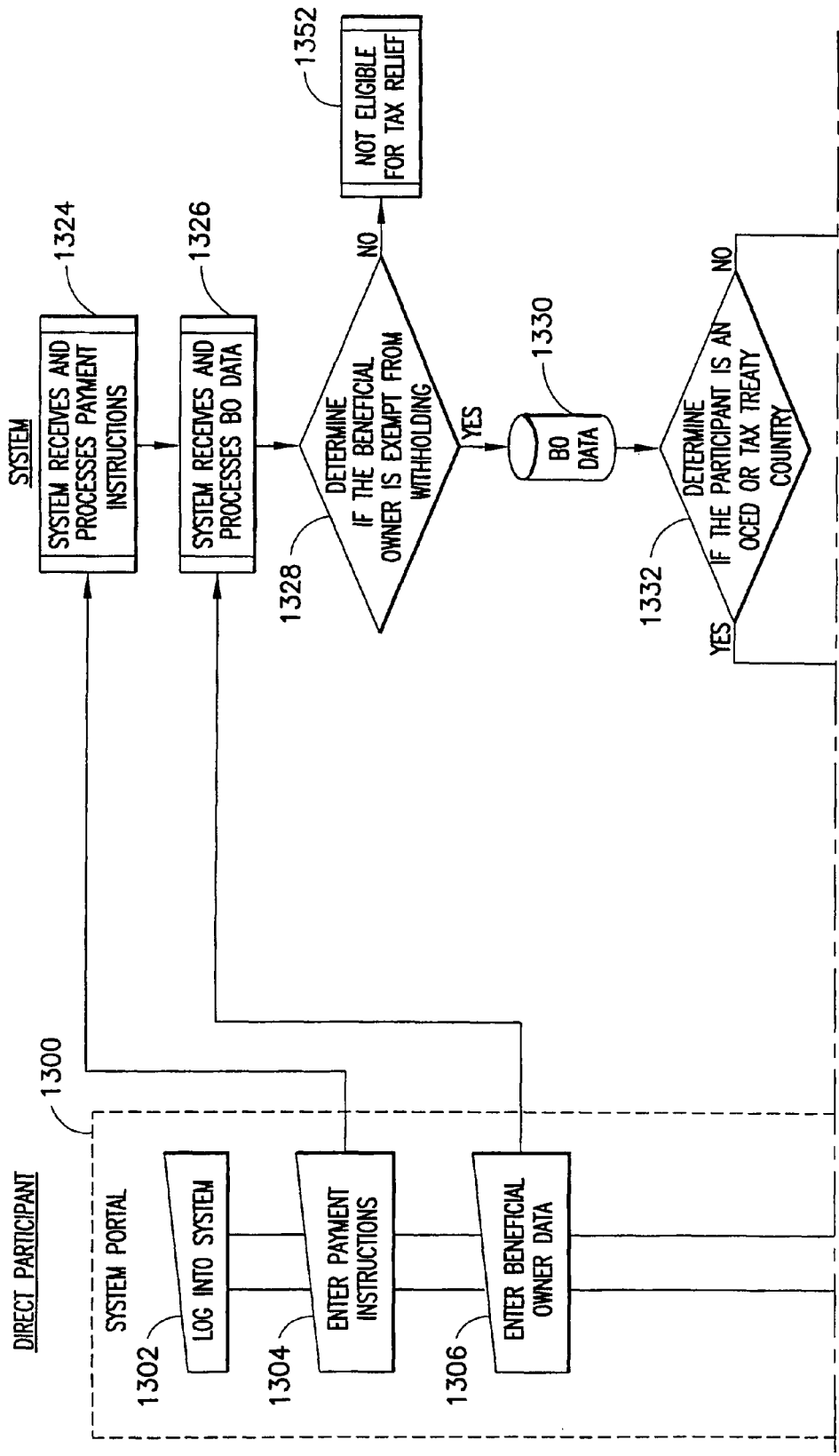

1401

TAX CERTIFICATE II

Step 1: For our receipt by 8:00 PM (NY Time) on Tuesday, August 07, 2007.
Please print out, review carefully and if accurate, sign and send to Acupay on the behalf of the Issuer by fax to +1 646 383 9489 or +44 20 7067 8453, or scan the signed Tax Certificate II into PDF format and email it to certify@acupaysystem.com.
Step 2: For our receipt by 5:00 PM (London Time) on Saturday, September 15, 2007.
Securely mail the <u>original</u> signed paper copy of this Tax Certificate II to the following address:

> Acupay System LLC
> Tax Certifications
> Attn: Nina Santa-Maria
> 28 Throgmorton Street
> London EC2N 2AN United Kingdom

*Acupay Reference #: 197060883-1356-65190*

Richard Dudley, Tax ID No. 82164921

1615 W Chicago Ave
Chicago IL 60622
UNITED STATES

En calidad de Supervisor, en nombre y representación de la Entidad abajo señalada a los efectos previstos en el artículo 12.3.b) y c) del Real Decreto 2281/1998,
In capacity of Supervisor, in the name and on behalf of the Entity indicated below, for the purposes of article 12.3.b) and c) of Royal Decree 2281/1998,

CERTIFICO:
*I CERTIFY:*

1. Que el nombre o razón social de la Entidad que represento es: SUMMIT INTERNATIONAL
that the name of the Entity I represent is: SUMMIT INTERNATIONAL

1406

2. Que su residencia fiscal es la siguiente: UNITED STATES
that its residence for tax purposes is: UNITED STATES 3. Que la Entidad que represento está inscrita en el Registro de UNITED STATES
that the institution I represent is recorded in the Register of UNITED STATES UNITED STATES, IL, Chicago con el número 22962
UNITED STATES, IL, Chicago, under number 22962

*Acupay Reference #: 197060883-1356-65190*

4. Que la Entidad que represento está sometida a la supervisión de The US Securities and Exchange Commission
that the institution I represent is supervised by The US Securities and Exchange Commission en virtud de The US Securities and Exchange Commission
under The US Securities and Exchange Commission.

5. Que, de acuerdo con los Registros de la Entidad que represento, la relación de titulares adjunta a la presente certificación, comprensiva del nombre de cada uno de los titulares no residentes, su país de residencia y el importe de los correspondientes rendimientos, es exacta, y no incluye personas o Entidades residentes en España o en los países o territorios que tienen en España la consideración de paraíso fiscal de acuerdo con las normas reglamentarias en vigor.
That, according to the records of the Entity I represent, the list of beneficial owners hereby attached, including the names of all the non-resident holders, their country of residence and the amounts and the relevant amounts is accurate, and does not include person(s) or institution(s) resident either in Spain or in tax haven countries or territories as defined under Spanish applicable regulations.

Lo que certifico en Monday, August 13, 2007
I certify the above on Monday, August 13, 2007

1408

Please Sign: x_____
Richard Dudley

FIG. 14A

Identificación de los valores: US969696KC19 / 969696KC1
Identification of the securities: US969696KC19 / 969696KC1

Listado de titulares:
List of beneficial owners:

| Nombre<br>Name | País de residencia<br>Country of residence | Importe de los rendimientos<br>Amount of income |
|---|---|---|
| 1 GREENTREE TRUST | UNITED STATES | 920,000.00 |

*Acupay Reference Only*

| | | | |
|---|---|---|---|
| Acupay Reference #: | 2-197060883-1356-65190-1695-198 | Data Submission Date<br>(New York Time): | Thursday, August 03, 2006 |
| Data Submission IP: | 64.252.182.171 | Data Submission Time<br>(New York Time): | 6:06:00 PM |
| Total Beneficial Owners: | 1 | | |

WARNING: Submission of data via Acupay must be followed up by submission of this signed Tax Certificate II.

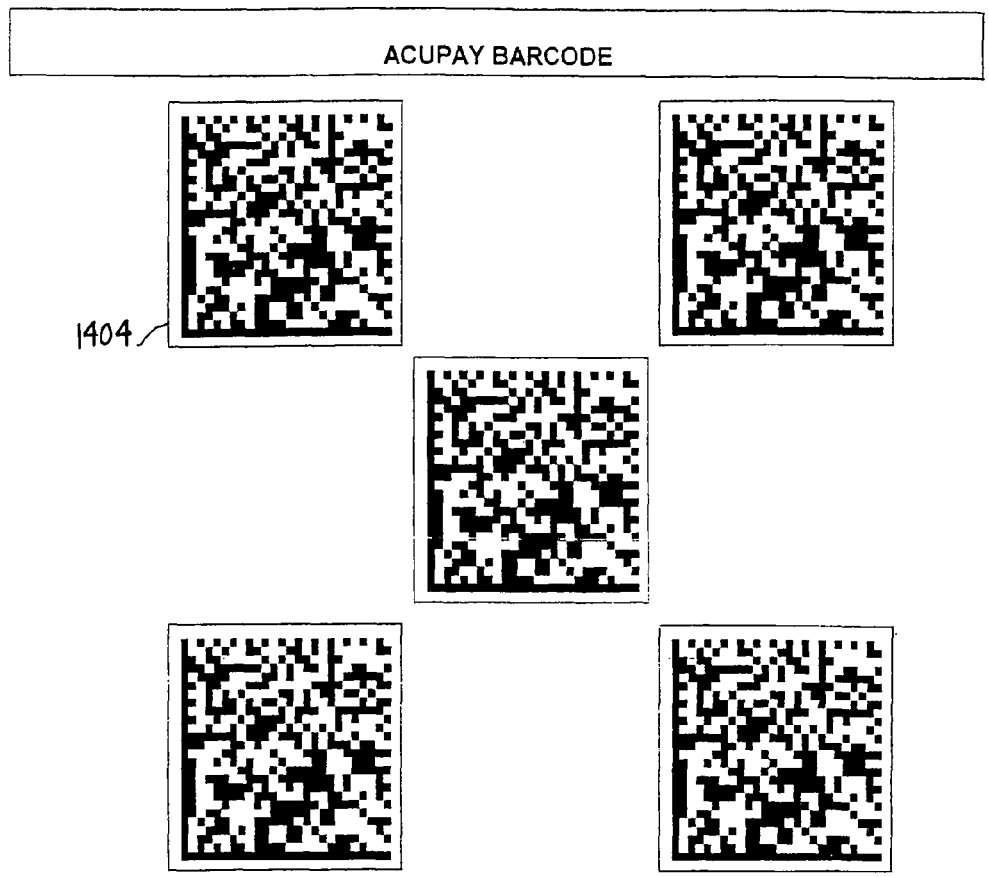

FIG. 14B

DOCUMENT PROCESSING SYSTEMS AND METHODS FOR REGULATORY CERTIFICATIONS

This application claims priority from and the benefit of U.S. provisional application No. 60/873,415 filed Dec. 6, 2006 and U.S. provisional application No. 60/872,543 filed Dec. 1, 2006, the entire disclosures of which are hereby incorporated by reference.

TECHNICAL FIELD

The present invention generally relates to automated financial data collection, processing and reporting, and more particularly to a system and method of efficiently collecting and processing investor certifications of regulatory or tax status, such as tax related information. The invention also relates to the synchronization of such certifications with data to establish or determine the entitlement of investors to own or receive income on securities in accord with various governmental, tax or contractually determined constraints. The invention can be used, e.g., to facilitate the payment of interest or dividend income free of (or at reduced rates of) withholding tax to investors whose tax status renders them exempt (or eligible for reduced rates) of such tax. The present invention also relates to a method of using novel electronic communication and tracking technology to allow for the real-time processing and efficient handling of certifications of tax residence (or other forms of legal status). Such certifications may be prepared either by government agencies or private sector institutions deputized to render them. The certifications are usually of a type that must be physically executed (e.g., signed) and associated with underlying information of the relevant investors to form a complete valid tax certification meeting the requirements of the local taxing authorities under whose authority withholding tax would otherwise be levied. It is noted that the term "executed" is used herein in its broadest sense, and does not necessarily mean a physical "ink" signature, although that is a typical scenario. The term "executed" is intended to include, more broadly and without limitation, a signed, stamped, apostilled, officially certified or otherwise legally empowered, legally activated, or legally effective means of validating a document.

The invention can also be used to provide other types of certifications. For example, certifications properly linked to underlying information in accordance with the invention can be employed to permit the certified entity to gain access to investments which might otherwise be restricted from sale to the entity. Such entities are sometimes referred to as "qualified investors."

BACKGROUND OF THE INVENTION

Recent tax withholding legislation has created onerous duties on securities issuers. For example, the kingdom of Spain passed a law on Jul. 4, 2003 entitled Law 19/2003. Law 19/2003 requires issuers of interest-bearing and preferred equity securities in Spain who wish to sell their securities to investors outside of Spain (without the income from such securities becoming subject to Spanish withholding tax) to collect certain information on the identity and tax status of every investor, prior to such investor being paid income on such securities without the application of such tax. Such investor information must be collected together with corresponding government-designed tax certificates containing information about the investor, the tax status of the investor, the income that the investor is to receive, and whether or not tax will be withheld from the payment of income to said investor. Such tax certificates must be generated and certify the accuracy of the corresponding investor information, and must be executed by officials of the banks or other securities intermediaries through which investors hold their securities. According to Law 19/2003, each issuer must compile this investor information in relation to all of the investors of a particular security, as well as receive and review all corresponding executed tax certificates, before any payment of income to the investors of said security without the application of withholding tax. Because such securities generally pay interest or dividends bi-annually or quadra-annually, and due to the fact that the investor base for such securities is always changing, and can certainly change significantly over a period of several months, the entire process of collecting information and executed tax certificates must be completed at the time of each and every payment of income with respect to the securities in question. This creates a data collection, verification, processing and reporting burden for any such issuer.

Law 19/2003 allows for certain investors who are exempt from Spanish Non-Resident Withholding Tax to be paid their income in full, without any withholding tax, provided that their identifying information, including country of residence, and the details of the income to which they are entitled, have been properly provided by the relevant bank or intermediary through which the securities are held, legally certifying that such information is all factual and accurate.

On the other hand, should an investor not be exempt from Spanish Non-Resident Withholding Tax, the withholding tax (currently 18% of such income) will be deducted from the income paid to said investor on the payment date. Should the issuer not manage to collect investor information, tax status information and a executed tax certificate on behalf of any such investor prior to the payment of income, Law 19/2003 requires that the issuer collect the appropriate amount of withholding tax against any payment of income due such investors, and promptly remit such amount to the Spanish government.

Moreover, there are severe penalties for an issuer's non-compliance with these requirements. Such penalties can include extremely costly fines and penalties that are levied by the Spanish tax authorities (i.e., the Agencia Estatal de Administración Tributaria, or "AEAT") that can amount to 50% of the total amount of income paid to all investors of the securities in question.

Law 19/2003 effectively requires that for any interest-bearing and preferred equity security issued or guaranteed by a Spanish entity and sold to investors outside of Spain, prior to the issuer paying any interest or preferred dividends without applying the collection of withholding tax, (on whatever periodic basis such payments are to be made), the issuer must locate and interact with every bank and intermediary institution through which investors hold such security and request that such banks and intermediaries create, populate and physically sign paper-based tax certificates. The required tax certificates contain (i) the identity of the investors holding securities through them, (ii) the residence such investors, and (iii) the amount of income to be paid to such investors, (with or without subtracting the appropriate taxes) which is commonly based on fixed or variable rates. If variable, the rates are set on a periodic basis close to the date of payment, and this often involves difficult mathematical calculations for each investor. Further, a representative of each such bank or intermediary institution is required to review and sign all such certificates to certify on behalf of their institution that all of the information contained in such tax certificates is completely true and accurate, and mail or hand-deliver the certificates to the issuer. Due to the free-form nature of these tax certificates, the relative complexity of the certificates and the information contained within them, and their multilingual nature, the tax certificates received and processed under Law 19/2003 were often incorrect, improperly formatted, or otherwise not in compliance with the legal specifications for tax certificates mandated by it.

The certificates are generally required to be delivered to the issuer a certain number of business days prior to the actual coupon payment date for such securities in order to help offset the time required by the issuer to manually process such tax certificates and investor information. The issuer then needs to organize the tax certificates according to the security to which they relate and the specific payment of income for each such security, and then hand re-key-enter the investor identity, tax status information, and income amount, and organize that data into a format from which the issuer could later produce an annual tax reporting filing to AEAT (called a modelo 198, 193 or 296, each containing records of payments to different types of investors). The issuer would then need to determine the validity of the tax certificates and corresponding information received and direct that income be paid to some investors and some banks and intermediaries at the tax-exempt rate of 0% withholding, or the tax-withheld rate of 18% of total income received. Each such bank or institution would need to receive an aggregate amount of income resulting from the combined taxable or tax-exempt status of all the underlying investors holding through such bank or intermediary institution, and such bank or intermediary institution would have to then determine how to allocate the income among their underlying investors as the total amount received would not be sufficient to credit each investor their income free from withholding tax. Due to the complexity and operational burden these requirements represented for both the issuers and the banks and intermediaries, issuers would often initially withhold tax from all investors on the scheduled income payment dates to allow themselves several days to sort through the stacks of paperwork and determine which investors were unfairly taxed and issue refunds of the withheld amounts to any such investors. Such delay in delivery of the withheld income resulted in costs to investors in lost revenues that such monies could have otherwise generated. Nonetheless, issuers felt that they had no choice due to the intense manual data compiling and checking processes required, and the need to avoid incurring the penalties associated with non-compliance with the law.

In addition to the above described direct effects upon issuers, the labor intensive processes of compiling investor information and hand-generating, via word processor, corresponding tax certificates on behalf of each and every individual investor (of which there could be thousands per security per payment), required to be carried out by the tax operations departments of the banks and brokerage firms through which investors would obtain such Spanish securities, and which further would have to be carried out by such banks or brokerage firms several times each year, was deemed by many banks and brokerage firms to be an unacceptable operational burden. Thus, many banks and brokerage firms either refused to allow such securities to be purchased through them, or refused to cooperate with the requirements of Law 19/2003 and therefore prevented investors holding such securities through them from being paid the full income to which they were entitled, regardless of whether or not they were actually exempt from such tax. The net effect of this marketplace reaction in the countries, specifically the United States, where Spanish issuers would seek to issue securities to be sold to and purchased by US investors, was that due to such refusal of many bank and brokerage firms to act as outlets for the distribution of such securities into the hands of investors the market for such securities, despite high investor demand for the securities themselves, was artificially limited, reducing the financial viability of the securities to be issued.

Furthermore, were any such securities actually issued and sold to investors through the remaining limited channels comprised by the minority of financial institutions willing to accept the securities, the refusal or inability of this minority of banks and brokerage firms to comply with the requirements of Spanish Law 19/2003 resulted in many such investors being taxed at 18% on any income to which they would be entitled, thereby significantly reducing the effective interest rate of the securities, affecting the realized market value of such securities adjusted to reflect this effectively lower interest rate, and thereby further tarnishing the marketability of the securities. The effective outcome of this situation was that from the time that Law 19/2003 was enabled essentially no Spanish securities subject to the law were issued into the US market. This created an artificial vacuum of Spanish securities in the US dollar-denominated securities inventory and a corresponding hardship for Spanish corporate issuers who were effectively cut-off from a major and important capital base. In turn, this affected the cost to those issuers of raising the capital required to operate and maintain their businesses and potentially could have secondary effects on the Spanish economy and any other capital markets to which such Spanish corporations would need to turn to satisfy their capital requirements.

Many countries around the world have followed Spain's lead and adopted equivalent legislation to Law 19/2003 with similar effects on each such country's domestic securities issuers. Many such markets, including but not limited to Portugal, Lebanon, Mexico, Iceland and Italy suffer from similar if not identical operational obstacles to raising foreign capital due to legal requirements for tax certification and reporting that are substantially similar to those of Spanish Law 19/2003 described above. It is estimated that the unrealized market in Spanish US Dollar denominated securities under Spanish Law 19/2003 without a solution such as is provided by the present invention would be approximately $180 Billion. It is further estimated that the unrealized market in US Dollar denominated securities issued from all of the countries that have enacted similar legislation to be on the scale of $600-800 Billion.

What is thus needed in the art is a system and method that can overcome the operational inefficiencies and mechanical impediments inherent in compliance with investor information reporting and tax certification requirements imposed by legislation and/or regulation such as Spanish Law 19/2003 and similar laws and requirements in other jurisdictions. What is further needed in the art is a system and method which facilitates such compliance in an effective and efficient way.

SUMMARY OF THE INVENTION

The invention relates to a novel system for, e.g., investor tax status information collection and tax certification processing, and an associated method of efficiently generating and processing underlying documents (such as tax certifications for tax-exempt investors of interest-bearing and preferred equity securities) which when combined together with information for end beneficiaries (e.g., investors), enables such end beneficiaries to avail themselves of certain benefits for which they are eligible. In an example embodiment, tax certifications allow investors to be paid income without tax being withheld, and facilitate compliance with legislative requirements of local taxing authorities. In exemplary embodiments of the present invention, a system and method involves representatives of banks through whom investors hold securities introducing into the system details of those investors then used by the system to generate tax certificates per the requirements of the relevant taxing authorities. Such tax certificates can contain tracking elements which allow them to be executed and electronically transmitted back into the system, and automatically matched to the investor data already stored electronically, thus forming the basis of an executed tax certification.

A computer system in accordance with the invention obtains and maintains executed documents linked to information stored on the system. The system includes a system processor. A database accessible to the system processor is adapted to store information to be incorporated into a document. A tracking element generator, document generator, and communications module are associated with the system processor. The system processor and document generator are adapted to incorporate data from the database into a document. The system processor and tracking element generator are adapted to incorporate a tracking element into the document. The system processor and communications module are adapted to forward the document for execution (e.g., signature) and receive the document after execution for electronic storage as an executed document. The tracking element remains associated with the executed document and links the executed document to information stored in the database.

In an illustrated embodiment, the document comprises a tax certification certificate. The document could, for example, also or alternatively include an exchange or extension election for an investment, or comprise a letter of eligibility of said investor to establish their eligibility for some purpose or action, such as, for example, the eligibility to invest in certain restricted-market securities.

The document can relate to an investment, with the tracking element facilitating proper association of the document with investor information. The tracking element can contain encoded information. Such encoded information can be interpreted by the system and used to determine how the associated document should be handled by the system. In a preferred embodiment, the tracking element comprises a barcode. The barcode can, for example, comprise a two-dimensional array of squares. The system can automatically read the barcode directly from an electronic image of the executed document.

The executed document can be maintained by the system in an electronic library together with metadata about the document. In an example application, the system operates as a securities processing nexus for financial institutions and other intermediaries to effect, review, archive and manage a plurality of transactions requiring executed documents.

A method is provided for obtaining and maintaining executed documents linked to information stored on a computer system. In accordance with the method, information is stored in a database. A document is generated with information from the database incorporated therein. A tracking element is embedded into the document. The document is forwarded to an authorized entity for execution, and received back from the authorized entity after execution. The executed document is then stored in electronic form. The tracking element remains associated with the executed document and links the executed document to information stored in the database.

The generating step can produce, for example, a tax certification certificate and/or a document that includes an exchange or extension election for an investment. The generating step can also (or alternatively) produce a document that relates to an investment with the tracking element facilitating proper association of the document with investor information.

The tracking element can contain encoded information, and can comprise, for example, a barcode. In an illustrated embodiment, the barcode comprises a two-dimensional array of squares. The storing step can store the executed document in an electronic library together with metadata about the document.

A compliance document is also provided in accordance with the invention. The compliance document includes information identifying an investor, a document reference number, compliance text, an execution space, and at least one machine-readable tracking element linking the document to data stored in a computer system. The document can be, for example, a tax certification certificate. The execution space can contain a signature. In an illustrated embodiment, the tracking element comprises a bar code.

The compliance document can be embodied in an electronic data file. In an illustrated embodiment, a plurality of identical tracking elements are provided on the document for redundancy, each of the tracking elements alone linking the document to the same data stored in a computer system.

A system is also provided for controlling the provision of benefits to investors. The system includes a system processor. A library of electronically stored government certificates is accessible to the system processor. The system processor is adapted to interrogate the library to determine if a government certificate is present in the library for an investor seeking a benefit requiring such a certificate. If so, the system processor allows the benefit to be obtained by the investor. The system processor denies the benefit to the investor if the required government certificate is not present in the library. In the event no such certificate is already present in the library for the investor, the system processor can optionally generate an application for such a government certificate.

In a preferred embodiment, a unique tracking element is associated with each of the electronically stored government certificates. The tracking element links the certificate with data relating to a particular investor. The tracking element can comprise, for example, a barcode provided on a coverpage associated with the certificate.

BRIEF DESCRIPTION OF THE DRAWINGS

FIG. 14 (comprising 14A and 14B) depict the first and second pages, respectively, of an exemplary Tax Certificate according to an exemplary embodiment of the present invention.

DETAILED DESCRIPTION OF THE INVENTION

Figure 1:
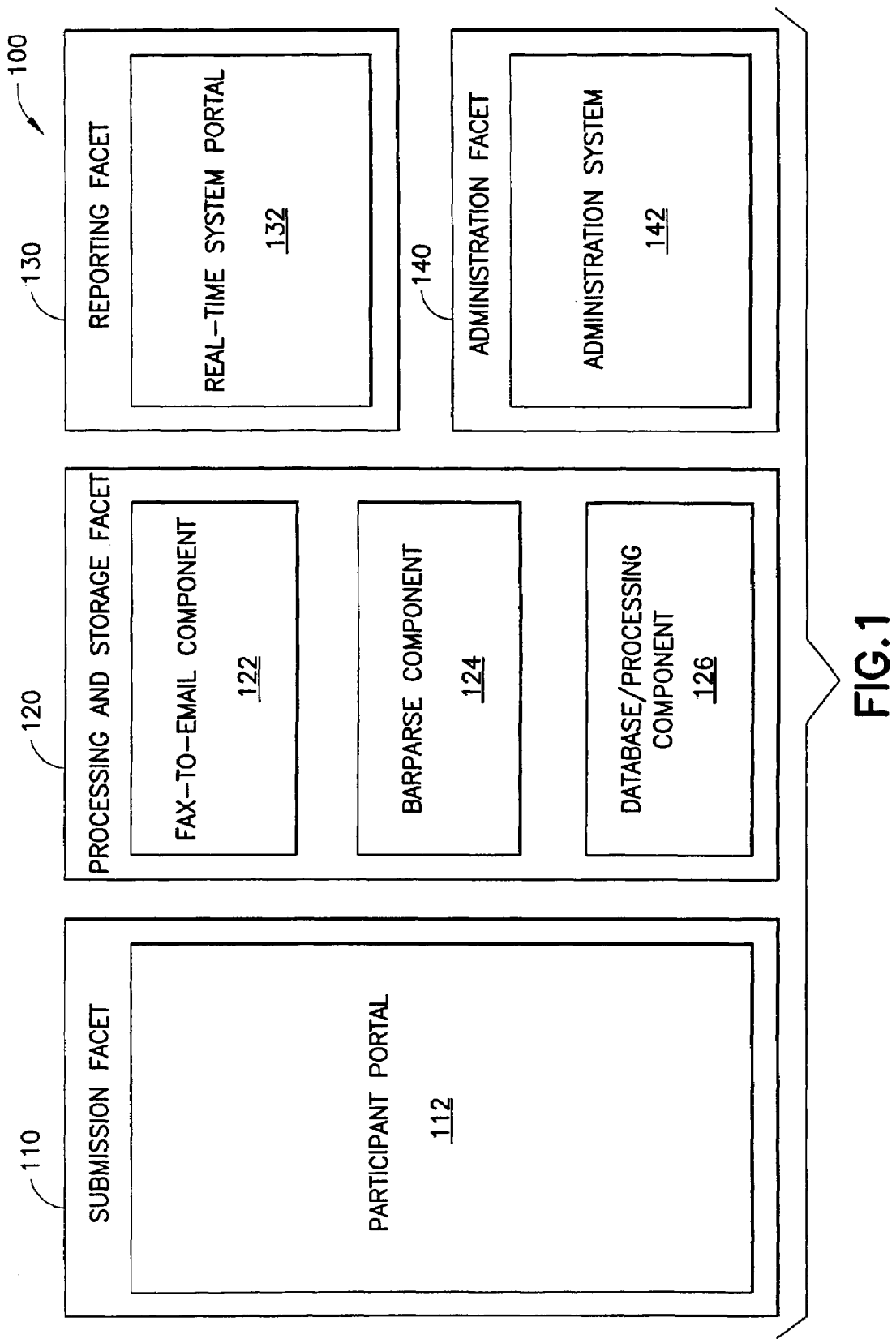
FIG. 1 depicts an overview of an exemplary system according to an exemplary embodiment of the present invention.

It is a general object of the present invention to avoid the aforementioned disadvantages of the prior art, and thus to eliminate the burden on banks, brokerage firms and other financial intermediaries to manually generate tax certificates so as to be in compliance with Spanish Law 19/2003 and equivalent or similar laws in other jurisdictions.

Another object of the invention is to reduce the conventional burden on the issuers of securities subject to Law 19/2003 of manually collecting, collating, reviewing and processing investor information contained in or transmitted along with said tax certificates.

Another object of this invention is to eliminate the necessity to delay the distribution of part of the income owed to investors in order to allow time for the issuer to process the required investor tax status information and tax certificates in order to ascertain which investors should be free from withholding tax.

Another object of this invention is to sharply reduce the currently necessitated amount of lead time required by the issuers to process tax certificates prior to the payment of each coupon.

Another object of this invention is to maximize the amount of time available to banks, brokerage firms and other financial intermediaries to collect and compile the required information about the investors who own the securities through them.

Another object of this invention is to increase compliance with Spanish Law 19/2003 and other similar laws over current levels by creating a standard form of tax certificate and a standard process of collecting investor information and generating and processing tax certificates that is universal across all banks, brokerage firms and other financial intermediaries.

Another object of this invention is to allow for the real-time review by the issuer of investor information and the actual executed tax certificates being submitted by banks, brokerage firms and other financial intermediaries in the days leading up to the coupon payment date.

Another object of this invention is to provide a system of management and storage of tax certificates and tax certification data and documents for issuers of eligible securities and other parties so that they may be easily accessed and reviewed at any future time or date.

Another object of this invention is to generate all reports and instructions, based on the investor information and tax certificates collected, required to be exchanged with all parties involved in order to correctly allocate the payments of income to and from all parties involved.

Another object of this invention is to produce the records that comprise the tax reporting filings required to be made by the issuer with the relevant tax authorities on an annual or otherwise periodic basis, and to transmit such records to the issuers electronically.

Another object of this invention is to allow for the instant and real-time association of an image of executed paper tax certificates with the corresponding investor tax status and information data already registered in the system using electronic document tracking and identification methodologies.

Another object of this invention is to facilitate the process of the collection of investor tax status information and tax certificates required to comply with Spanish Law 19/2003 and other similar laws sufficient to reduce the burden over the prior art on banks, brokerage firms and other financial intermediaries such that those banks, brokerage firms and other financial intermediaries will accept the securities in question into, and allow investors to acquire them through their firms, thereby reducing an impediment to the marketability of such securities.

Another object of this invention is to create a platform for facilitating the exchange or the extension of certain extendible or exchangeable securities, either with or without withholding tax considerations, and where withholding tax is relevant to the eligible securities in question, in addition to handling the usual tax certification for such eligible securities, facilitating any further tax consequences pertaining to said extension or exchange activity.

Another object of this invention is to create a system whereby holders of common stock (which outside of the USA is called ordinary shares) or receipts issued with respect thereto and representing interests therein may request the application of reduced rates of tax withholding to which such stockholders may be eligible. For example, such a request may be made due to the effectiveness and applicability of a bilateral treaty for the avoidance of double-taxation. In such a case, a reduced rate of withholding is established for eligible stockholders depending on the source of the income subject to withholding and the tax residence of the applicable stockholder. Such a system would be, for example, facilitated by an electronic library of government-issued certificates of tax residency. This library would maintain records on behalf of stockholders indicating their eligibility status with regard to particular benefits as well as copies of the government-issued certificates of tax residency establishing such eligibility. Such a library of government issued certificates of tax residence could, for example, be collected and organized using tracking elements and technology similar to that described herein for the collection and organization of tax certificates. A more detailed description of this exemplary Government-Issued Certificate Library System is provided hereinafter.

Another object of this invention is to create a system which can be used to establish the eligibility of certain investors to invest in certain restricted-ownership and/or private-placement securities. Such securities could take the form of, for example, unlisted securities made available under Rule 144A of the U.S. Securities Act of 1933 or under Rule 3(c)(7) of the Investment Company Act of 1940. Eligibility to invest in such securities may be established through the execution of a document which is collected and organized efficiently in, for example, an "Eligibility Letter Library System" and which is collected and organized using tracking elements and technology similar to that described herein for the collection and organization by the system of other forms of certification, such as tax certificates.

Another object of this invention is to create a platform for facilitating the special case of tax certification and documentation activity relating to "Quick Reclaims" or "Quick Refunds" of amounts of tax withheld during the initial "Relief-at-Source" period for a payment made to the investors of an eligible security, involving either further processing of tax certificates, or the submission and processing of other forms of relevant documentation as required by the Tax Authorities under whose jurisdiction the eligible securities in question pay income.

Another object of this invention is to facilitate the process of the collection of investor tax status information and tax certificates required to comply with Spanish Law 19/2003 and other similar laws sufficient to reduce the burden over the prior art on banks, brokerage firms and other financial intermediaries such that those banks, brokerage firms and other financial intermediaries who accept the securities in question into, and allow investors to acquire them through their firms, will follow the improved methods of compliance with the requirements of Spanish Law 19/2003 and similar laws and thereby allow the investors holding such securities through their firms to their entitlement of the full amount of income to which they are due to be paid to them on the coupon payment date free from tax withholding in such cases where the tax status of the investor warrants them exemptions from such tax.

Another object of this invention is to effectively establish a functional solution to the burdensome requirements of the investor tax status information and tax certificate collection requirements of Spanish Law 19/2003 and similar laws, such that it will be possible for Spanish as well as other issuers to issue securities in markets wherein the operational and mechanical burdens created by such tax withholding laws effectively prevented such issuances from taking place in the past.

These and other valuable objects are achieved by means of a novel investor tax status information collection and tax certification processing system and method of efficiently generating and processing tax certifications for investors holding securities that periodically pay income allowing for investors whose status renders them exempt from withholding tax to be paid income without tax being withheld and doing so in compliance with the requirements of the local taxing authorities under whose jurisdiction such withholding taxes would otherwise be unnecessarily levied. Said system is functionally embodied by a computer system and communications infrastructure and a set of procedures and methods relating to how the various parties involved utilize such computer system and communications infrastructure to transmit, collect, process and review such investor tax status information and tax certificates allowing for instant, real-time and intelligent production, organization and transmission of the elements involved.

System Overview

The present invention can, for example, be implemented in a computer system and communications infrastructure and a set of procedures and methods relating to how various involved parties can utilize such computer system and communications infrastructure to transmit, collect, process and review investor tax status information and tax certificates allowing for instant, real-time and intelligent production, organization and transmission of the elements involved. For ease of illustration the system described will sometimes be referred to herein as "Acupay" or "the Acupay System." Acupay is a trade name contemplated to be used in connection with an exemplary embodiment of the present invention. The use of the term Acupay is in no way meant to be limiting, and is only used for convenience in describing the invention.

In exemplary embodiments of the present invention, an exemplary system can be divided into four primary facets, and within each such facet, several large component sections. Such component sections can then be further divided into various functional components, subsections, technologies and interfaces. (The term facet is used herein in the sense of an aspect of an exemplary inventive system, or, in the sense of a module of an exemplary inventive system that performs a certain function or functions).

In exemplary embodiments of the present invention a system generally designated 100 can have, for example, four primary facets as shown in FIG. 1, namely:

A Submission Facet 110;
A Processing and Storage Facet 120;
A Reporting Facet 130; and
An Administrative Facet 140.

Each such Facet can, for example, be divided into large component sections and interfaces, many of which can, for example, be further divided into smaller subsections and components. The various elements (e.g., component sections, interfaces, subsections and components, etc.) of each Facet can be implemented in computer software, firmware and/or combinations thereof as well known in the art.

In the descriptions that follow, various components and subcomponents of exemplary systems and methods according to the present invention are described. It is understood that although a given exemplary system, component thereof, or functionality may be described, the invention is not limited to any such system, component thereof, functionality, or combination thereof, each being merely an exemplary aspect of an exemplary embodiment of the present invention.

I. Submission Facet

Figure 2:
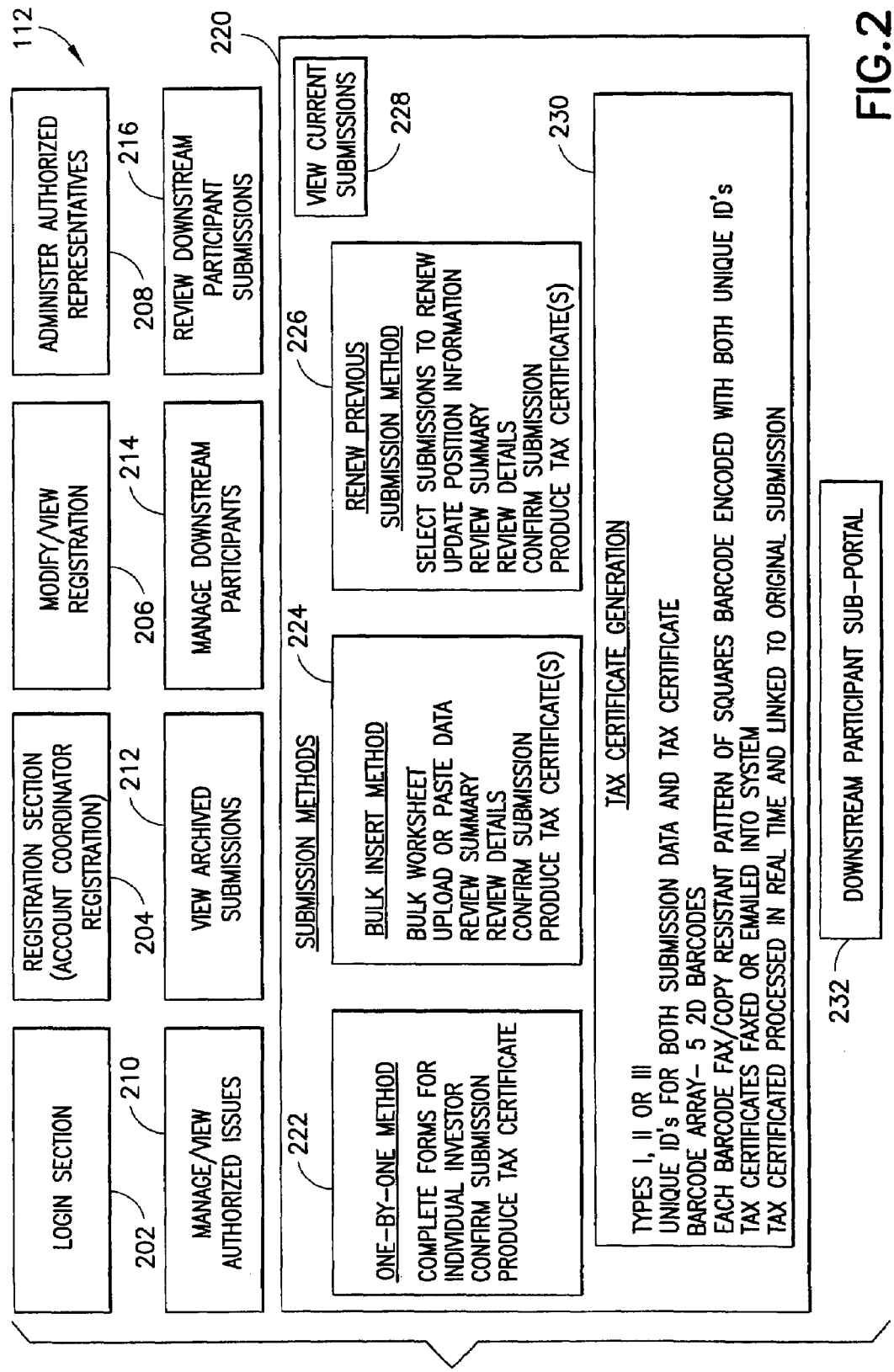
FIG. 2 depicts an exemplary participant portal of an exemplary submission facet according to an exemplary embodiment of the present invention.

In exemplary embodiments of the present invention a Submission Facet 110 can contain a Clearing System Participant Portal (the "Participant Portal") 112, and its subsections. The Participant Portal can be, for example, where most of the data is introduced into the system, and where Tax Certificates are generated. FIG. 2 illustrates a breakdown of exemplary sections that can make up a Participant Portal 112 in exemplary embodiments of the present invention.

Referring to FIG. 2, a login section 202 is provided, where registered Participants can log in to access the Participant Portal 112. A registration section 204 allows a Participant to register in order to establish an account in the system and confirm their identity to Acupay. The registration is accomplished through an interface (the "Participant Registration System") provided to banks, brokerage firms and other financial intermediaries (the "Participants"). During an initial registration process, the registration section 204 can include the process of registering an "Account Coordinator" for the Participant Account When Participants register or are registered in the Participant Registration System, information about the Participant is collected. This information can include, for example, information that is necessary to confirm the identity of the Participant. Additionally, information about the Participant that is necessary to be included within the Tax Certificates later generated by the Tax Certification Submission System can be collected. The collected information is stored in a Participant Registration Database. In addition, when a Participant registers it must nominate one or more of its employees as authorized representatives who will have access to the account of the Participant and may log into the Tax Certification Submission System as the Participant for the purpose of submitting Tax Certifications on behalf of the Participant or reviewing existing Tax Certifications submitted on behalf of the Participant. Viewing and modification of Tax Certificates is provided by a user interface (e.g., a GUI) as indicated at box 206. Such user interfaces are well known in the art.

The first such authorized representative identified by a Participant shall serve in the role of Account Coordinator for that Participant and approve or deny access to the account of the Participant by additional authorized representatives registered by the Participant.

An Administer Authorized Representatives section 208 is provided. This section allows an Account Coordinator for a Participant to designate who at the Participant is allowed to log into a Participant Account, and for what purpose. A Manage/View Authorized Issues section 210 is also provided. This section can be used to require Participants to request authorization from Acupay before they can participate in any Payment Periods for a particular Eligible Security.

A View Archived Submissions section 212 allows Participants to view a complete history of all submissions made through their account. Such submissions are typically organized by Eligible Security and Payment Period. Downstream Participants can be managed as indicated at box 214. Downstream Participant Submissions can be reviewed at 216.

A Submissions Section generally designated 220 allows submissions of Tax Certification Data to be made. Tax Certificates can be generated from the submitted information in order for Participants to receive income in the right amount in relation to the tax status of the investors holding through them. The Submissions Section includes an interface where registered Participants may submit the identity and tax status information (the "Beneficial Owner Data") on behalf of Beneficial Owners (also referred to as "beneficial investors") holding positions in Eligible Securities through such Participant. If the Eligible Securities in question have an exchange feature, any corresponding exchange instructions can be provided through a suitable interface (such interface being known as the "Tax Certification Submission System").

In exemplary embodiments of the present invention, there can be three main subsections of a Submission Section relating to three different submission paradigms. A first of these can be, for example, a One-by-One Method 222, which allows a Participant, for example, to complete a series of forms to allow the system to collect the investor tax status and identity data. In Spain, for example, this data consists of the full name of the investor, the type of investor (e.g., either a physical person, a business or other non-human entity, or an account of the Participant itself), and the country or territory of tax residence of the investor (in order to determine if the investor is located in a Tax Haven Country, a Tax Treaty Country, OECD Member Country, or in Spain. In the case of Spanish Corporations, the full address and Tax ID Number (NIF), the details of the position held by such investor in the Eligible Security, and the Clearing System and Clearing System Account where such position is held will also be submitted. At the end of the One-by-One Method 222, a single Tax Certificate is generated of either type I, II or III—type I for Participant-owned accounts, type II for all other investors other than Spanish Corporations, and type III for Spanish Corporate Investors. Thus, the One-by-One Method 222 is a sub-component of the Tax Certification Submission System that allows for the submission of Beneficial Owner ("BO") Data on an individual basis during a Tax Certification Submission System session.

A second main subsection of a Submission Section in accordance with the invention can be a Bulk Insert Method 224. This method can, for example, allow the same investor information as is collected via the One-by-One Method to be submitted on behalf of any number of investors simultaneously. The data can, for example, first be entered or extracted into a fixed-field data format which is then either copied and pasted into a submission window within the Bulk Insert Method, or uploaded as a text file using a secure upload mechanism contained within the Bulk Insert Method. If the submission contains a very large number of investors (e.g., greater than 500), the Bulk Insert Method can, for example, allow a Participant to log off or perform other tasks within the system while the data is being processed and provide the Participant with an estimate of how long the processing will take. It can also send an email to the Participant letting them know when the processing is complete.

It is noted that once the initial processing has been completed for a Bulk Insert Method submission, it has not actually been accepted into the system until a Participant reviews and confirms all of the data that has been received. The Participant can be presented with a summary of totals of the submissions contained within the single Bulk Insert Method submission, broken down by Eligible Security. Then, the Participant can, for example, select (e.g., via a mouse click on a GUI) any element of the summary to see a list of individual investors' submissions which comprise that element of the summary, and then, for example, when any element of such list is clicked on, the full detail of the Tax Certification information being submitted on behalf of that investor can be displayed. If any records submitted by a Participant were not correctly formatted, or there was some error encountered in processing them, the affected records can, for example, show up as errors in the summary and not be included in the totals. The participant may choose to ignore any erroneous records and still proceed counting only the good records, or may go back, revise their submission, and fix the errors detected. Descriptions of what exactly triggered the error warning can be provided by the system, along with every erroneous record.

Once the Participant is satisfied with the records being submitted, they can, for example, confirm the submission. Tax Certificates are then generated, depending on the records submitted. Any one of type I, II or III Tax Certificates can be generated, or the same type Tax Certificates may be generated all together, each Tax Certificate containing any number of investors of the same type.

A sub-component of the Tax Certification Submission System allows for the submission of Beneficial Owner Data on behalf of anywhere from a handful to many thousands of Beneficial Owners per Tax Certification Submission System session. This Bulk Insert Method can utilize any well known method of uploading formatted raw data into the system.

In an exemplary embodiment of the invention, a third main subsection of an Submission Section comprises, for example, a Renew Previous Submissions Method 226. This method can allow Participants who have previously submitted Tax Certificates on behalf of certain investors during previous Payment Periods for the same Eligible Security to resubmit the same Tax Certification information for the same investor(s), while confirming or updating the amount of their positions in the Eligible Security which may change over time. Additionally, in exemplary embodiments of the present invention, a Participant can be presented with a list of all previous submissions made during all previous Payment Periods for the Eligible Security in question and can be, for example, allowed to select any number of such submissions for renewal. Once selected, the Participant can be asked to confirm or modify the amount held by each such investor and then click continue via the GUI. Once the Participant has selected a body of investors and confirmed or updated their position details, the Renew Previous Submission Method follows the same steps as the Bulk Insert Method described above, starting at the point of a Participant reviewing the summary of submissions being made.

With regard to all three of the Submission Methods described above, the current submissions can be viewed with the use of a Submission Viewer 228. The submission viewer can comprise, for example, a screen on a user terminal that displays the current submissions in a spreadsheet format, for example.

At the end of each submission, the system can generate one or more Tax Certificates. In accordance with the invention, the Tax Certificates contain tracking elements such as barcodes that link the certificate with the underlying data in the system database. An exemplary Tax Certificate Generation Component 230 is responsible for generating such barcoded Tax Certificates, which must then be either faxed to an indicated fax number associated with a Fax-to-Email Component described in the Processing and Storage Facet or scanned and emailed to an indicated email address. In exemplary embodiments of the present invention, when a Tax Certificate is generated an algorithmically generated unique ID number can be assigned to the Tax Submission Data records represented within the Tax Certificate, as well as an additional unique ID number which identifies both the underlying Tax Submission Data as well as the specific version of the Tax Certificate that has been generated.

The same Tax Submission Data can be used to separately generate a number of Tax Certificates, such as in the case of some required modification of the data submitted, so it is necessary to keep track of the specific version of the Tax Certificate that has been generated. These numbers can, for example, both be encoded into a special 2-dimensional array of squares that form barcodes which can be, for example, used by the system to instantly electronically fingerprint each Tax Certificate as it is received back from being faxed or emailed. In this manner, the Certificate can be tied back to the underlying Tax Submission Data. Although any type of suitable tracking element can be used, the Acupay Barcode format was specifically chosen for the preferred embodiment of the invention due to its ability to withstand repeated image degradation due to faxing faxes or copying copies (repetitive fading) and still be readable at any angle. The Acupay Barcode is also readable with a high degree of reliability despite various degrees of distortion. In those cases where the barcode is unable to be automatically processed by the system, the unique ID codes, which can be, for example, printed in multiple locations throughout the Tax Certificates, can be read and entered by hand, though in practice it is noted that even Acupay Barcodes that are in terrible condition and subject to severe distortion and fading can still easily be read by the system. An example of the Acupay Barcode (repeated five times for redundancy) is illustrated in FIG. 14B, described in greater detail hereinafter.

In a preferred embodiment, the two-dimensional graphical barcodes comprise an array of squares that is capable of being machine-read with high levels of interpretive certainty using computer graphics methods at various angles and sizes. The barcodes can be accurately read even with varying degrees of graphical degradation. Each barcode a set of unique reference numbers encoded therein. The reference numbers are assigned to records in a relational database connecting each barcode to Tax Certification Submission Data and Tax Certificate Generation Meta-Data.

In exemplary embodiments of the invention, while a Payment Period is still open for Participants to make Submissions, Participants can, for example, view all of their current Acupay Submissions for any Active Payment Period for an Eligible Security; a Participant can, before the close of the Payment Period, at any time, cancel or modify the Acupay Submissions that they have made; if a Participant modifies an Acupay Submission, the Tax Certificate that was previously linked to that submission can become invalid and can be, for example, ignored by the system and a new Tax Certificate generated in its place, which must then be executed and faxed or emailing into the system.

Figure 3:
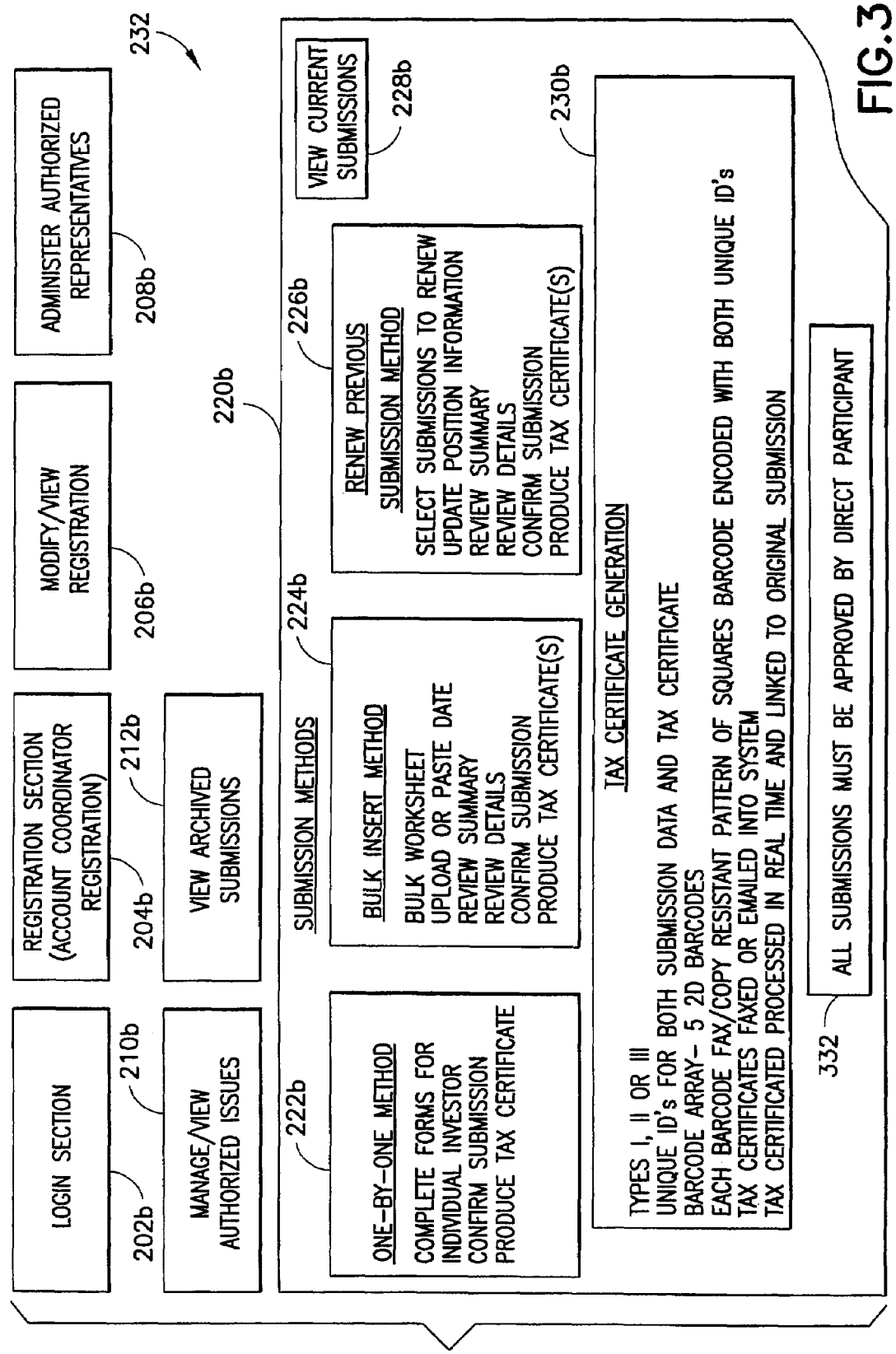
FIG. 3 depicts an exemplary downstream participant sub-portal of an exemplary submission facet according to an exemplary embodiment of the present invention.

The Participant Portal 112 illustrated in FIG. 2 can manage additional "downstream participant sub-portals", such as the sub-portal 232 shown in FIG. 2 and illustrated in greater detail in FIG. 3. In particular, as indicated at box 214 of FIG. 2, the downstream participants can be managed by the main Participant Portal 112 of submission facet 110. Downstream participant submissions can be reviewed at Participant Portal 112, as indicated at box 216 of FIG. 2.

The Downstream Participant Sub-Portal 232 can be seen, from FIG. 3, to be substantially similar to the main Participant Portal 112 of FIG. 2, with the exception of the ability to manage downstream participants (214) and review downstream participant submissions (216). The elements identified by the reference numerals in FIG. 3 (202*b*, 204*b*, . . . 230*b*) correspond to the like numbered elements of FIG. 2 (202, 204, . . . 230). In the Downstream Participant Sub-Portal 232 of FIG. 3, all submissions must be approved by a direct participant, as indicated at box 332. Thus, the system can accommodate direct participants (e.g., a bank) as well as downstream participants (e.g., subordinate or correspondent banks).

More particularly, in exemplary embodiments of the present invention, participants can choose to allow certain banks who hold positions in Eligible Securities through them to log into the Acupay System themselves in order to make submissions on behalf of their own entities or on behalf of their own clients. These subordinate banks are known as "Downstream Correspondent" banks or "Downstream Participants", and a Participant can register and generate a login for each such Downstream Correspondent Bank. Alternatively, for example, the participant can supply such a bank with a registration code allowing the Downstream Correspondent themselves to register in the system and be added to the Downstream Correspondent Section of the Participant Portal. Additionally, a Participant can add, view, modify and delete the accounts of Downstream Correspondents through a Downstream Correspondent section of the Participant Portal. Submissions made by Downstream Correspondents follow the same general submission methodology and submission methods (one-by-one, bulk insert, or renew previous submission) used by Participants, with the Downstream Correspondent printing, signing and faxing or emailing the executed Tax Certificates. However, each submission made by a Downstream Correspondent must be manually approved by a Direct Clearing System Participant in order to confirm that the Downstream Correspondent does in fact hold the position in question. In the preferred embodiment, any Acupay Submissions by a Downstream Correspondent bank, even those associated with valid executed Tax Certificates, will be ignored unless and until they are approved by the Direct Participant.

In exemplary embodiments of the present invention, if the Eligible Security for which a Participant is submitting Tax Certification information is an Extendible security or is otherwise subject of exchange activity, Participants can, for example, submit the relevant Extension Elections or Exchange Elections as part of their submissions in the Acupay System. These submissions are then, for example, referenced to corresponding tender or exchange instructions received by the relevant clearing system where the eligible securities are held, for example DTC (Depository Trust Company), APUT (Agent PUT bond) or ATOP (Automated Tender Offer Program) instructions.

Even if an Eligible Security is not subject to withholding tax and is therefore not involved in tax certification activity, Participants can, for example, still submit Extension Elections or Exchange Elections into the Acupay System which can, for example, still operate as a management and collection system for the extension and exchange activity of such Eligible Securities. If any tax is withheld on an Income Payment Date, Participants can, for example, under certain circumstances request relief in the form of a "Quick Refund" payment on behalf of their clients for part or all of the withheld amount by providing certain Tax Certificates or other relevant forms of documentation via the Acupay System, as required by the relevant Taxing Authorities. The Quick Refund procedure is explained in greater detail below in connection with FIG. 13.

In exemplary embodiments of the present invention, Acupay submissions may, for example, comprise the act of generating and submitting documents other than tax certificates. For example, the Acupay system can be used to facilitate requests by investors holding common stock (which outside of the USA is called ordinary shares) or receipts issued with respect thereto and representing interests therein (i.e., stockholders) for reduced rates of withholding tax, in which case such Acupay submissions would be used in the collection and organization of the requisite government issued certificates of tax residency. Such government issued certificates of tax residency would be collected and organized using similar methods and technology as described herein for the collection and organization of tax certificates. For example, the inventive tracking elements (such as barcodes) can be used to electronically match physical scans or faxes of the government issued certificates of tax residency to the corresponding data submitted into and/or stored within the Acupay system. A more detailed description of a Government-Issued Certificate Library System which would be used in the case of stockholders or certain other investors is set forth hereinafter.

In exemplary embodiments of the invention, submissions may, for example, comprise the act of generating and submitting documents other than tax certificates. For example, the Acupay system can be used to establish and monitor the eligibility of certain investors to invest in certain unlisted and/or restricted securities. In such a case, the eligibility of the investors may be, for example, determined via the execution and filing of a form of eligibility letter. Such eligibility letters would be collected and organized using similar methods and technology as described herein for the collection and organization of tax certificates, such as, for example, employing the inventive tracking elements (e.g., barcodes) to electronically match physical scans or faxes of the eligibility letters to the corresponding data submitted into and/or stored within the Acupay system. A more detailed description of an Eligibility Letter Library System which would be used to grant or confirm such described eligibility status is provided hereinafter.

II. The Reporting Facet

In exemplary embodiments of the present invention, a Reporting Facet can comprise a number of Real-time Portals, such as Real-Time System Portal 132 illustrated in FIG. 1. These portals provide users with access to the data and components of the system that they require. Some of the Real-time Portals can, for example, also allow for the introduction of information into the system, particularly with regard to administrative information such as the holdings of clearing system participants, or clearing systems, on a certain date and time. Descriptions of various exemplary Real-time Portals that can, for example, make up an exemplary Reporting Facet are discussed below.

Figure 4:
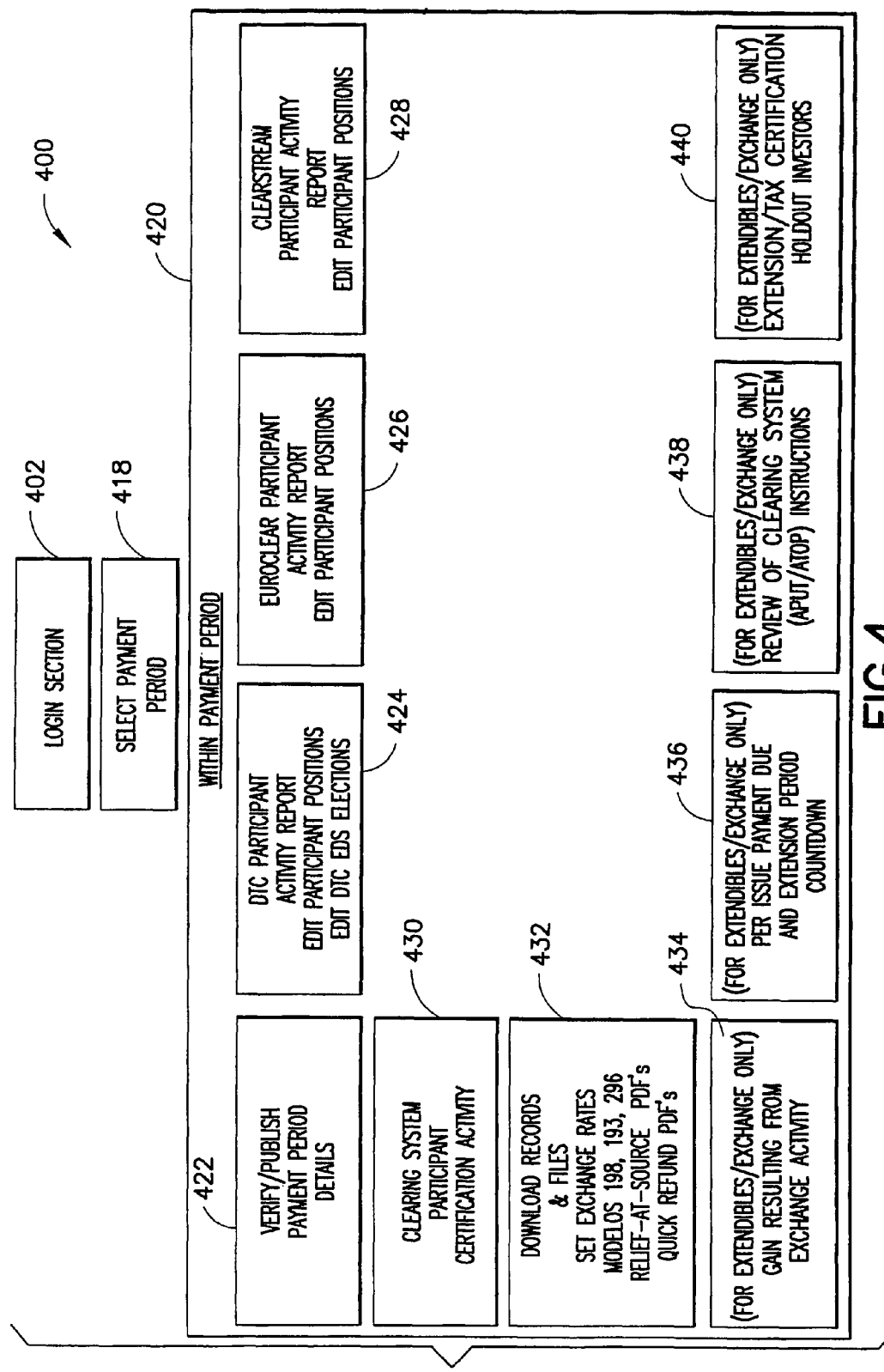
FIG. 4 depicts an exemplary Real-time Issuer Portal of an exemplary reporting facet according to an exemplary embodiment of the present invention.

One such portal is the Real-time Issuer Portal 400 illustrated in FIG. 4. This portal can allow the issuers of Eligible Securities to access all Tax Certification activity that is taking place or has taken place with regard to one of their Eligible Securities. Using this portal, issuers can, for example, see all levels of ownership of their Eligible Securities. For example, such levels of ownership can indicate (i) the depository where the securities are centrally held, (ii) all the participants in that central depository, (iii) the clearers, (iv) the participants of those clearers, and (v) the investors whose identity and tax status information is being submitted by Participants together with executed copies of Tax Certificates. The Real-time Issuer Portal can, in exemplary embodiments of the present invention, also allow an issuer to download the tax filing forms (in Spain, "modelos") that need to be filed along with each coupon payment, as well as bundles of all PDF Tax Certificates for any given Payment Period.

As shown in FIG. 4, the Real-time Issuer Portal can include a Login section 402, where the issuer would log in to access the Real-time Portal. A Select Payment Period Section 418 is provided to present the issuer with a tool for identifying an Eligible Security and corresponding Payment Period the issuer would like to review. In a preferred embodiment, all information is organized within the system by Payment Period.

Once the issuer is working within a particular Payment Period 420, there are a number of sections of the Portal pertaining to that Payment Period. The first of these sections is the Payment Period Details section 422, which contains all of the financial and timing details relating to the coupon payment that will be or has already been made as part of the Payment Period. This information includes the details of each Eligible Security included in the payment period, and such details as the number of days of income to be paid on the Income Payment Date, the nature of each Eligible Security (e.g., fixed rate, floating rate, etc), and the interest rate on which each Eligible Security should be paid. All such information must be reviewed and confirmed by three parties, namely, (i) the issuer (who confirms it here, from within this section of the Real-time Issuer Portal), (ii) the system provider (e.g., Acupay), and (iii) and the Calculation Agent.

A DTC Participant Activity Report 424 is also provided. For Payment Periods involving some position in DTC, this report shows the positions held by every DTC Participant holding the Eligible Securities in question, as well as any EDS elections, and the aggregate amount of Acupay Submissions received. For such Acupay Submissions, the Participant Activity Report 424 shows which submissions include a received, executed Tax Certificate as well as the income and withholding to be applied to the respective DTC Participant based on all of the other information at hand. By clicking on the name of any DTC Participant via the GUI, the issuer may look further into the details of the Participant involved, including the name of the person at the Participant who actually made the Acupay Submission. By clicking on any of the numbers showing the amount of Acupay Submissions or income to be paid or withheld, the issuer may look at the list of Acupay Submissions comprising such number, and, clicking on an individual submission from said list, see each individual Acupay Submission, along with an image of the actual executed tax certificate and the metadata of the submission.

The Real-Time Issuer Portal 400 also includes a Euroclear Participant Activity Report 426. For Payment Periods involving some position in Euroclear, this report shows the positions held by every Euroclear Participant holding the Eligible Securities in question, as well as the aggregate amount of Acupay Submissions received, and of such Acupay Submissions, how much of which includes a received, executed Tax Certificate as well as the income and withholding to be applied to such Euroclear Participant based on all of the other information at hand. By clicking on the name of any Euroclear Participant, the issuer may look further into the details of the Participant involved, including the name of the person at the Participant who actually made the Acupay Submission By clicking on any of the numbers showing the amount of Acupay Submissions or income to be paid or withheld the issuer may look at the list of Acupay Submissions comprising such number, and, clicking on an individual submission from said list, see each individual Acupay Submission, along with an image of the actual executed tax certificate and the metadata of the submission.

A Clearstream Participant Activity Report 428 is also provided. For Payment Periods involving some position in Clearstream, this report shows the positions held by every Clearstream Participant holding the Eligible Securities in question, as well as the aggregate amount of Acupay Submissions received, and of such Acupay Submissions, how much of which includes a received, executed Tax Certificate as well as the income and withholding to be applied to such Clearstream Participant based on all of the other information at hand. By clicking on the name of any Clearstream Participant, the issuer may look further into the details of the Participant involved, including the name of the person at the Participant who actually made the Acupay Submission. By clicking on any of the numbers showing the amount of Acupay Submissions or income to be paid or withheld, the issuer may look at the list of Acupay Submissions comprising such number, and, clicking on an individual submission from the list, see each individual Acupay Submission, along with an image of the actual executed tax certificate and the metadata of the submission.

A Clearing System Participant Certification Activity Report 430 is similar to the reports specific to DTC, Euroclear and Clearstream except that it combines the Participants of all three clearing systems together, and does not show Participant position information.

A Download Reports & Files section 432 allows the issuer to download the tax filing forms (the modelos) that need to be filed along with each coupon payment, as well as bundles of all PDF Tax Certificates for any given Payment Period. Before the modelos can be made live, the issuer must enter a currency exchange rate to convert U.S. Dollars (USD) to Euros (EUR) to satisfy the Spanish AEAT requirement that the income received be expressed in EUR in the modelos.

In the case that an Eligible Security is a security with an exchange feature, an issuer would have some additional sections available for such Eligible Security, including a section to document the process where an amount of income is determined based on the changing value of a security with respect to a security for which the original security was exchanged. This section is shown at box 434. In such an event, some income will be generated upon the exchange, which takes place on the Income Payment Date. If the gain on exchange is above a certain threshold, then the system will automatically include such gain into the income to be reported to the Spanish government. Where an investor is not exempt of non-resident income tax (NRIT), the required withholding amount will be based on the combined income amount. The amount of gain on exchange is reported here, along with an indication of whether or not the threshold has been met to classify such an exchange as a taxable event. If it is a taxable event, the required income payments and withholdings will be effected for the coupon payment.

For Eligible Securities that are extendible securities, an issuer can have, for example, a section called Per Issue Payment Date and Extension Period Countdown, which shows the daily progress during the ten business days of the Payment Period of both the Tax Certification activity as well as the extension election activity pertaining to the election to retain the original extendible securities, rather than having such securities be exchanged for non-extendible securities on the Income Payment Date.

A Per Issue Payment Date and Extension Period Countdown section 436 includes figures reflecting how much of a particular security has not yet been extended or certified for tax purposes. When these figures are clicked via the GUI, the issuer is brought to a section called Extension Holdouts, which provides information identifying which investors have not yet elected to extend their extendible securities or who have not yet been certified for withholding tax exemption. Extension and/or tax certification for holdout investors is provided at box 440.

For Eligible Securities involving an exchange option, either an election to exchange or to extend, the issuer is also presented with a detailed report of all exchange activity, as reported by DTC or the clearing system where such instructions are being received. This allows, for example, the issuer to review the clearing system instructions, as indicated at box 438. When such extension instructions are received through DTC, they constitute APUT or ATOP instructions, and are reflected as elections made by individual DTC participants. Such APUT and ATOP data is collected electronically from DTC, as described in greater detail hereinafter. If any such Extension or Exchange activity results in taxable events or gains in income resulting directly from such Extension or Exchange activity, the system factors in any tax withholding requirements resulting from such taxable events and adjusts the relevant reports and payment instructions as necessary to redirect income or exchange securities to be used to satisfy any such withholding requirements.

For Eligible Securities that are Extendible Notes or otherwise subject of some form of tender or exchange activity, the Acupay System may still be used as a system to receive and manage instructions and Elections to Extend or Exchange positions in such Eligible Securities, operating in effectively the same manner as when Tax Certification activity is involved, but without such Tax Certification activity. In such a case, Acupay Submissions that are made to the system represent such Elections or Instructions to Extend or Exchange such securities, without also containing any Tax Certification elements. Such submissions are processed with the same Submission, Processing and Storage, Reporting, and Administration systems and facets as would otherwise be employed by the system, except in such cases where the lack of Tax Certification activity obviates the need for a specific subcomponent thereof (i.e., Tax Certificates themselves).

An interface (the "Issuer Real-Time System") allows issuers of Eligible Securities to log into the system to view in real-time the status of any live Tax Certification activity taking place for any of such issuer's Eligible Securities nearing a coupon payment, including the ability to see the holdings at all clearing system Participants in the Eligible Securities, any EDS or other elections thereon, any exchange election activity when appropriate, all Tax Certification Data submitted by the Participants along with the meta-data of the submission and the actual images of the executed Tax Certificates themselves as they are faxed or emailed into the system. Access is provided to the archives of all past Tax Certification activity for all past coupon payments for all of an issuer's Eligible Securities, including the ability to see the holdings as of any such Income Payment Date at all clearing system Participants in the Eligible Securities, any EDS or other elections thereon, any exchange election activity when appropriate, all Tax Certification Data submitted by the Participants along with the meta-data of the submission and the actual images of the executed Tax Certificates themselves that were faxed or emailed into the system. Review and approval of the mechanical and financial details regarding an Income Payment Date for one or more of the issuer's Eligible Securities prior to the activation of the system for use on that Income Payment Date is also allowed. The system also provides for review of the archives of the mechanical and financial details of all past Income Payment Dates processed within the system. Also provided for is the download of PDF bundles of all executed. Tax Certificates on the Income Payment Date for review between the final submission deadline and the transmission of income payments to investors, together with access and downloadability of all archived PDF bundles from past Income Payment Dates processed within the system. The desired currency exchange rate to be used in the generation of the modelo 193, 198 and 296 tax filing reports can also be set via the GUI. Provisions are made for the downloading of modelo 193, 198 and 296 tax filing reports for all current and past Income Payment Dates, which are formatted for direct electronic transmission to the Spanish Tax Authorities (AEAT).

With regard to issuers or other real-time users involved with Acupay-eligible securities that require the use of either a government issued certificate of tax residence library or an eligibility letter library, in exemplary embodiments of the invention the real-time system would contain a graphical user interface (GUI) allowing for the efficient and information-rich navigation of the documents and information stored and maintained in such libraries—a Document Library Interface. Such Document Library Interfaces would allow for the automated lookup of certain information relating to the documents it contains, as well as keeping track of any expiration date of such documents and facilitating their renewal.

Figure 5A:
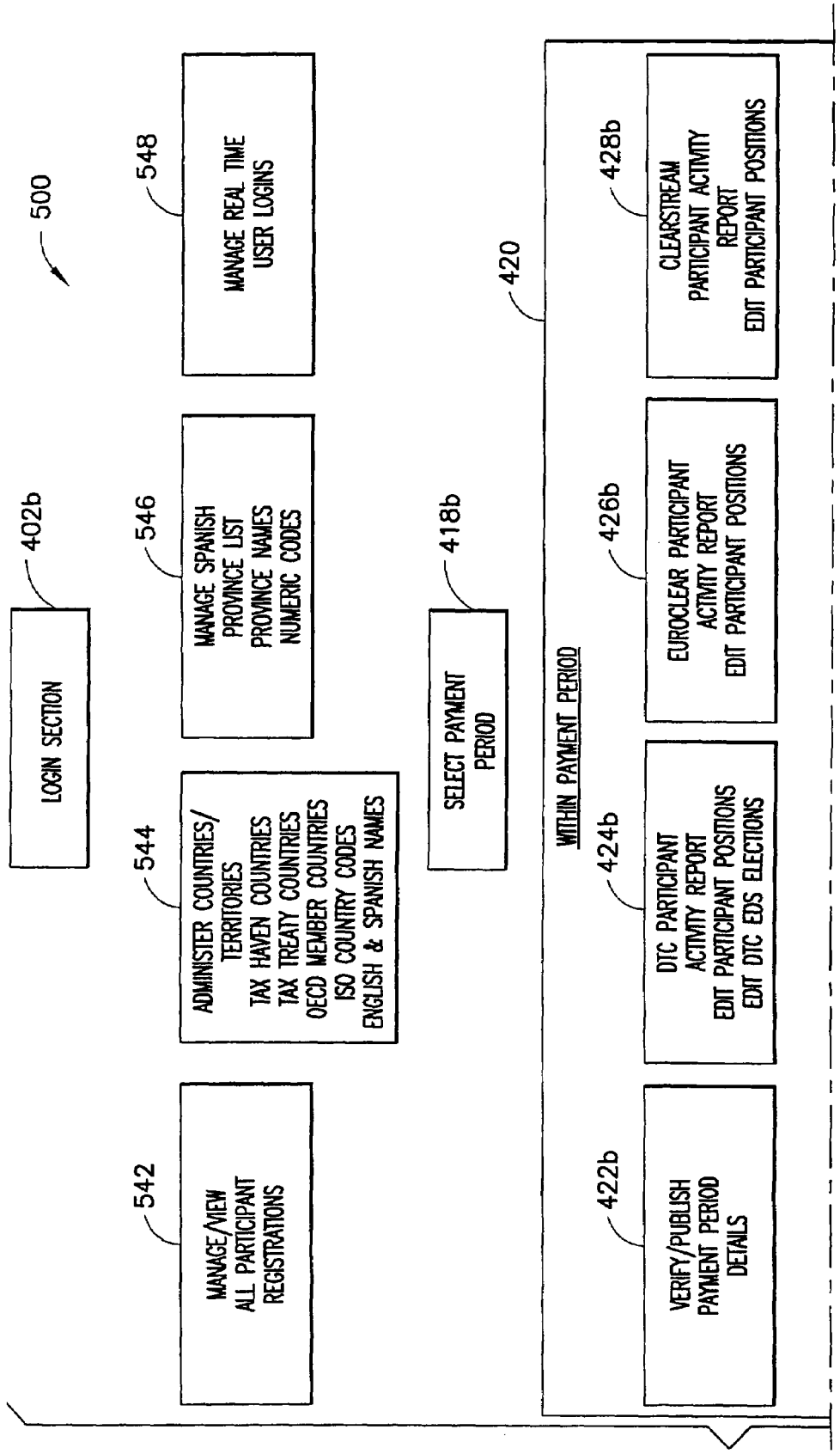
FIG. 5 (comprising 5A and 5B) depicts an exemplary Real-time System Portal of an exemplary reporting facet according to an exemplary embodiment of the present invention.

FIG. 5 (comprising sections 5A and 5B) shows the Real-Time System (Acupay) Portal generally designated 500. This portal is similar in many respects to the Real-Time Issuer Portal of FIG. 4. Such similarities are noted by the reference numerals 422b, 424b, ... 440b which correspond to elements 422, 424, ... 440 of FIG. 4. Moreover, the login section 402b and select payment period 418b are similar to the components 402 and 418 of FIG. 4. FIG. 5 adds elements 542, 644, 546, 548 in FIG. 5A and elements 552, 554, 556 and 558 in FIG. 5B.

The Real-time System Portal allows Acupay, for example, to access all aspects of all Real-time systems that exist for any user. Using this portal, Acupay can see all levels of ownership of their Eligible Securities, from the depository to the end investors and have access to all system features.

At box 542, the system operator (e.g., Acupay) can manage and/or view all participant registrations, e.g., ICSD and CSD Participants. At box 544, countries and territories can be administered. For example, tax haven countries, tax treaty countries, OECD member countries, ISO country codes, and English and Spanish names can be accessed and used in the administration of the system. The Country List section contains details on how countries and territories are treated by the system, and contains an easy to maintain list of thousands Tax Haven countries, Tax Treaty Countries, and OECD member countries, as well as ISO codes.

At box 546, the Spanish Province list can be managed, as can the province names and numeric codes. The Spanish Province List allows the system to keep up with the latest list of Spanish provinces.

A box 548, real-time user logins are managed.

Box 552 of FIG. 5B provides a Euroclear Specialized/Common Depository reconciliation report. Similarly, a Clearstream Specialized/Common Depository report is provided at box 554. A Euroclear Specialized/Common Depository activity summary is provided at box 556. At box 558, a Clearstream Specialized/Common Depository activity summary is provided.

With regard to Acupay-eligible securities that require the use of either a government issued certificate of tax residence library or an eligibility letter library, in exemplary embodiments of the invention the real-time system would contain a graphic user interface allowing for the efficient and information rich navigation of the documents and information stored and maintained in such libraries—a Document Library Interface. Such Document Library Interfaces would allow for the automated lookup of certain information relating to the documents it contains, as well as keeping track of any expiration date of such documents and facilitating their renewal.

An interface (the "DTC Real-Time System") can be provided where the Depository Trust Company (a/k/a "DTC") may log into the system to view in real-time the status of any live Tax Certification activity taking place for any Eligible Securities nearing a coupon payment. This interface may be limited to the ability to see the holdings of DTC Participants, any EDS elections thereon, and any exchange election activity when appropriate, A Login section, where DTC would log in to access the Real-time Portal, would also be provided.

A Select Payment Period Section would present DTC with a tool for identifying the Eligible Security and corresponding Payment Period DTC would like access. Again, all information would be organized within the system by Payment Period.

Once inside a Payment Period, A DTC Participant Activity Report would be accessible. For Payment Periods involving some position in DTC, this report would show the positions held by every DTC Participant holding the Eligible Securities in question, as well as any EDS elections, the aggregate amount of Acupay Submissions received, and of such Acupay Submissions, the amount of which includes a received, executed Tax Certificate, as well as the income and withholding to be applied to such DTC Participant based on all of the other information at hand. By clicking on the name of any DTC Participant, DTC may look further into the details of the Participant involved, including the name of the person at the Participant who actually made the Acupay Submission. By clicking on any of the numbers showing the amount of Acupay Submissions or income to be paid or withheld, the issuer can look at the list of Acupay Submissions comprising such number, but may not access each individual Acupay Submission, nor the corresponding images of the actual executed tax certificate nor the metadata of the submission.

A Clearing System Participant Certification Activity Report section is similar to the DTC Participant Activity Report except that it does not show Participant position information and also shows Participants who do not currently hold any positions at DTC, but who have been authorized for the Eligible Securities in question.

Figure 6:
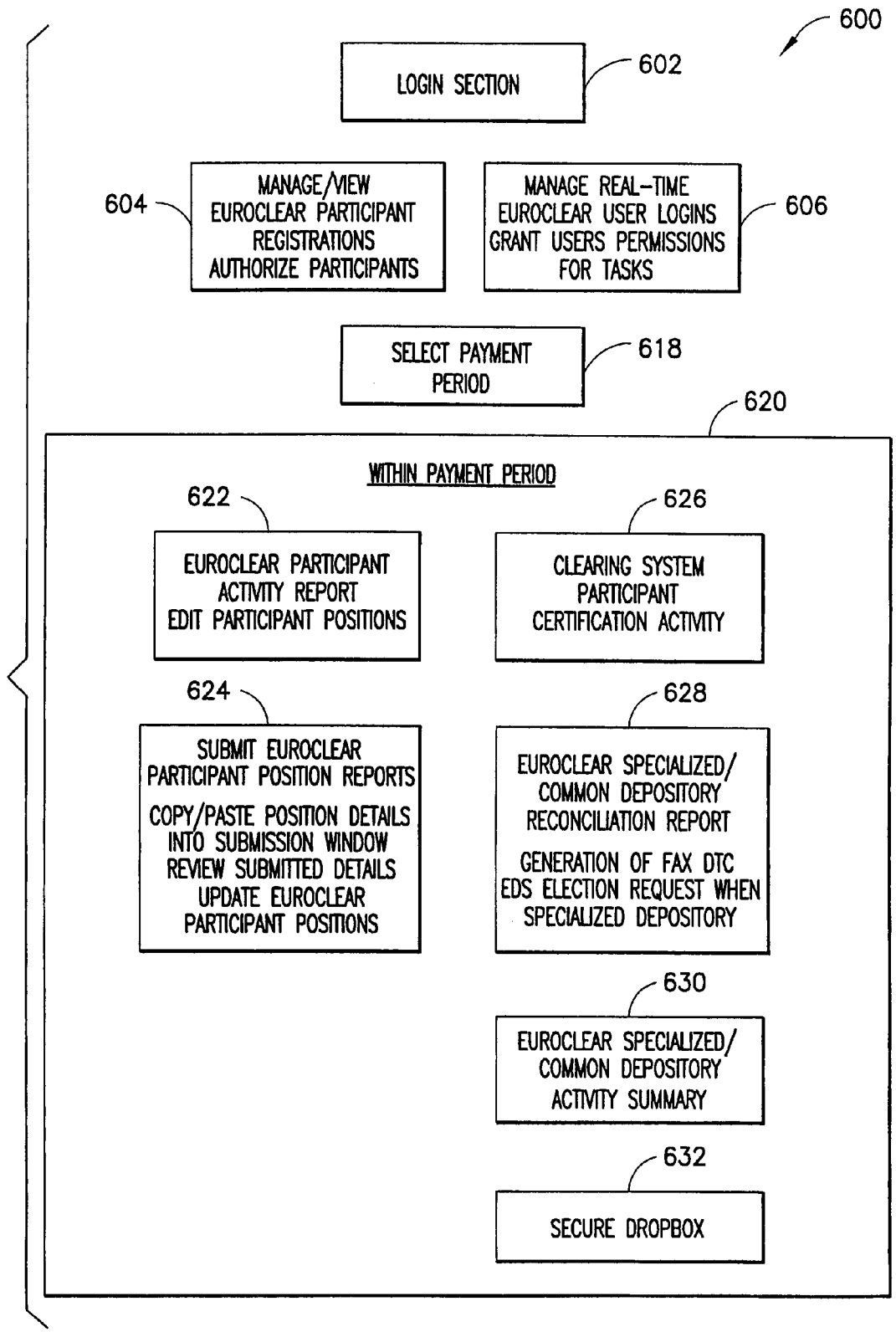
FIG. 6 depicts an exemplary Real-time Euroclear Portal of an exemplary reporting facet according to an exemplary embodiment of the present invention.

Turning now to FIG. 6, a Real-time Euroclear Portal 600 is illustrated. This Real-time Portal allows Euroclear to access all Tax Certification activity that is taking place or has taken place with regard to any Euroclear Participant. Using this portal, at the request of the issuer, Euroclear must provide periodic reports of the positions of its Participants in the Eligible Securities, which are used to validate the submissions of the Participants. Euroclear is able to inspect all the submissions made by its Participants, down to the investors whose identity and tax status information is being submitted by Participants along with executed copies of Tax Certificates. Euroclear can also view the confirmations of the positions it is holding through either its Common Depository or its Specialized Depository, depending on whether the Eligible Securities are issued through DTC (the latter) or via a Common Depository into the ICSDs (the former).

The Real-time Euroclear Portal includes a Login section 602, where Euroclear can log in to access the Real-time Portal. The Euroclear Participant Registration Confirmation section 604 allows Euroclear to manage the registrations of all Euroclear Participants, including allowing Euroclear to selectively approve which such Participant registrations are allowed at any given time to make Acupay Submissions. An Authorized Real Time User's section 606 allows Euroclear to manage its own set of user logins and privileges, including which Euroclear staff have access to what portions of the system. A Select Payment Period Section 618 presents Euroclear with a tool for identifying the Eligible Security and corresponding Payment Period Euroclear would like to review or submit reports on—all information being organized within the system by Payment Period.

Once inside a Payment Period 620, the first section is the Euroclear Participant Activity Report 622, which allows Euroclear to see all of the Tax Certification activity of its Participants. This section also enables the submission of the required periodic Euroclear Participant position reports, or allows the updating of the position for each Participant by hand. In the event nothing has changed, the user can simply update the date and time of the existing position information with the notion that there has been no change.

As indicated at box 626, the Clearing System Participant Certification Activity section allows Euroclear to see any Tax Certification activity across all Euroclear Participants, not just ones with positions in the Eligible Securities in question. This is useful if a Participant who does not hold a particular Eligible Security tries to submit Tax Certification information, which will be clearly visible from this section.

The Euroclear and Specialized Depositary/Common Depositary Reconciliation Report section 628 compares the aggregate positions reported by Euroclear on behalf of their own Participants in an Eligible Security against the ICSD position reports submitted by its Specialized or Common Depository. The aggregate amounts must all agree or the entire Euroclear position will be treated as not tax exempt on the Income Payment Date due to a lack of certainly as to whose entitlements are to be paid such income.

The Specialized Depositary Activity Summary 630 shows slightly more detail than the Euroclear and Specialized Depositary/Common Depositary Reconciliation Report section 628, and contains information on the amount of Tax Certifications submitted by Euroclear Participants, amounts to be withheld, amount of DTC EDS elections necessary for each Eligible Security, and contains a button on the GUI for Euroclear to generate a fax instruction to sign and fax to the Specialized Depository requesting that the necessary DTC EDS elections be made on a certain time frame.

The Secure Dropbox section 632 allows Euroclear to transmit to Acupay any document or file required in the course of business over a secure SSL connection.

An interface (the "Euroclear Real-Time System") is provided at box 624 where a user such as, for example, Euroclear Bank, S.A./N.V. (a/k/a "Euroclear") may log into the system for various activities. These include the viewing in real-time the status of any live Tax Certification activity taking place for any Eligible Securities nearing a coupon payment, limited to the ability to see the holdings of Euroclear Participants, and any exchange election activity when appropriate. Also included is the ability to submit periodic Euroclear Participant Position Reports, updating the positions recorded in the system as being held by such Participants for validation purposes. Another activity provided for is to generate, open and print a fax direction from Euroclear to its Specialized Depositary for Eligible Securities on deposit with DTC, requesting such Specialized Depositary to submit to DTC an EDS election as specified in such fax direction on behalf of the portion of said Specialized Depositary's position in said Eligible Security in their account at DTC. The systems also allows the viewing of the status of the ICSD Position Reports periodically submitted on behalf of Euroclear by Euroclear's Specialized Depositary for Eligible Securities on deposit with DTC, stating all of Euroclear's aggregate holdings in the Eligible Security. Administration of a set of Euroclear representative accounts is also provided. These accounts are provided with access to log in on Euroclear's behalf and view and submit the above various types of data.

Figure 7:
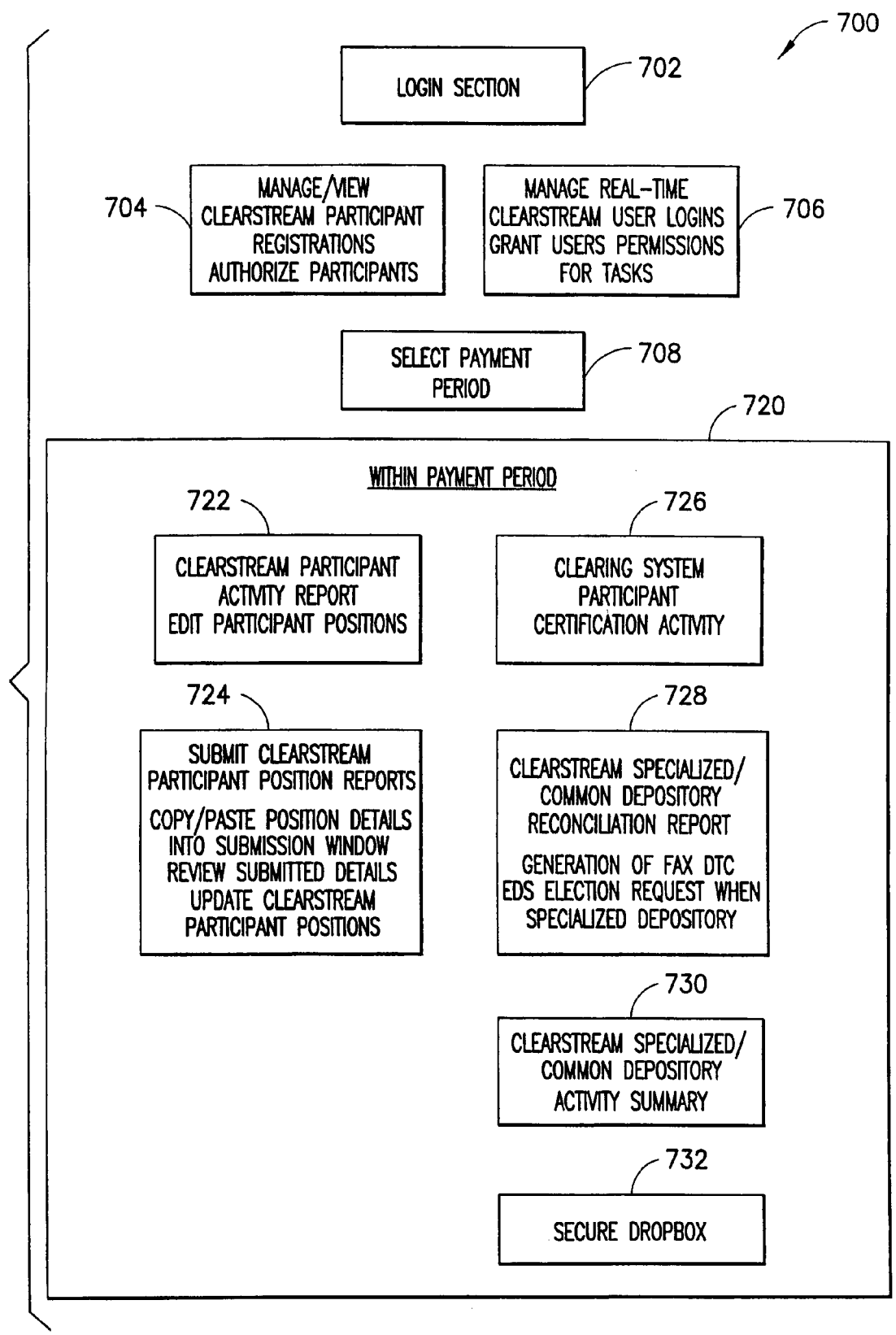
FIG. 7 depicts an exemplary Real-time Clearstream Portal of an exemplary reporting facet according to an exemplary embodiment of the present invention.

FIG. 7 shows the Real-time Clearstream Portal, generally designated 700. This Real-time Portal allows Clearstream to access all Tax Certification activity that is taking place or has taken place with regard to any Clearstream Participant. Using this portal, at the request of the issuer, Clearstream must provide periodic reports of the positions of its Participants in the Eligible Securities, which are used to validate the submissions of the Participants. Clearstream is able to inspect all the submissions made by its Participants, down to the investors whose identity and tax status information is being submitted by Participants along with executed copies of Tax Certificates. Clearstream can also view the confirmations of the positions it is holding through either its Common Depository or its Specialized Depository, depending on whether the Eligible Securities are issued through DTC (the latter) or via a Common Depository into the ICSDs (the former).

The subsections of the Real-time Clearstream Portal commence with a Login section 702, where Clearstream can log in to access the Real-time Portal. The Clearstream Participant Registration Confirmation section 704 allows Clearstream to manage the registrations of all Clearstream Participants, including allowing Clearstream to selectively approve which Participant registrations are allowed at any given time to make Acupay Submissions. The Authorized Real Time User's section 706 allows Clearstream to manage its own set of user logins and privileges, including which Clearstream staff have access to what features of the system. The Select Payment Period Section 708 presents Clearstream with a tool for identifying an Eligible Security and the corresponding Payment Period Clearstream would like to review or submit reports for. As noted above, all information is organized within the system by Payment Period.

Once inside a Payment Period 720, the first section is the Clearstream Participant Activity Report 722, which allows Clearstream to see all of the Tax Certification activity of its Participants, as well as submit its required periodic Clearstream Participant position reports. The position for each Participant can also be updated by hand, or, if nothing has changed, the user can simply select the date and time of the existing position information with the notion that there has been no change.

The Clearing System Participant Certification Activity section 726 allows Clearstream to see any Tax Certification activity across all Clearstream Participants, not just ones with positions in the Eligible Securities in question. This could be useful if a Participant who does not hold a particular Eligible Security tries to submit Tax Certification information, which would be clearly visible from this section. The Clearstream and Specialized Depositary/Common Depositary Reconciliation Report section 728 compares the aggregate positions reported by Clearstream on behalf of its own Participants in an Eligible Security against the ICSD position reports submitted by its Specialized or Common Depository. The aggregate amounts must all agree or the entire Clearstream position will be treated as not tax exempt on the Income Payment Date, due to a lack of certainly as to whose entitlements are to be paid such income.

The Specialized Depositary Activity Summary 730 shows slightly more detail than the Clearstream and Specialized Depositary/Common Depositary Reconciliation Report section 728, and contains information on the amount of Tax Certifications submitted by Clearstream Participants, amounts to be withheld, amount of DTC EDS elections necessary for each Eligible Security, and contains a GUI button for Clearstream to generate a fax instruction to sign and fax to the Specialized Depositary requesting that the necessary DTC EDS elections be made on a certain time frame. The Secure Dropbox section 732 allows Clearstream to transmit to Acupay any document or file required in the course of business over a secure SSL connection.

An interface 724 (the "Clearstream Real-Time System") is provided, where, e.g., Clearstream International Luxembourg (a/k/a "Clearstream") may log into the system to perform various activities. These include: (i) viewing in real-time the status of any live Tax Certification activity taking place for any Eligible Securities nearing a coupon payment, limited to the ability to see the holdings of Clearstream Participants, and any exchange election activity when appropriate; (ii) submitting periodic Clearstream Participant Position Reports, updating the positions recorded in the system as being held by such Participants for validation purposes; (iii) generating, opening and printing a fax direction from Clearstream to its Specialized Depositary for Eligible Securities on deposit with DTC requesting such Specialized Depositary to submit to DTC an EDS election as specified in such fax direction on behalf of the portion of said Specialized Depositary's position in the Eligible Security in their account at DTC; (iv) viewing the status of the ICSD Position Reports periodically submitted on behalf of Clearstream by Clearstream's Specialized Depositary for Eligible Securities on deposit with DTC, stating all of Clearstream's aggregate holdings in the Eligible Security; and (v) administering a set of Clearstream representative accounts that have access to log in on Clearstream's behalf and viewing and submitting the above various types of data.

A Real-time Common Depository Portal is provided to allow the Common Depository to submit periodic ICSD position reports stating the aggregate positions of both Euroclear and Clearstream in the Eligible Securities. Such reports are used to validate the submissions of the ICSDs. The subsections of the Real-time Common Depository Portal include a Login section, where the Common Depository would log in to access the Real-time Portal, and an Authorized Real Time User's section that allows the Common Depository to manage its own set of user logins and privileges, including which Common Depository staff have access to what. A Select Payment Period Section presents the Common Depository with a tool for identifying an Eligible Security and corresponding Payment Period the Common Depository would like to submit reports on. All information is organized within the system by Payment Period.

Once inside a Payment Period, a Common Depositary Interface is provided for Euroclear. This allows the Common Depository to see the current status of its ICSD position reports for Euroclear, and submit updated ICSD position reports on the required schedule. A Common Depositary Interface for Clearstream is exactly the same as the Common Depositary Interface for Euroclear, except it is used by Clearstream. A Secure Dropbox section allows the Common Depositary to transmit to Acupay any document or file required in the course of business over a secure SSL connection.

Figure 8:
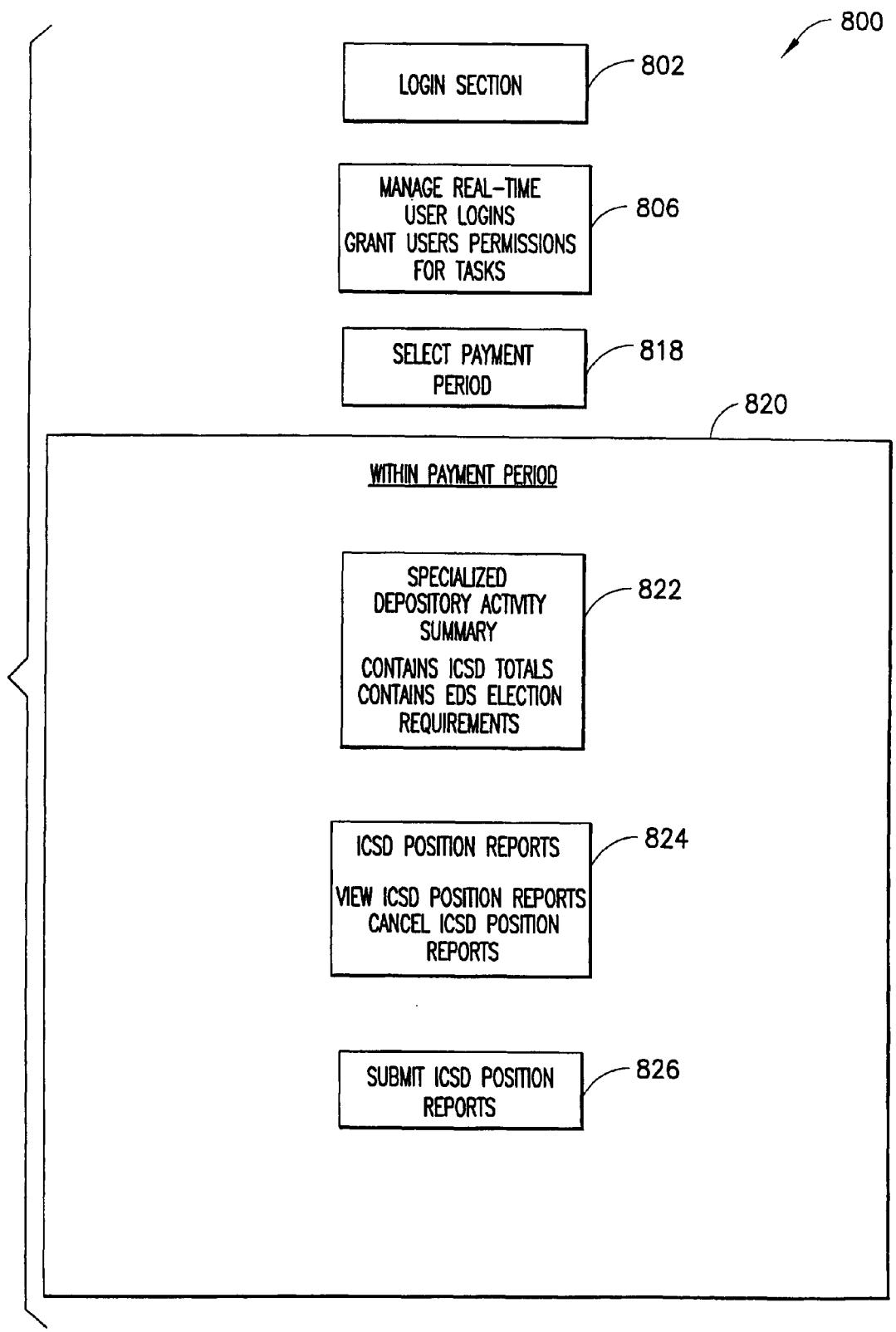
FIG. 8 depicts an exemplary Specialized Depository Portal of an exemplary reporting facet according to an exemplary embodiment of the present invention.

FIG. 8 illustrates a Real-time Specialized Depository Portal 800. This Real-time Portal allows the Specialized Depository to submit periodic ICSD position reports stating the aggregate positions of either Euroclear or Clearstream in the Eligible Securities. Such reports are used to validate the submissions of the ICSDs.

The Real-time Specialized Depository Portal includes a Login section 802, where the Specialized Depository would log in to access the Real-time Portal. The Authorized Real Time User's section 806 allows the Specialized Depository to manage its own set of user logins and privileges, including which Specialized Depository staff have access to which features of the system. A Select Payment Period Section 818, presents the Specialized Depository with a tool for identifying an Eligible Security and corresponding Payment Period the Specialized Depository would like to submit reports on. As before, all information is organized within the system by Payment Period.

Once inside a Payment Period 820, the first section is the Specialized Depositary Activity Summary. This summary contains information on the amount of Tax Certifications submitted by ICSD Participants, amounts to be withheld, and amount of DTC EDS elections necessary for each Eligible Security. Any necessary DTC EDS elections must be made on a certain time frame. An ICSD Position Reports section 824 allows the Specialized Depository to submit the required ICSD position reports 826, or delete existing ones.

A Real-time Calculation Agent Portal is also provided to allow the Calculation Agent to log into each Payment Period and verify that the financial and mathematical details are all correct. The Real-time Calculation Agent Portal comprises a Login section, where the Calculation Agent would log in to access the Real-time Portal. An Authorized Real Time User's section allows the Calculation Agent to manage its own set of user logins and privileges, including which Calculation Agent staff have access to what features of the system. A Select Payment Period Section is provided, where the Calculation Agent is presented with a tool for identifying the Eligible Security and corresponding Payment Period the Calculation Agent would like to verify the details of. As already indicated, all information is organized within the system by Payment Period.

Once inside of a Payment Period, the Calculation Agent is presented with the Payment Period Verification section, which contains all of the financial and timing details relating to the coupon payment to be, or that was made as part of such Payment Period. This includes the details of each Eligible Security included in the payment period, and such details as the number of days of income to be paid on the Income Payment Date, the nature of each Eligible Security (e.g., fixed rate, floating rate, etc.), and the interest rate on which each Eligible Security should be paid. All such information must be reviewed and confirmed by the Calculation Agent before the Payment Period can go live.

A Cognitrax Real-time Reporting System can also be provided. This Real-time Reporting System would allow the working group appointed by the issuer to assist in the underwriting of Eligible Securities and review information about the investors in the Eligible Securities. A Login section would enable the users to log in to access the Cognitrax Real-time Reporting System. A Cognitrax Summary Page would show an overview of all Eligible Securities held, along with breakdowns of the various types of entities holding such Eligible Securities, further broken down by each Eligible Security making up a group of Eligible Securities of the same issuer. Links could be provided to a number of reports showing ownership status as well as interactions with the investors.

A Flag Account Summary can be provided where investors that have been identified and selected for special attention are easily accessed from one place. Generally, investors are flagged if it is believed they are somehow ineligible to receive exemption from income withholding for the positions in the Eligible Securities that they hold. A Participant Totals and Participant Positions report can also be provided listing all the clearing system Participants holding positions in the Eligible Securities, as well as information about their Tax Certification and Election activity, as appropriate.

Other reports that can be provided in the Reporting Facet include Participant Detail reports, showing investors holding through such Participant accounts. Also, Certification Activity reports can be provided, showing live investor Tax Certification activity linked from the Acupay System. A Certification Detail report can be provided showing for any Tax Certification record selected, the actual Tax Certification Data and image of the executed Tax Certificate from the Acupay System corresponding to such data. A Managing Entities report could show investors listed according to managing entities, or the entities that may make decisions for several individual Beneficial Investor entities (such as mutual funds) and act on behalf of the whole group of such entities. An Individual Positions report can be provided to show all investor positions, free of association with any managing entity, and show the status of Tax Certification activity in the Acupay System. A Position Detail report would show the full detail of an investor position, along with any contacts on record for that investor and any notes that have been entered into the system about such investor.

III. The Administration Facet

In exemplary embodiments of the present invention, an Administration Facet 140 (FIG. 1) can comprise an Administration System 142 of interfaces and control mechanisms which allow all Facets of the invention to function as intended, and to be monitored and administered. This facet could include a List of Deals (e.g., Acupay list of deals) that contains the top-level list of all groups of Eligible Securities currently served by the Acupay System. The list would show, for each Deal, the Issuer who issued the Eligible Securities which comprise the Deal, the country under whose tax regulations the Deal falls (e.g., Spain), and the Deal "Type" (e.g., "Tax Certification" or "Tax Certification and Extension Election", for Eligible Securities that are also extendible securities, etc). The term "Deal" pertains to an agglomeration of Eligible Securities issued by the same issuer as part of the same underwriting effort and with substantially similar characteristics, i.e., they pay income on the same dates.

A Deal Detail page can be provided, which would be accessible, for example, by clicking on any Deal in the List of Deals. This page would contain a number of elements that define the Deal in question including the name of the Deal, the Issuer of the Eligible Securities which comprise the Deal, the Guarantor of those Eligible Securities, the Details of each such Eligible Security, including the ISIN number or CUSIP number of the security, the type of security (e.g., Fixed Rate Note, Floating Rate Note, Extendible Note, Preferred Share, etc.), the maturity date of the security, the fixed interest rate of the security (if applicable), and other financial details such as the frequency of income payments and the specific methodology employed for calculating income for the security in question. Other information that can be provided includes a list of clearing system Participants who have been authorized to make submissions based on positions in the Eligible Securities that comprise the Deal, a list of Real-time users who have been granted access through their Real-time Portals to their respective functions therein implied with respect to the Deal, a list of locations where business closings for holidays, etc. impact upon the Deal, and certain financial and other documents pertaining to the maintenance of the Deal within the Acupay System.

Within each Deal Detail is a List of Payment Periods that have been scheduled within the system according to the frequency and natural schedule upon which the Eligible Securities comprising the Deal make periodic coupon payments. Clicking on any Payment Period shown in the List of Payment Periods for a Deal opens the Payment Period Detail page for such Payment Period. As the entire Acupay System in many ways revolves around and is organized according to Payment Periods, the Payment Period Detail page contains a very significant amount of functionality with regard to driving the various components of the greater Acupay System. Each such Payment Period must be created in the system by an operator or administrator of the system using the "Add a Payment Period" tool within each Deal Detail page. The Add a Payment Period tool uses the functional description of the Deal to pre-populate a number of data elements such as deadline dates for submission of Tax Certificates and Income Payment Dates for the Deal.

For Deals that contain Eligible Securities that are Floating Rate securities (i.e., the interest rate at which they pay income on a periodic basis changes on a schedule tied to the schedule of payments and is usually defined as a rate derived from adding a certain fractional rate to some other benchmark rate), a Calculation Agent must supply a Rate-Fixing Notice a certain number of weeks prior to any upcoming Income Payment Date around which a Payment Period would be defined. A Payment Period constitutes both the period of time leading up to, and surrounding any give Income Payment Date, as well as the functional activity of the Acupay System that must accompany the processing of Tax Certification and payment of income on such Income Payment Date and such period following such Income Payment Date. For the case of Quick Refund periods (which follow the Income Payment Date and extend until the $10^{th}$ calendar day of the month following such Income Payment Date), such a Rate-Fixing Notice contains the interest rates and the number of days of interest upon which any such Floating-Rate Securities will pay income on the Income Payment Date. This and other important Payment Period information is gathered together and combined into a Payment Period record within the Deal Detail of the Acupay Administration System.

Each Payment Period must be Validated independently by three parties, namely, Acupay, the Issuer of the corresponding Eligible Securities, and the Calculation Agent or the Paying Agent involved in the Deal. The Payment Period cannot be made active, and no Participants may access or submit Tax Certifications attributable to a Payment Period until all such parties have Verified the details of the Payment Period. This includes all details described above such as the ISIN/CUSIPs of the Eligible Securities involved, the interest rates that such Eligible Securities will pay, the deadline dates and times governing such Payment Period, etc.

Within each Payment Period Detail there are, in addition to the Verification and the Payment Period Details described above, sections where clearing system notices may be automatically generated and archived. Such notices must be distributed via all involved clearing systems prior to payment. Also within each Payment Period Detail are links to all of the functional components of the Payment Period, including links to the DTC, Euroclear and Clearstream Participant Tax Certification and Position Activity Reports, DTC EDS Election and ATOP/APUT Extension Management, Summary and Payment Direction Reports, various settlement reports (which constitute instructions to pay certain parties certain amounts, withhold certain amounts of income, in certain cases, withhold certain amounts of exchange securities for sale, etc.), and a number of other functionally important Administrative resources. The DTC, Euroclear and Clearstream Participant Activity reports serve as the functional core of administering the Acupay System, and allow a constant real-time window into the current status of the Payment Period.

In accordance with the invention, a Barcoded Documents section serves as the central administration facility for receiving and reviewing all faxed and emailed barcoded documents. Such documents include, for example, Tax Certificates as well as some other documents such as Certificates of Tax Residence used during the Quick Refund process. A Barcoded Document Detail shows the image of a received Barcoded Document, as well as the relevant meta-data, such as when the files were received, and the unique reference numbers to which it has been linked by a Barparse Component via Acupay Barcodes embedded in the document.

A number of additional elements are provided in the Administrative Facet of the system. For example, with regard to Acupay-eligible securities that require the use of either a government issued certificate of tax residence library or an eligibility letter library, a Government Tax Certificates section and/or an Eligibility Letters section would contain a graphic user interface (GUI) allowing for the efficient and information rich navigation of the documents and information stored and maintained in such libraries—a Document Library Interface. Such Document Library Interfaces would allow for the automated lookup of certain information relating to the documents it contains, as well as keeping track of any expiration date of such documents and facilitating their renewal.

IV. Processing and Storage Facet

In exemplary embodiments of the present invention, a Processing and Storage Facet 120 (FIG. 1) can comprise, for example, a system of programming components, database structures and components, and data and communication processes which drive the other Facets of the present invention. These components are illustrated more particularly in FIG. 1 as a fax-to-email component 122, a barparse component 124, and a database/processing component 126.

As part of the registration process for each authorized representative and the Account Coordinator, a security login credential is defined, which is composed of the email address of the authorized representative or Account Coordinator and a strong alphanumeric password. All of the information comprising the registration details of the authorized representatives of the Participant is stored in the Authorized Representative Database and the Security Login Credential Database, both subsets of the "Participant Registration Database", a database component of a larger relational database 126 that is designed to capture and store Participant Registration Data introduced into the system. Also provided is a database component of the larger relational database 126 that is designed to capture and store Beneficial Investor Data introduced into the system (the "Tax Certificate Submission Database"). A further database component of the larger relational database is designed to capture and store Tax Certificate data and meta-data introduced into the system (the "Tax Certificate Generation Database").

The system is also provided with a component 122 that receives fax transmissions and converts them into email messages with the body of the original fax saved into an attached electronic computer image file (the "Fax-to-Email Component"). A further component of the system operates an email account set up specifically for the purpose of receiving scanned and faxed images of Barcoded Tax Certificates (the "Email Drop-Box Component"). Another component of the system is provided to receive messages sent to the email Drop-Box, analyze their content, detect and read the Acupay Barcodes embedded within the image files, and insert the corresponding data as well as binary copies of the complete image files and corresponding email files into the database system (the "Barparse Component"). The system also includes a database component of the larger relational database that is designed to capture and store images of received Tax Certificates in binary form. These images are captured and stored along with the email messages in which they were received in binary form and related meta-data concerning both the original generation of the Tax Certificate by the Tax Certificate Generation Component as extracted from the contents of the embedded Acupay Barcode(s). In addition, the Barparse Component receives and processes the executed Tax Certificate (the "Barparse Tax Certificate Database").

An email address and account is provided and used for the purpose of receiving electronic computer image files which contain images of executed Tax Certificates transmitted to such account by the authorized representatives of the Participants. The transmission can be effected either via fax-to-email, or via scan-to-email transmission (the "Email Dropbox"). The Email Dropbox is polled on a predetermined schedule by a processing program, whose function is to check the Email Dropbox for messages and process those messages. Specifically, the Barparse Component 124 uses this processing program to poll the Email Dropbox on a predetermined schedule, currently once per minute, to determine if the Email Dropbox has received any email message transmissions. If the Email Dropbox contains email message transmissions, the Barparse Component 124 collects the email message transmissions and deposits them into a temporary email-processing database. Once moved to the email-processing database, the Barparse Component 124 sequentially strips the attachments from the email messages and examines them to determine the file type. Any files that are not electronic computer image files are discarded.

Once the Barparse Component 124 has determined the nature of an attached file to be an electronic computer image file, it initiates a sub-component (the "Acupay Barcode Scanning Routine") that uses computer graphics techniques to scan the file for an image of an Acupay Barcode Array. Each Acupay Barcode Array contains a pattern of, for example, five individual Acupay Barcodes. Such a pattern of barcodes is illustrated at 1404 in FIG. 14B. Each Acupay Barcode 1404 contains the complete encoded unique reference number of the Tax Certification submission of electronic investor and income data entered into the system by the authorized representative of a Participant. This data is stored in the system memory along with the unique reference number for identification, as well as the unique reference number of the specific version of the Tax Certificate generated by the system based on such investor and income data. An example Tax Certificate 1401, 1402 is illustrated in FIGS. 14A and 14B. The complete encoded unique reference number is referred to in FIG. 14A as the "Acupay Reference #." Also included in the Tax Certificate is compliance text 1406 and an execution (e.g., signature) space 1408.

The Acupay Barcode Array contains five such Acupay Barcodes 1404 for the purpose of ensuring that even if a segment of a fax or email transmission containing a Barcode Array is cut-off or not completely received, as long as one of the five Acupay Barcodes is received, all the information necessary to identify the Tax Certificate and underlying investor and income data is supplied. If the Barcode Scanning Routine does not detect at least one Acupay Barcode within the file, the file is discarded and an error message is generated by the Barparse Component and transmitted via email to the system operators. If an Acupay Barcode is detected, the Barparse Component reads the Acupay Barcode and extracts from it the unique reference numbers encoded within it. The Barparse Component then converts both the electronic computer image file containing an image of a now-identified Tax Certificate and the entire email message in which such electronic computer image file was conveyed to the Email Dropbox into binary data representing the complete electronic embodiment of such items. This data is written into a Tax Certificates Database, along with both sets of unique reference numbers as read from the Acupay Barcode, together with other meta information such as the date and time of receipt.

Once the record containing the image of the executed Tax Certificate in binary form (along with the unique reference numbers derived from the image and the binary form of the email message in which the image was transmitted) is introduced (e.g., via the Tax Certificates Database) into the system together with the date and time of receipt, the system instantly links this image of the executed Tax Certificate with the data used to generate the Tax Certificate and now contained within the executed Tax Certificate. Together, the Tax Certification Data and the image of the executed Tax Certificate comprise an Executed Tax Certification.

The moment that a Tax Certification session is completed, and Tax Certification Data is initially introduced into the system, the Tax Certification Data and the details of the submission of this data by the Participant are visible to various parties using the system. These include the operators of the system, the Participant that submitted the data, and the issuer of the Eligible Securities to which the data relates. At the moment when an executed Tax Certificate is linked to an existing record of Tax Certification Data, thereby forming an Executed Tax Certification, it is instantly visible to all such parties who, in addition to viewing the Tax Certification Data making up the Executed Tax Certification, may also immediately view the image of the executed Tax Certificate itself. The net effect of the Executed Tax Certification is that the system is populated with the data written on the executed Tax Certificate without any manual re-key-entry of such data being necessary. This data was, in fact, already stored in the system prior to the generation and the signing of the Tax Certificate, and is simply activated by the delivery of the executed Tax Certificate into the system. The operators of the system and the issuer of the Eligible Securities—the issuer being the party to which the certification by the Participant contained within each Tax Certificate is made—visually inspect each such image of each Tax Certificate to confirm that it is complete and duly executed.

With regard to exemplary embodiments of the Acupay system where, for example, the system would be used to facilitate requests by, for example, holders of common stock (which outside of the USA is called ordinary shares) or receipts issued with respect thereto and representing interests therein (i.e., stockholders) for reduced rates of withholding tax, and in which case Acupay submissions would be used in the collection and organization of the requisite government issued certificates of tax residence, and where for example such government issued certificates of tax residence would be collected and organized using similar methods and technology as described herein for the collection and organization of tax certificates, such as, for example, employing tracking elements such as barcodes to electronically match physical scans or faxes of the government issued certificates of tax residence to the corresponding data submitted into and/or stored within the Acupay system, such government issued certificates of tax residence would be stored in a subsection of the Processing and Storage Facet 120. This subsection may be referred to, for example, as the Government-Issued Certificate Library System. The Government-Issued Certificate Library System would allow for the efficient organization and tracking of government issued certificates of tax residence and would allow for the maintenance and continuous upkeep of the government issued certificates of tax residence submitted on behalf of the relevant stockholder community. Immediate real-time access to those government-issued certificates maintained within the library by Issuers or other parties can be provided as needed. The process of scheduling and automating renewal of the government issued certificates when they expire (e.g., on an annual basis) can also be accommodated by the system. This Government-Issued Certificate Library System would allow for requests for reductions in withholding rates to, for example, treaty-reduced levels to be accomplished semi-automatically and without the need to transmit and refresh the government issued certificated of tax residency required to secure the acceptance of such a request upon each request, and would therefore streamline and semi-automate the periodic process of requesting such withholding rate reductions on behalf of relevant stockholders. A more detailed description of a Government-Issued Certificate Library System which would be used in the case of stockholders or certain other investors is provided hereinafter.

With regard to exemplary embodiments of the Acupay system where, for example, the Acupay system would be used to establish and monitor the eligibility of certain investors to invest in certain unlisted and/or restricted securities, the eligibility of such investors being determined in some way via the execution and filing of some form of eligibility letter collected and organized using similar methods and technology as described herein for the collection and organization of tax certificates (e.g., employing tracking elements such as barcodes to electronically match physical scans or faxes of the eligibility letters to the corresponding data submitted into and/or stored within the Acupay system), such eligibility letters can be stored in a subsection of the Processing and Storage Facet 120 which would be called, for example, the Eligibility Letter Library System. A more detailed description of an Eligibility Letter Library System which would be used to grant or confirm such described eligibility status is set forth hereinafter.

Narrative of an Exemplary Functioning of the System

The present invention consists of a body of systems and databases including an interface wherein banks, brokerage firms and other financial intermediaries (the "Participants") must register or be registered (the "Participant Registration System") and granted access to another system, the Tax Certification Submission System. When Participants register or are registered in the Participant Registration System, information about the Participant that is necessary both to confirm the identity of the Participant as well as information about the Participant that is necessary to be included within the Tax Certificates later generated by the Tax Certification Submission System is collected and stored in a Participant Registration Database. The Participant must provide the details of any clearing system account(s) through which it holds securities—i.e., the Participant's account number(s) with the Depository Trust Company (a/k/a "DTC"), Euroclear, Clearstream, or some other International Central Securities Depositary (a/k/a "ICSD") or domestic Central Securities Depository (a/k/a "CSD"). This information will be necessary to verify that positions in securities later identified by the Participant correspond to the records of the clearing system(s) through which such Participant holds the securities, for verification purposes.

In addition, when a Participant registers it must nominate one or more of its employees as authorized representatives who will have access to the account of the Participant and may log into the Tax Certification Submission System as the Participant for the purpose of submitting Tax Certifications on behalf of the Participant or reviewing existing Tax Certifications submitted on behalf of the Participant. The first such authorized representative identified by a Participant shall serve in the role of Account Coordinator for that Participant and approve or deny access to the account of the Participant by additional authorized representatives registered by the Participant.

All Participants who hold an interest-bearing or preferred equity security subject to Spanish Law 19/2003 or other country's similar law (an "Eligible Security") on behalf of an investor must be registered in the system and must, within the period of time between a Record Date and an Income Payment Date for such Eligible Security (the "Certification Period") generally consisting of 15 calendar days, log into the Tax Certification Submission System and provide the identity, tax status information, and amount of securities held on behalf of the investor being identified. Part of the process of providing the identity and tax status information involves specifying whether the investor is an individual person or a corporate entity, or if the investor is the Participant itself. The country or territory where the investor is resident for tax purposes must also be specified. The system then runs a series of checks against a database of restricted countries and territories on whose behalf Tax Certifications cannot be made (e.g., investors located in countries or territories identified by the Spanish Tax Authorities as "Tax Haven Countries") and either issues a warning indicating that the submission cannot proceed or allows the Participant to continue with the Tax Certification Submission. When the Participant indicates the amount of Eligible Securities held on behalf of the investor being identified, it also requires the Participant to supply the clearing system and clearing system account number where the securities are held on behalf of the investor, as well as some additional validation information that only the Participant should know. The amount held on behalf of the investor as well as this validation information is checked against data provided by the clearing systems and the system either issues a warning indicating that the submission cannot proceed due to misalignment in the data or allows the Participant to continue with the Tax Certification Submission.

Once all of this information (the "Tax Certification Data") has been correctly supplied on behalf of an investor, and a few legal confirmations are made, a unique reference number is generated to identify the submission in the system and the system produces a form of Tax Certificate of either type I, type II, or type III, all consistent with the requirements of the applicable (e.g., Spanish) Tax Authorities. Type I Tax Certificates are generated on behalf of investors when the investor is the Participant itself who is submitting the information and signing the Tax Certificate. Type II Tax Certificates are generated on behalf of investors who are individuals or corporations outside of the taxing jurisdiction (e.g., Spain). Type III Tax Certificates are generated on behalf of investors who are corporate entities resident for tax purposes in the taxing jurisdiction (e.g., Spain).

Under Spanish Law 19/2003, the Tax Certificates are required to contain the identity, tax status, and amount of income to be paid to investors in the Eligible Securities resulting from each coupon payment. The Spanish Tax Authorities require the information to be accurate at the moment the income payment is made, and the Tax Certificates are all dated as of the Income Payment Date regardless of which day of the Certification Period they are produced. It is the obligation of each Participant to ensure that the Tax Certifications made are updated as necessary to reflect any changes to the identity or status of the investors throughout the Certification Period, which they can easily do through the system, as will be described later.

Importantly, the Tax Certificates generated by the system (the only Tax Certificates allowed to be used for Eligible Securities where the system has been implemented) are imprinted with same unique reference number generated when the underlying data used to generate the Tax Certificate is stored in the database. This unique reference number links the Tax Certificate to the matching electronic records stored within the system. The Tax Certificates contain the details of the Participant and the identity of the authorized representative who triggered the system to generate the Tax Certificate. Within the Tax Certificate is a statement that must be executed by the authorized representative of the Participant certifying that the information contained within said Tax Certificate is accurate and correct, as is necessary to satisfy the requirements of Spanish Law 19/2003. Additionally, the Tax Certificate contains an array of five system-generated two-dimensional barcodes (each an "Acupay Barcode", one or more Acupay Barcodes constituting the "Acupay Barcode Array") within which are encoded both the unique reference number identifying the database record from which the Tax Certificate has been generated (containing the relevant investor and income information) as well as an additional unique reference number specifically identifying this version of the Tax Certificate itself. An example five-barcode array is illustrated by the five barcodes 1404 in FIG. 14B. The Participant must print out this Tax Certificate and sign it to certify the accuracy of the information it contains. Then, the participant must either fax the executed certificate to a fax number printed on the Tax Certificate or scan it into a computer image file and email it to an email address printed on the Tax Certificate. The fax number used for this purpose is routed to a fax-to-email service. This service receives the incoming fax transmission and, instead of translating the document image information contained in said transmission onto a printed "fax" document, the service stores the document image information as an electronic computer image file. The computer image file is then transmitted as an attachment to an email to an email address and account residing on a server that is a component of the computer system of the present invention. This system email account is created exclusively for the receipt of such electronic computer image files. Should the authorized representative of the Participant choose to email a scanned electronic computer image file that they themselves have scanned, they will also email the file to the system email address and account.

The email address and account used for the purpose of receiving electronic computer image files which contain images of executed Tax Certificates transmitted by the authorized representatives of the Participants either via fax-to-email, or via scan-to-email transmission (the "Email Dropbox") is polled on a predetermined schedule by a processing program whose function is to check the Email Dropbox for messages and process those messages. Specifically, said program (the "Barparse Component"), polls the Email Dropbox on a predetermined schedule, such as once per minute, to determine if the Email Dropbox has received any email message transmissions. If the Email Dropbox contains email message transmissions, the Barparse Component collects the emails and deposits them into a temporary email-processing database. Once moved to the email-processing database, the Barparse Component sequentially strips the attachments from the email messages and examines them to determine the file type. Any files that are not electronic computer image files are discarded. Once the Barparse Component has determined the nature of an attached file to be an electronic computer image file, it initiates a sub-component (the "Acupay Barcode Scanning Routine") that uses computer graphics techniques to scan the file for an image of an Acupay Barcode Array.

In a preferred embodiment, each Acupay Barcode Array contains a pattern of five individual Acupay Barcodes. Each barcode contains the complete encoded unique reference number of the Tax Certification submission of electronic investor and income data entered into the system by the authorized representative of a Participant and stored in the system along with the unique reference number for identification, as well as the unique reference number of the specific version of the Tax Certificate generated by the system based on the investor and income data. The use of an array of five identical barcodes ensures that even if a segment of a fax or email transmission containing a Barcode Array is cut-off or not completely received, all the information necessary to identify the Tax Certificate and underlying investor and income data will be available as long as one of the barcodes can be read. This redundancy provides a very efficient and accurate system.

If the Barcode Scanning Routine does not detect at least one Acupay Barcode within a received Tax Certificate file, the file is discarded and an error message is generated by the Barparse Component for transmission via email to the system operators. If an Acupay Barcode is detected, the Barparse Component reads the Acupay Barcode and extracts the unique reference numbers encoded within it. The Barparse Component then converts both the electronic computer image file containing an image of a now-identified Tax Certificate and the entire email message in which the electronic computer image file was conveyed to the Email Dropbox into binary data representing the complete electronic embodiment of such items. This binary data is then written into a Tax Certificates Database along with both sets of unique reference numbers as read from the Acupay Barcode, as well as other meta information such as the date and time of receipt.

The resultant record of the transaction will contain the image of the executed Tax Certificate in binary form along with the unique reference numbers derived from the image. The record will also contain the binary form of the email message in which the image was transmitted, as well as the date and time of receipt. Once the record is introduced into the system via the Tax Certificates Database, the system will instantly link the image of the executed Tax Certificate with the data used to generate the Tax Certificate (now contained within the executed Tax Certificate). Together, the Tax Certification Data and the image of the executed Tax Certificate will comprise an Executed Tax Certification.

The moment that a Tax Certification session is completed, and Tax Certification Data is initially introduced into the system, the Tax Certification Data and the details of the submission of such data by the Participant will be visible within the system. These details may be viewed by the operators of the system, the Participant that submitted the data, and the issuer of the Eligible Securities to which the data relates. At the moment that an executed Tax Certificate is linked to an existing record of Tax Certification Data, thereby forming an Executed Tax Certification, it is instantly visible to all such parties who, in addition to viewing the Tax Certification Data making up the Executed Tax Certification, may also immediately view the image of the executed Tax Certificate itself. The net effect of the Executed Tax Certification is that the system is populated with the data written on the executed Tax Certificate without any manual re-key-entry of such data being necessary. Said data was, in fact, already stored in the system prior to the generation and the signing of such Tax Certificate and is simply activated by the delivery of the executed Tax Certificate into the system. The operators of the system and the issuer of the Eligible Securities—the issuer being the party to which the certification by the Participant contained within each Tax Certificate is made—visually inspect the image of each Tax Certificate to confirm that it is complete and duly executed.

Beneficial Investors whose tax status warrants them exemption from withholding tax (e.g., tax imposed by Spain) and on behalf of whom Participants make a submission using the Tax Certification Submission System and deliver back into the system a valid, executed Tax Certificate will, barring any overall misalignments with the information provided by such Participant, be paid their share of income free from any such withholding tax on the Income Payment Date. Participants must follow this procedure for all such Beneficial Investors holding positions in the Eligible Security through them, and are instructed to do so by the end of the $4^{th}$ business day prior to the Income Payment Date (the "Standard Deadline"). The Standard Deadline notwithstanding, the Participants have until the morning of the Income Payment Date to submit Beneficial Investor Data, modify existing submissions, generate, print and transmit executed Tax Certificates.

In addition to the Beneficial Investor information and executed Tax Certificates that the Participant must submit, they must also, in the case of securities issued through the DTC, utilize certain systems of DTC to inform DTC of the aggregate level of the withholding tax exemption the Participant expects to receive on an aggregate basis for all its accounts on the Income Payment Date. The system interfaces with DTC and the other clearing institutions to collect this and similar data and compare it to the data submitted directly by the Participants. Should there be any discrepancy between the aggregate figures provided by the Participant and those provided by the clearing institution, according to Spanish law, for example, the resulting ambiguity in the attribution of tax-exempt status to the pool of underlying investors requires that all investors affected by such ambiguity be treated equally. Therefore, all such investors would be treated as non-tax-exempt investors on the Income Payment Date. In other words, for any Participant clearing system account, in the case of an aggregate misalignment, the entirety of such account will be paid income on the Income Payment Date less the withholding tax. Should such eventuality take place, and under certain other circumstances resulting in all or part of a Participants' account being paid the income on the Income Payment Date less withholding tax, such Participant may avail itself on behalf of its clients of a set of Quick Refund Procedures which allow the Participant to seek repayment of the withheld amounts on behalf of eligible tax exempt Beneficial Investors by the month following the Income Payment Date on which such tax withholding occurred. An example of such a Quick Refund Procedure is illustrated in FIG. 13, described hereinafter.

Figure 9:
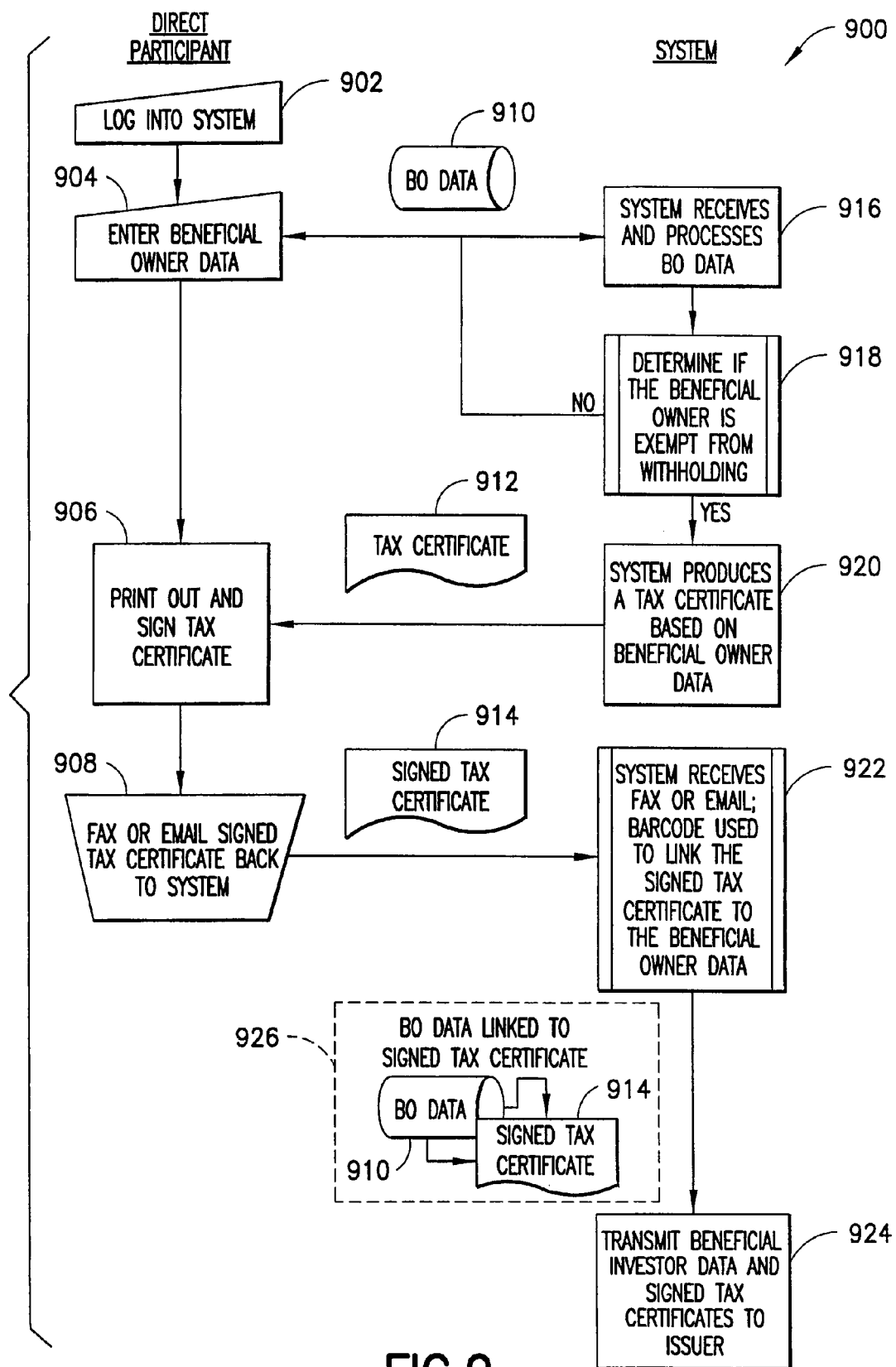
FIG. 9 depicts an exemplary (Tax Certificate) Certification Process flow diagram according to an exemplary embodiment of the present invention.

A review of the certification process described above is provided in FIG. 9 (the process being generally designated 900) where, at box 902, a direct participant logs into the system. At box 904, beneficial owner ("BO") data is entered. The BO data is stored in the system, as indicated at box 910. At box 916, the system receives and processes the BO data and, at box 918, determines if the beneficial owner is exempt from withholding. If so, at box 920 the system produces a tax certificate 912 based on the BO data. The tax certificate 912 is printed out and executed (e.g., signed) as indicated at box 906, and then, at box 908, the signed tax certificate 914 is faxed or emailed back to the system.

At box 922, the system receives the fax or email that includes the signed tax certificate. As indicated above, this document will include a barcode (in the preferred embodiment, a barcode array), which is used to link the signed tax certificate 914 to the beneficial owner data. At box 924, the beneficial owner ("beneficial investor") data and signed tax certificates are sent to the issuer, e.g., in a group of such certificates. Box 926 indicates that when the tax certificates are sent to the issuer, BO data 910 has been linked (e.g., through a tracking element such as a barcode) to its respective signed tax certificate 914.

In certain circumstances, Eligible Securities will contain special exchange-related features where in addition to the normal tax-related processing undertaken and facilitated on each payment by the system, the system will also facilitate the exchange of the entitlements of Beneficial Investors from the original Eligible Security to another Eligible Security. This exchange activity can take on the form of a voluntary election to continue to hold the original Eligible Security (where the original Eligible Security is an "Extendible Eligible Security"). In the case of an Extendible Eligible Security, the failure to make such a voluntary election results in an exchange of entitlement into a new Eligible Security that is not an Extendible Eligible Security. The exchange activity can also take on the form of a voluntary exchange into a new form of Eligible Security with certain different features to the original Eligible Security. For example, an exchange can be made from a restricted Eligible Security sold to investors under certain regulatory exemptions to a non-restricted Eligible Security that may be transferred to a much broader investor base. The system collects from the Participants the requests of the Beneficial Investors with regard to the exchange activity as part of the usual Tax Certification Submission Process. In certain cases, there may be no (e.g., Spanish) tax certification or withholding considerations relating to a certain Eligible Security (for example, a certain Eligible Security that is not of Spanish origin) and therefore the system manages and facilitates such exchange activity without the involvement of the other tax related features of the system.

On the morning of each Income Payment Date the system will close to all submissions by Participants. At this point, the system conducts a final analysis of the submissions that have been made by all Participants against the information that has been provided by the clearing institutions. In the case of any discrepancies, adjustments are made by the system to the tax-exemption entitlements of affected Participants and Beneficial Investors. Then, the system produces a battery of reports that are distributed to the clearing institutions, any Fiscal and/or Paying Agents whose role is to release income, and the issuer of the Eligible securities. All income payment activity is determined and directed by these reports, and they serve as an instruction to the Fiscal and/or Paying Agents and the clearing institution(s) involved as to the amount of income to distribute and to whom on the Income Payment Date. The issuer, clearing institutions and Fiscal and/or Paying Agents each have their own login to the system which allows them to access the information relevant to them, such as these reports. Prior to each Income Payment Date the issuer and the Calculation Agent (often the same entity as the Fiscal and/or Paying Agent) must log into the system and approve the specific details that will govern that Income Payment Date in the system, such as the interest rates of floating rate Eligible Securities. The issuer and the clearing institutions may monitor the submission of Tax Certifications in real time throughout the certification period, with the issuer and certain clearing institutions being able to see all details of such submissions including the images of the actual executed Tax Certificates the moment they are received by the system. Such "Real-time Logins" also comprise a secure upload facility that is used to distribute the battery of Income Payment Date Reports, as described above.

In addition to the reports that direct the payments of income on the Income Payment Date, the system also simultaneously generates the Spanish Tax Agency ("Agencia Tributaria" a/k/a "AEAT") tax filing reports that the issuer will need to file in relation to the payments being made on such Income Payment Date. Such reports fully comply with the requirements and specifications of the Spanish Tax Authorities (currently based on AEAT modelos 198, 193, and 296) and can be submitted electronically by the issuer without any need to reformat the data, saving the issuer the time and effort involved in preparing such filings. These modelos, automatically generated by the system on the Income Payment Date, involve the computation of the income being paid to each Beneficial Investor on the Income Payment Date, and further involve computations to convert the statement of such income into Euros from US Dollars or any other currency in which the Eligible Securities pay income. In order to conform to their own internal recordkeeping, the issuer logs into their Real-time System on the morning after the Income Payment Date and enters their preferred currency exchange rate(s) to be used for the preparation of the government tax filings relating to the Income Payment Date.

During the process of Participants submitting Beneficial Investor Data via the Tax Certification Submission System there are three methods from which they may choose to introduce such data into the system. The first such method, called the One-by-one Method, involves the Participant individually entering the details of a single Beneficial Investor into the system and generating a Tax Certificate containing only the information relating to this single Beneficial Investor. The second such method, called the Bulk Insert Method, involves the Participant compiling a list of their Beneficial Investors utilizing a standard data layout which is then transmitted into the system by copying and pasting the list into a submission window, or via the upload of a text file containing such information. The Bulk Insert Method parses the data and stores it in a temporary submission area until it has been approved by the Participant, then allows the Participant to review the details of all included Beneficial Investors as well as the aggregate overview of the submitted data. Once the Participant approves the Bulk Insert data, Bulk Tax Certificates of each relevant type (type I, type II or type III) are generated simultaneously containing all of the Beneficial Investors of such type included in such Bulk Submission. The third such method, called the Renew Previous Submissions Method, allows Participants to view submissions that they had previously made on behalf of Beneficial Investors and select any number of such submissions to renew, or make again for the Income Payment Date in question. The Participant must review each selected submission and update such submissions to reflect any changes in the position(s) held by included Beneficial Investors, and then follow a submission review procedure similar to that described above for the Bulk Insert Method. Once the Participant approves the renewed submissions, Tax Certificates are generated reflecting the list of included Beneficial Investors, in a way effectively identical to the way described above for the Bulk Insert Method.

As described above, at various times during the tax certification process the system must interface with clearing institutions in order to receive data relating to their Participants and the Beneficial Investors holding through such Participants. Currently, with regard to the DTC, this information comes in the form of periodic text-file reports generated by the Elective Dividend Service function operated by DTC (a/k/a "EDS"). The EDS system requires each DTC Participant to make an election on an aggregate basis as to what portion of its DTC account is eligible to receive income free from tax withholding on the Income Payment Date. The text file reports received by the system on a periodic basis from DTC are known as EDS Paying Agent Reports and contain both the total position held by each Participant in the Eligible Security as of the time such report was generated, as well as the EDS election made by such Participant at such time. The EDS Paying Agent Reports can be fed into the system manually, by hand key-entering the data contained in such report into the administration interface of the system. Alternatively, the data can be provided to the system by uploading the EDS Paying Agent Report into a processing drop-box, where it is electronically processed by the system. The report could alternatively be emailed to an email drop box, where the system would collect the report as an attachment to the email message and then process the attached report. In the case of other clearing institutions, such as Euroclear, such institution has a Real-time Login allowing them to submit the information relating to their Participants directly into the system either manually or in a defined data upload format which is pasted into a reporting window and then parsed by the system. In cases where Euroclear and/or Clearstream hold positions in the Eligible Security, an additional party, either a Specialized Depository or a Common Depository (depending on where the Eligible Security is held through DTC or not, respectively) must log into a Real-time Login to submit periodic aggregate reports showing the total amount held on behalf of Euroclear and/or Clearstream.

Several days prior to the beginning of each payment period, notices must be released through the distribution channels at each clearing institution notifying the Participants of the clearing institution of the upcoming income payment and the procedures involved in the tax certification process. At the DTC, these notices take the form of memos posted on DTC's website and announcements system. At Euroclear and Clearstream these notices take the form of SWIFT messages containing summaries of the required information. The system automatically generates all of the notices for each Income Payment Date for each clearing institution in the format used by such clearing institution, based on the payment period details entered into the system and approved by the issuer and the Calculation Agent.

During the Payment Period, between the Standard Deadline and the Income Payment Date, the system constantly analyzes the status of the submissions and Tax Certificates it has received and the clearing system data with which it has been supplied. Based on this information, the system determines which Participants are in danger of being penalized for a misalignment of the correlating data. The system automatically generates warning messages which are sent to the affected Participant(s) via email or fax on a periodic basis between the Standard Deadline and the Income Payment Date. This notifies the Participant(s) that some action is required by them in order to rectify the situation and for them to receive payment on the Income Payment Date free from withholding tax on behalf of those Beneficial Investors holding through them whose tax status warrants them exempt from tax withholding.

When logged into the system, registered Participants have access to a number of functions. Such Participants, in addition to making submissions on behalf of Beneficial Investors, may view all current submissions they have made for any currently open Payment Periods for Eligible Securities. Such Participants may also view archives of all past submissions they have made for any part payment on any Eligible Security. Current and archive submissions contain the complete data from the submissions, as well as the actual image of the executed Tax Certificates relating to such submissions. Participants may also, and are required to, manage the list of authorized representatives who may log into the account of the Participant and view or make submissions on behalf of the Participant. Such Participant's Access Coordinator has the ability to edit the records and login profiles for, and add new authorized representatives for their Participant account. The can also approve and deny access on an individual authorized representative basis and are responsible for ensuring that the list of authorized representatives is kept up to date. The Access Coordinator is also able to edit and modify the registration details pertaining to the entire Participant account.

Figure 10B:
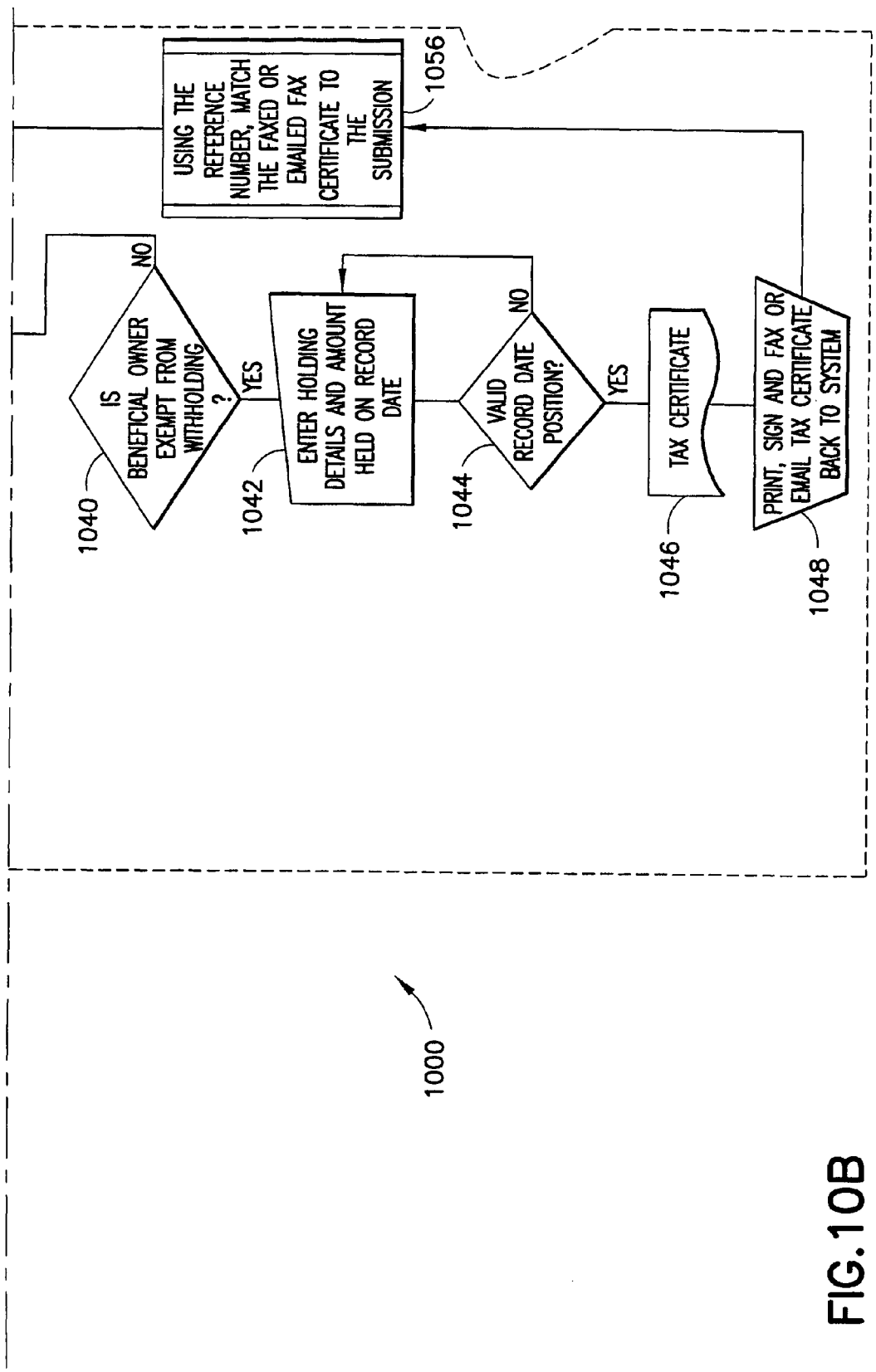
FIG. 10 (comprising 10A and 10B) depicts an exemplary Downstream Correspondent process flow diagram according to an exemplary embodiment of the present invention.

FIG. 10 (comprising FIGS. 10A and 10B) is a flowchart illustrating the downstream correspondent certification process generally designated 1000. Registration into the system commences at box 1002, and at box 1004 the correspondent enters a registration code from their direct participant. At box 1006, a determination is made as to whether the registration code entered is valid. If so, at box 1008 the downstream correspondent is registered.

At box 1010 of FIG. 10, the user logs in, and at box 1012 the user's email address and password are entered. If the login is valid, as determined at box 1014, the system portal is entered. At this point, the user can choose to manage their registration (box 1016), authorize issues (box 1022), make a submission (box 1026) or review submissions (box 1050). If it is desired to manage the correspondent's registration, the current registration can be edited at box 1018 or additional authorized representatives can be added and/or approved at box 1020.

If it is desired to authorize issues (e.g., new securities), a list of authorized issues is created at box 1024. The issues are tied to active payment periods, and must be authorized by their direct participant.

If it is desired to make a submission, an authorized issue is selected at box 1028 from the list of authorized issues created at box 1024. This list is stored on the system. At box 1030, a submission method is selected. The choices are the one-by-one method (box 1032), the bulk method (box 1034) and the renew previous submission method (box 1036). Each of these submission methods is described above. At box 1038, the beneficial owner is entered into the system. A determination is then made at box 1040 (FIG. 10B) as to whether the beneficial owner is exempt from withholding. If so, the holding details and amount of the security held by the beneficial owner on the record date are entered at box 1042. The record date position is verified at box 1044, and if it is valid, the tax certificate is generated as indicated at box 1046. The tax certificate is then printed, executed (e.g., signed) and faxed or emailed back to the system (box 1048).

If it is desired to review submissions made (1050), a list of prior submissions is provided at box 1052. A previous submission is selected, and the submission detail and its link to a tax certificate is obtained at box 1054. Using the reference number for the submission, the previously faxed or emailed fax certificate is matched to the submission (box 1056). This information can then be viewed on a user interface, such as a GUI.

Figure 11:
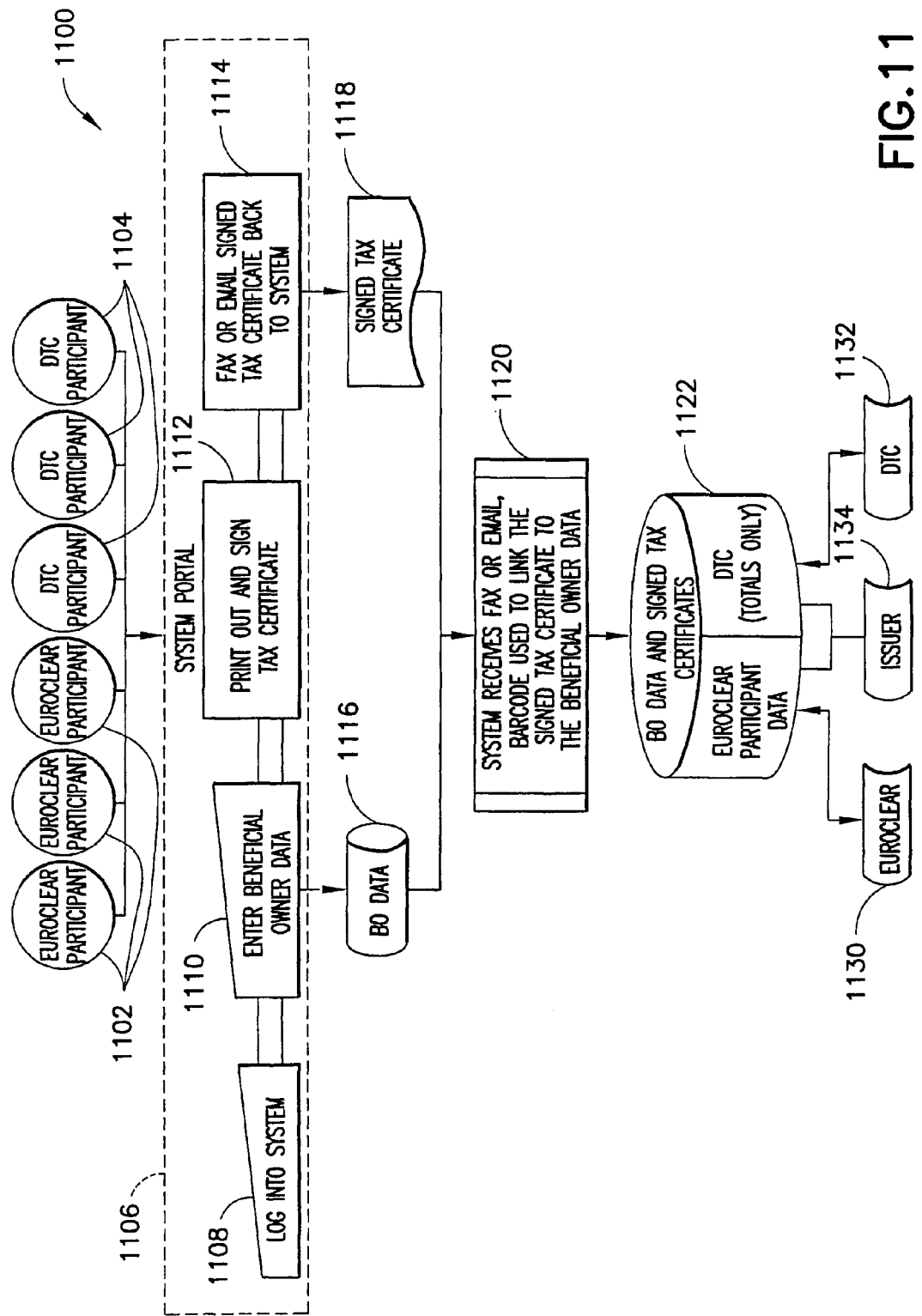
FIG. 11 depicts an exemplary Real Time Spectators process flow diagram according to an exemplary embodiment of the present invention.

FIG. 11 is a flowchart 1100 showing the operation of the system for real time spectators. Euroclear participants are indicated at boxes 1102. DTC participants are indicated at boxes 1104. Once the system portal 1106 is entered, the participant can log into the system at 1108. At 1110, beneficial owner data is entered. A tax certificate can be printed out for execution (e.g., signature) at 1112. The tax certificate is faxed or emailed back to the system at 1114. BO data is stored in the system, as indicated at 1116. Such data, as well as the signed tax certificate (box 1118) is provided to the system as indicated at box 1120. The system receives the fax or email of the signed tax certificate, which has incorporated thereon the inventive barcode used to link the signed tax certificate to the beneficial owner data. At box 1122, the BO data and signed tax certificates are stored. The system memory used to store this information is accessible to Euroclear as indicated at 1130 to obtain Euroclear participant data, to DTC as indicated at 1132 to obtain DTC totals, and to the issuer as indicated at 1134 to obtain all such information.

Figure 12B:
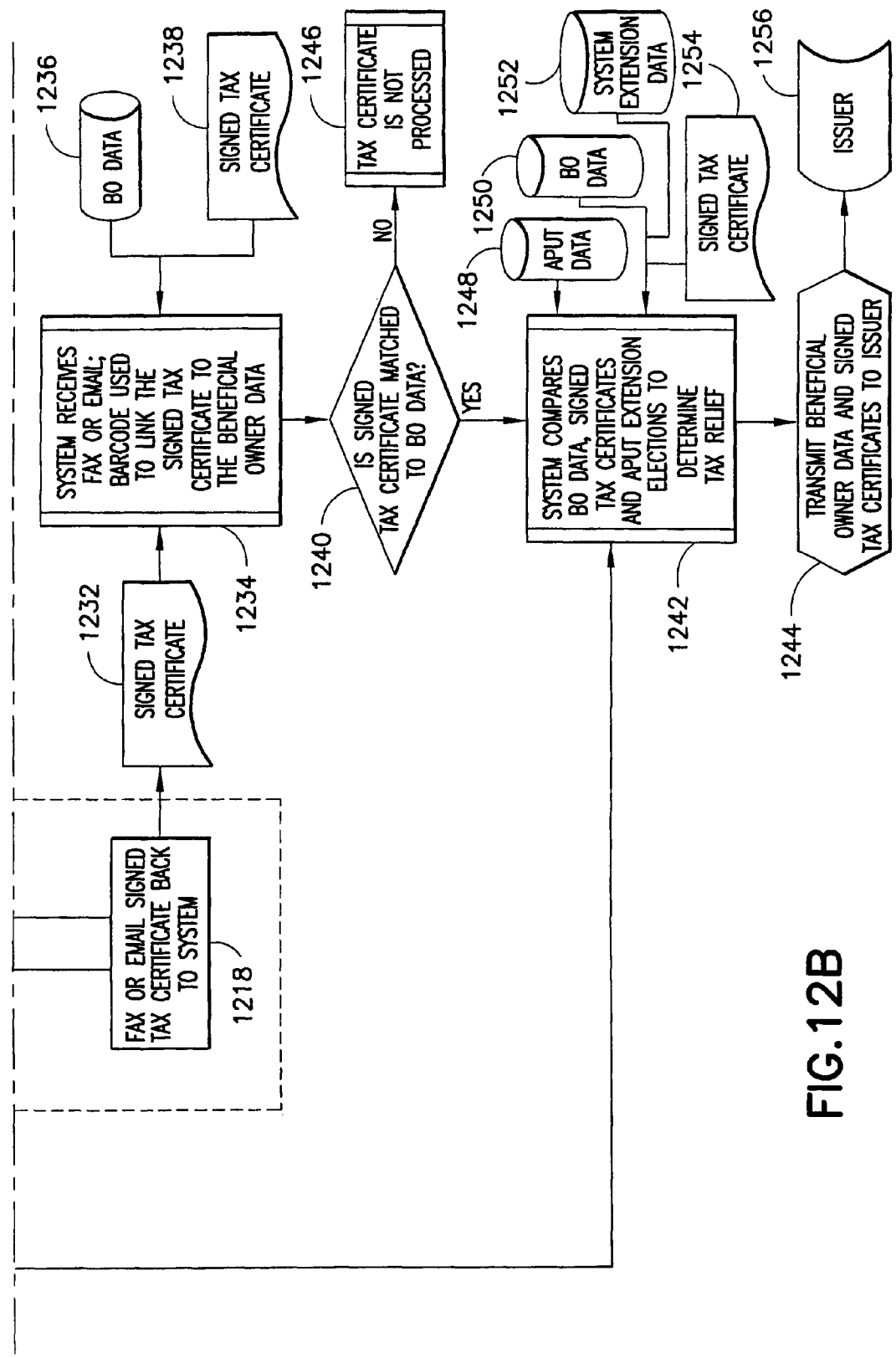
FIG. 12 (comprising 12A and 12B) depicts an exemplary Extension Election process flow diagram according to an exemplary embodiment of the present invention.

FIG. 12, comprising FIGS. 12A and 12B, is a flowchart of the certification process for DTC. At box 1204, the DTC receives and processes extension elections, which are stored in the system memory as, for example, APUT data (box 1202). At box 1206, the DTC transmits the extension elections to the system. A direct participant logs into the system portal 1208 as indicated at 1210, and can then make extension elections as indicated at 1212. At 1214, beneficial owner (BO) data is entered together with the applicable extension amounts. A tax certificate 1230 is printed out for signature, as indicated at 1216. The signed tax certificate 1232 is faxed or emailed back to the system at 1218.

The system receives and processes BO data entered by the direct participant (see box 1214) as indicated at box 1220. BO data is stored by the system (1222), as is extension data related thereto (1224). At box 1226, the system determines if the beneficial owner is exempt from withholding. If not, the BO is not eligible for tax relief, as indicated at 1227. If the BO is exempt from withholding, the system produces a tax certificate based on the BO data, as indicated at 1228. This tax certificate 1230 is passed to the system portal 1208 (see box 1216) for printing, execution (e.g., signature), and return to the system, as explained above.

Once the signed tax certificate 1232 is received back, the system uses the barcode thereon to link it to the BO data (box 1234). The BO data and signed tax certificate are stored, as indicated at boxes 1236 and 1238, respectively. If the signed tax certificate is matched to the BO data (box 1240), the system compares the BO data, signed tax certificates and APUT extension elections to determine the tax relief (box 1242). Inputs to this determination include the APUT data 1248, BO data 1250, system extension data 1252 and the signed tax certificate 1254. At box 1244, the BO data and signed tax certificates are transmitted to the issuer 1256. In the event that the signed tax certificate is not matched to the BO data at 1240, the tax certificate is not processed (box 1246).

Figure 13B:
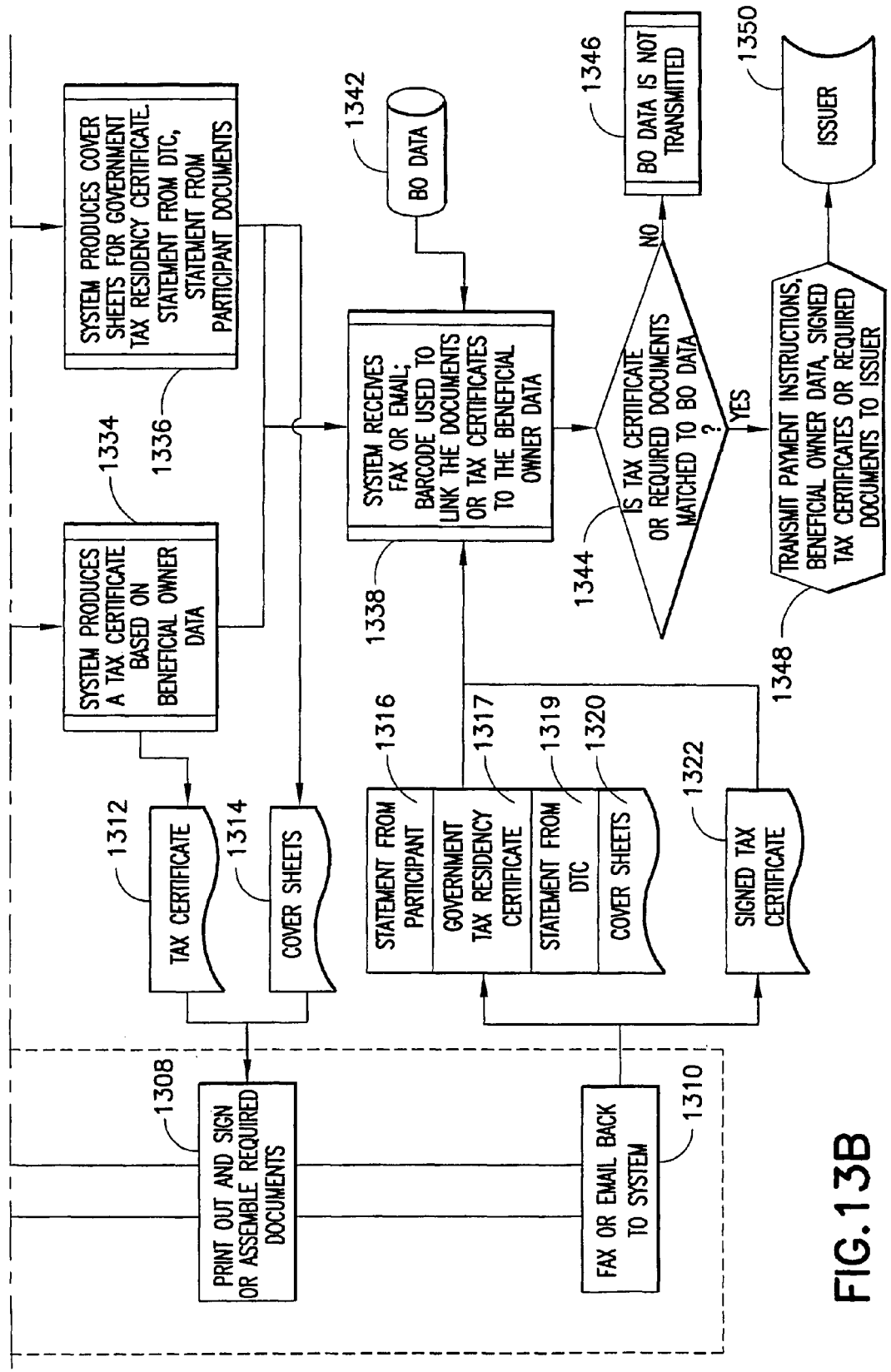
FIG. 13 (comprising 13A and 13B) depicts an exemplary Quick Refund process flow diagram according to an exemplary embodiment of the present invention.

FIG. 13, comprising FIGS. 13A and 13B, is a flowchart illustrating a quick refund certification process in accordance with the invention. A direct participant logs into the system portal 1300 as shown at box 1302. Payment instructions are entered at 1304. At 1306, beneficial owner data is entered. The payment instructions are input to the system for processing, as indicated at box 1324. The BO data is input to the system at box 1326 for processing. At 1328, the system determines if the beneficial owner is exempt from withholding. If not, the BO is not eligible for tax relief, as indicated at 1352. If the beneficial owner is exempt from withholding, this fact is reflected in the BO data at 1330. At box 1332, a determination is made as to whether the participant is an OCED or tax treaty country. If so, the system produces a tax certificate based on the BO data (box 1334). If not, the system produces various documents including cover sheets for a government tax residency certificate, a statement from the DTC, and a statement from the participant (box 1336).

The tax certificate 1312 produced at 1334 or the cover sheets 1314 produced at 1336 are provided at box 1308 to the direct participant via the system portal 1300 for printing, execution (e.g., signature) and/or assembly of the required documents. The required documents are then faxed or emailed back to the system (box 1310). The system receives the signed statement from participant (1316), the government tax residency certificate (1317), the statement from DTC (1319) and/or the cover sheets (1320) (the "documents") or, in the event a tax certificate was produced, the signed tax certificate 1322. At box 1338, a barcode is used to link the documents or tax certificates to the BO data 1342. At 1344, a determination is made as to whether the tax certificate or required documents are matched to the BO data. If not, the BO data is not transmitted (1346). If so, payment instructions, BO data, signed tax certificates or required documents are transmitted to the issuer 1350, as indicated at 1348.

Figure 15:
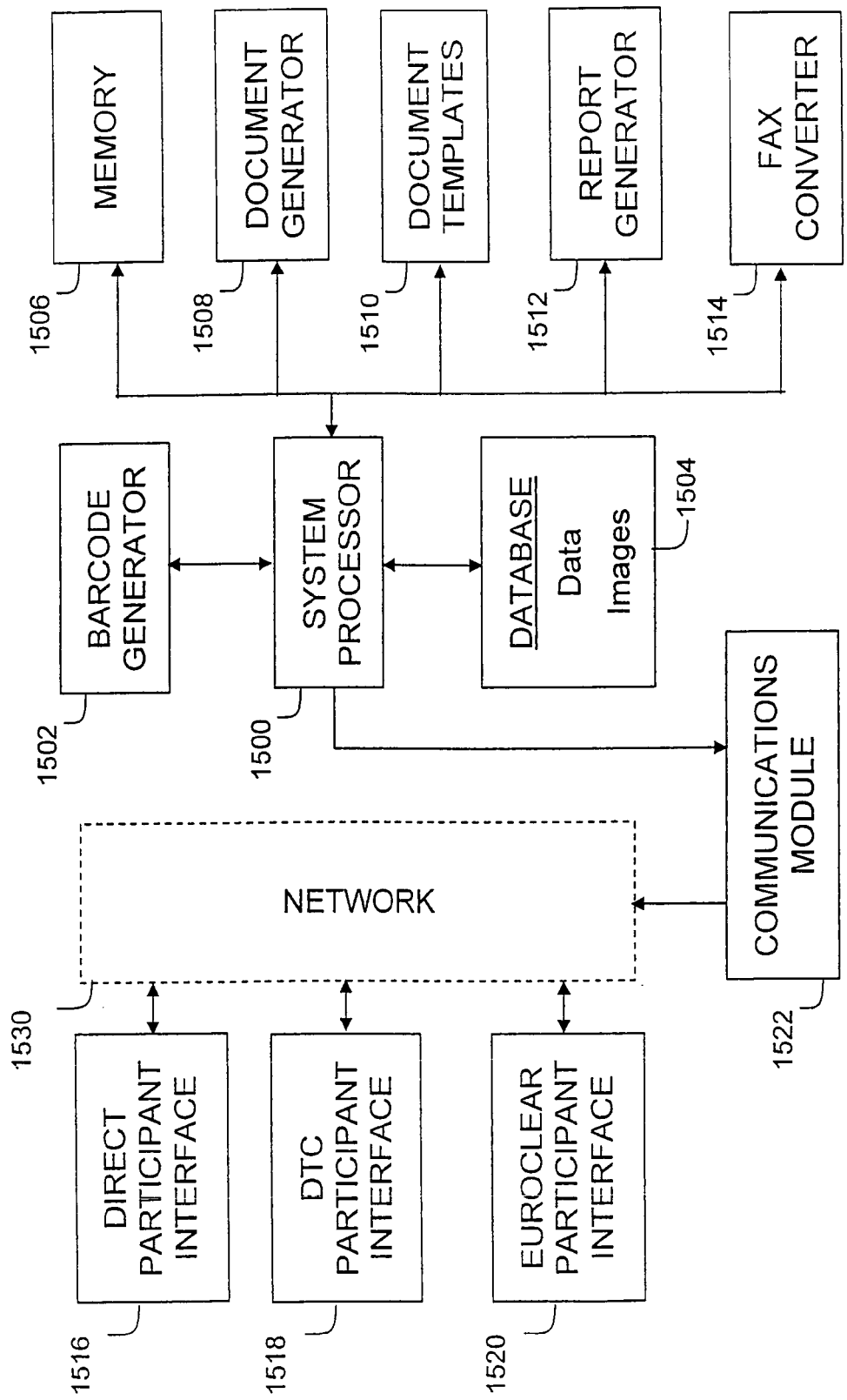
FIG. 15 is a block diagram of an example system implementation in accordance with the invention.

FIG. 15 is a block diagram of an example implementation of the inventive system. A system processor 1500 controls the operation of the various functions described above. Processor 1500 can comprise a workstation coupled to a networked computer or the like that runs software to implement the features of the system. A user interface, such as a GUI presented via a display screen, is provided as part of system processor 1500, as well known in the art. A barcode generator 1502 is coupled to system processor 1500 in accordance with the invention. This component generates the barcodes 1404 illustrated in FIG. 14 that link the Tax Certificate to the beneficial owner data. A database 1504 is also coupled to processor 1500. This database stores the data and images pertaining to each tax certificate generated by the system.

System processor 1500 also communicates with memory 1506 in a conventional manner to enable temporary and permanent storage of data, program instructions, etc. necessary to effect the system operation. This memory can be read only memory or random access memory, but is more typically a combination thereof (e.g., a hard drive and RAM) allowing for both volatile and non-volatile storage of data and programs.

A document generator 1508 associated with system processor 1500 is provided to generate the Tax Certificates and other documents (e.g., cover sheets, residency certificates, participant statements, DTC statements, etc.) used in connection with the system. Document templates 1510 are provided for use with the document generator. Such templates can comprise, for example, standard forms with fields that are filled in with data from the database 1504 specific to a particular beneficial owner or transaction.

A report generator 1512 is associated with system processor 1500. This component is used to prepare the various system reports, including those necessary to comply with government regulations.

A fax converter 1514 is used by the system processor 1500 to convert signed Tax Certificates and other documents received from the participants into image data. As explained above, this image data is stored in database 1504 and linked with the beneficial owner data via a tracking element such as a barcode.

Communication between Participants and the system, and more particularly the system processor 1500, is provided via a network 1530 and a communications module 1522. The network can comprise, for example, the Internet, although other private networks can be used (e.g., to improve security) as well known in the art. Moreover, a plurality of networks can be used in cooperation to provide communications between the system and its users. The communications module 1522 is associated with the system processor 1500 to provide electronic communications over the network 1530 to and from the various participants. Such communications can include direct network connections (e.g., point-to-point), email and text messaging, wireless communications, Internet communications, and/or any other suitable technique for communicating data between a system and its users. Many such communication techniques are well known and will be readily apparent to those skilled in the art.

A direct participant interface 1516 can comprise a GUI that enables direct participants to use the system to perform authorized functions as described above. Similarly, a DTC participant interface 1518 can be provided to enable DTC participants to interact with the system, via the network 1530 and the system processor 1500. Interface 1518 can also comprise a GUI for efficient interaction with the system. A Euroclear participant interface 1520 can be provided to enable Euroclear participants to use the system via network 1530 and system processor 1500. Again, this interface can comprise a GUI. Other interfaces can be provided as necessary for various users of the system. In addition, the various interfaces can include a document scanner together with fax and/or email capability to allow executed documents to be emailed or faxed back to the system.

Description of BarParse Component

The BarParse Component 124 illustrated in FIG. 1 accomplishes the unattended collection of documents and information as part of the Processing and Submissions Facet 120. BarParse Component 124, collects and records of the receipt of electronically-transmitted documents (e.g., tax certificates, eligibility letters, etc.) which have been either emailed to the Acupay system, or which have been faxed into the Acupay system and which have then been processed by the Fax-to-Email Component 122 of the Processing and Storage Facet 120.

While processing such electronically-transmitted documents, the BarParse Component 124 stores in electronic binary form into a record in the Acupay database an exact copy of both the executed (e.g., signed) electronically-transmitted documents, along with the complete fax/email in which such electronically-transmitted document was received. The electronically-transmitted documents are encoded with unique tracking elements (e.g., barcodes) that link the documents to investor information already contained in the Acupay database. The BarParse Component 124 reads the tracking information contained in these tracking elements and saves the tracking information into the database along with the electronic copies of the documents themselves. In this manner, a database association is created between the documents and the underlying investor information record(s) to which the documents relate, thereby "marrying" the investor information with the electronically imaged version of the executed documentation. As described elsewhere herein, this "marrying" of information to documentation instantaneously gives rise to some benefit on behalf of the related investor.

The BarParse Component 124 can accomplish unattended collection of information in electronic form via email and/or physical "drop boxes" (file folders). Processing can be either manually actuated or occur automatically at an interval specified by a timer loop.

Electronically-transmitted document collection and processing begins when an electronically-transmitted document is delivered to a designated email mailbox or document drop box (physical file folder). The electronically-transmitted document may be emailed to the email mailbox, or may be faxed to the Acupay Fax-to-Email Component 122 which deposits the fax and document into the same email mailbox, or may be copied into the document drop box.

The BarParse Component checks the email mailbox at a defined interval for the presence of emails in the mailbox at the start of the processing cycle. If no emails are found, the program will go idle until the idle interval elapses. If there are mail items in the mailbox or file items in the drop box, the program will download each mail/file item, process it, and then delete it from the mailbox or drop box.

In order to process a mail item, the message is downloaded from the email server and examined to see it has any attachments. If it does not have any attachments, it is considered an invalid message. No further processing is performed except to send an alert email, with the message as an attachment, so that it can be manually checked. If there are attachments to the message, a record in the Messages table of the Database/Processing Component 126 is created and the mail item in its entirety (message and attachment(s)) is saved into the table along with a time stamp and a text copy of the body of the message. An ID code value for the message is returned to the program as part of the message record creation process. This ID code is used to associate other records (attachment and barcode) with their parent message.

Next, each of the attachments is processed. An attachment record is created in the Database/Processing Component 126 and the entire attachment is saved along with the file name of the attachment. An attachment ID code is generated when the attachment record is created and this ID code is used to link the barcode(s) found in the attachment to the attachment record.

The actual file that comprises the attachment is then saved to a work directory on the BarParse Component 124 server. A Barcode-Reading Sub-Component of the BarParse Component 124 scans the attachment, locates all the barcodes in the file, reads the tracking information contained within each barcode, and creates a list of all the unique barcodes/tracking information found. A record is created for each unique barcode/tracking information set, and the tracking information (the encoded value embedded within each barcode) is saved along with the Message ID and Attachment ID relating each barcode back to its parent attachment and mail message. An email alert is created and sent to a recipient list of support staff to notify them of the successful collection of the electronically-transmitted document along with its barcode-embedded tracking information.

Description of Eligibility Letter Library System

The following is a description of an exemplary embodiment of the Eligibility Letter Library System, as configured to organize the process of establishing eligibility of certain investors for certain restricted benefits. In this case, these benefits include the ability to request the ability to purchase certain restricted securities, the ability to trade in such securities, and the ability to receive information about such securities or the market in such securities. Such benefits may be granted only to a certain qualified subset of investors who meet certain eligibility criteria. We shall refer to this system as the "Acupay Private Placement Eligibility Library and Trading System."

The Acupay Private Placement Eligibility Library and Trading System is a computer application that is part of the overall Acupay system, created to control the ownership of unregistered securities and facilitate compliance with certain regulatory requirements and preferences of the securities issuer. Such regulations and issuer preferences directly determine what benefits or privileges may be afforded to investors deemed "eligible investors" through their successful inclusion in the Eligibility Letter Library.

Using a specialized implementation of the Submission Facet 110 of the Acupay system (FIG. 1), information on potential investors is efficiently collected and processed. Once such investor information is submitted, the Acupay system generates an Eligibility Letter Document for printing by the investor. The Eligibility Letter Document contains tracking elements (e.g., barcodes) and an execution (e.g., signature) section. The investor must execute (e.g., sign) the Eligibility Letter and email or fax (electronically transmit) the executed document to the Acupay system for processing. Upon receipt of the executed document, the Processing and Storage Facet 120 processes the electronically-transmitted Eligibility Letter document. During processing, the barcode-embedded tracking information is extracted and saved into the Database/Processing Component 126 of the Processing and Storage Facet 120, along with an exact electronic copy of the executed Eligibility Letter document.

Once processed and stored, the executed Eligibility Letter is electronically "married" to the corresponding investor information stored in the system as submitted into the Submission Facet 110 and used to generate the Eligibility Letter as signed by the investor. Acupay either physically or automatically, depending on the requirements of the specific security in question, interrogates and reviews executed (e.g., signed) Eligibility Letters and if the investors are deemed eligible, the executed Eligibility Letter is added to the Eligibility Letter Library for reference by the Acupay system and users thereof. An accepted Eligibility Letter is necessary to establish the investor's eligibility to the various benefits, such as requesting to purchase a position in the restricted securities.

The system tracks the number of current investors and possible investors ("slots") of the security at all times and compares it to the total maximum number of investors allowed, set by regulatory requirements and the issuer. The system will not permit the total maximum number of investors allowed to be exceeded. The number of slots relates to the number of investors certified through the Acupay system as "eligible investors", and the Eligibility Letter Library is used as the central data hub in the control of the slot limitations relating to the restricted securities.

Investors wanting to purchase or sell shares of the security must submit their request to the system. Investors must indicate which of their accounts are purchasing or selling and the quantity. The system processes their request and verifies it is a reasonable request and if there are sufficient slots available. If the system determines the request can be granted, the request is registered as an order and a slot is reserved for each of the investor's accounts submitted. The order (and the reserved slot) is only held open for a limited period of time.

The system allows representatives of broker/dealers facilitating trading in the restricted securities to access the Eligibility Letter Library, and interact with the Acupay Private Placement Eligibility Library and Trading System, via the Reporting Facet of the Acupay system 130. Such representatives (e.g., traders) may select open orders and designate them as active for a limited period of time. The system will only allow traders to execute orders that are open and active. Once a trader executes an order, the system will grant permission for movements between accounts by instruction through clearing systems. Acupay causes the settlement of movements in the restricted securities (e.g., executed trades) to be effected according to the activity within and controlled by the Acupay Private Placement Eligibility Library and Trading System.

In order to monitor for unauthorized movements or reassignments of the securities, the Acupay Private Placement Eligibility Library and Trading System also requests that custodians utilize the submission methods associated with the standard Acupay system to submit their investor information on a routine basis, which the system compares with the known ownership in the securities. Any investor accounts that have discrepancies between the data provided by the custodian and the data provided by the investor will be considered stowaways and a slot will be reserved to account for it. The system will alert the appropriate parties to resolve the discrepancy and if no resolution is made within a set period of time, the system will grant permission for a withdrawal out of that custodian's account as a consequence.

Description of Government-Issued Certificate Library System

The following is a description of an exemplary embodiment of the Government-Issued Certificate Library System, as configured to organize the process of establishing eligibility of certain investors for certain tax or other benefits. For example, these benefits may include reduced rates of withholding tax levied on income received due to an investor's ownership of certain securities.

Such exemplary reduced rates of withholding may be determined through certain bilateral tax treaties between certain countries wherein which the issuers of the income-generating securities in question are located, and the countries in which investors afforded such benefit are located. Investors located in various countries may be eligible for varying benefits (e.g., varying levels of reduced withholding tax) depending on the specific country in which the investor is located, and the terms of an exemplary bilateral tax treaty specific to that country.

An investor located in such a country as to give rise to the potential for a benefit such as a reduced rate of securities income withholding must, in accordance with certain tax laws and regulations, evidence their eligibility for such benefit. This can be accomplished, for example, through the acquisition and provision to the securities issuer, the relevant taxing authorities, or designated intermediaries a certificate produced and/or executed by the government of the country in which the investor is located attesting to the status of the investor.

The exemplary benefits, such as reduced rates of withholding, arise from and according to the terms of certain governing documents (e.g., bilateral tax treaties). The criteria for eligibility of a certain investor under such exemplary treaties may be the treaty-party government recognition of the investor as resident in that country for tax purposes. A certificate produced or executed by a body or agency of the treaty-party government is, in an exemplary embodiment, a government-issued certificate.

Such government-issued certificates may take on any form, e.g., physical, electronic or cryptographic, which is recognized for the purposes of establishing eligibility under the governing agreements (e.g., bilateral tax treaties) by the executors of such agreements. Generally, such executors will be the governments or relevant taxing authorities of such governments. In existing exemplary embodiments, such government-issued certificates of tax residence are documents stating the identity of the investor in question, their tax ID number or equivalent, and the status of the investor (e.g., their tax residence). The certificates will be signed/executed by an empowered representative of an agency of the government granted the role of generating or executing such certificates. An expiration date for the validity of the certification will also be provided. In the United States, such certificates are generated and executed by the Internal Revenue Service, and are valid for at least 12 months from the date of execution.

In exemplary embodiments of the Government-Issued Certificate Library System, when the Acupay system receives a request for, for example, a reduced rate of tax withholding on behalf of an investor holding a position in a security where such reduced rate of withholding requires the provision of a government-issued certificate of tax residence, the Acupay system, using the tax ID or equivalent government-issued ID of the investor, interrogates the Acupay Government-Issued Certificate Library System to determine if a valid certificate already exists in the library for said investor. If such a certificate is already on file in the Acupay Government-Issued Certificate Library System, then the investor is granted the reduced rate of tax withholding without the need to retransmit any documentation. The entitlement information relating to the income to be received by the investor is submitted and the benefit of the existing certificate (e.g., the reduced rate of withholding) is automatically applied to the investor.

If such a certificate is not already on file in the Acupay Government-Issued Certificate Library System, the Acupay system will request that investor information relating to the investor be input into the system. The Acupay system then requires that the submitting party (e.g., the custodian bank) transmit to Acupay a copy of the government-issued certificate on behalf of the investor.

In order to efficiently process the transmission of such a government-issued certificate, the Acupay system generates a unique Barcoded Transmission Coverpage which must be attached to the government-issued certificate and emailed or faxed together as a single combined document into the Acupay system. This Barcoded Transmission Coverpage contains tracking information relating to the investor information already entered into the system for the investor to which the government-issued certificate being transmitted relates. Together, the Barcoded Transmission Coverpage and the government-issued certificate are referred to as a BTC/GIC Bundle.

Upon receipt of the BTC/BIC Bundle via email or fax, the Processing and Storage Facet 120 of the Acupay system processes the component documents and links the BTC/BIC Bundle to the relevant investor using the tracking information encoded in the embedded barcodes. An exact electronically-transmitted copy of the government-issued certificate of tax residence is associated with the investor and an entry containing the investor identity and the government-issued certificate is added to the Acupay Government-Issued Certificate Library System, along with the expiration date of the government-issued certificate.

When future income payments for the investor are processed during the effective life of the government-issued certificate, the investor will be automatically recognized as eligible for the benefit (e.g., reduced withholding rate). The reduced withholding rate will then be automatically applied to the income due to that investor, without the need to retransmit the documentation (e.g., the government-issued certificate).

Should an investor not have a government-issued certificate on file with the Acupay Government-Issued Certificate Library System, nor have such a certificate on file with their custodian bank or representative or simply have not requested or received such a certificate from the government in question, the Acupay system will prepare an application for the investor. The application will be automatically prepared by the system using the investor information within the system, based on a standard form provided by the government or government agency. Such application may contain embedded tracking elements (e.g., barcodes) which would allow Acupay to efficiently route the executed application to the government agency in question, should the investor choose to allow Acupay to handle such application routing.

It is foreseen that one alternative exemplary embodiment of the Government-Issued Certificate Library System would arise from the substitution of a purely electronic or cryptographically represented government-issued certificate issued and/or recognized by the governments involved. In such an exemplary embodiment, when an investor does not have an existing valid government-issued certificate on file in the Acupay Government-Issued Certificate Library System, upon submission of the investor information, rather than the transmission of an existing government-issued certificate using a Barcoded Transmission Coverpage the Acupay system would electronically interface directly with the government agency empowered to grant such certificates and negotiate an instantaneous generation and transmission of such a certificate on behalf of the investor from the government agency to Acupay. This would allow the investor, assuming they are qualified according to the records of the government agency, to immediately avail themselves of the benefit (e.g., the reduced rate of tax withholding). Such an electronically-negotiated, generated and transmitted certificate of tax residency could, for example, be validated through a suitable trust scheme using cryptographic techniques, timestamps, codes and/or other secure method well known in the art.

It should now be appreciated that the present invention provides a system for automatically collecting and verifying information for the purpose of generating documents to comply with various laws and/or government or administrative regulations. In an illustrated embodiment, the invention is used to provide compliance with regulations necessary to avoid the withholding of excess tax when income (e.g., interest) is paid on securities, such as bonds. As part of the process, investor information is submitted and tax certificates are generated and forwarded to participant banks for execution. The executed tax certificates are returned to the system by facsimile (fax) or email for subsequent presentation to the authorities, as well as for archival storage. The tax certificates generated by the system contain tracking elements such as barcodes, which are used to link the tax certificate to the underlying investor information in compliance with the regulations of the taxing authority. Accordingly, the inventive system enables legal documents such as tax certificates to be prepared, forwarded to signatories, executed and electronically transmitted back into the system. Once received back into the system, the executed documents are automatically matched to the underlying information (e.g., investor information) already stored electronically, forming the basis of an executed transaction (e.g., tax certification).

Advantageously, the invention provides the ability to link information about end beneficiaries (e.g., investors) with certain underlying documentation to unlock a benefit (e.g., withholding tax exemption) for the end beneficiaries. For example, tax information about investors is married with tax certificates executed by their banks to unlock a reduced or exempt tax rate for the investors. In the case of an eligibility library, information on potential investors is linked with executed qualified institutional buyers and qualified purchaser's (QIB/QP) letters which unlocks the benefit of being able to invest in certain restricted securities. As far as the utility for the intermediaries, issuers, and the like, the service to the end beneficiaries is effected using automated real-time data transmission, underlying document generation, electronic document tracking and processing techniques allowing for reduced labor, increased efficiency and faster processing times. Thus, compliance with various regulations is facilitated.

In a broader sense, the invention provides for the compilation of paper-based certificates with the entitlement of an entity to either (a) own an instrument or (b) receive income based on such ownership. The inventive technology for the first time permits such a compilation of certificates virtually instantaneously, representing a vast improvement over prior manual schemes for providing such certification. Certificates of status provided in accordance with the invention can be issued for a variety of purposes. These include tax purposes (e.g., to prove tax status) and securities law purposes (e.g., to verify sophisticated investor status).

The invention is also useful in storing documents such as government tax certificates and creating electronically based copies thereof that are endorsed by the applicable government as bona-fide alternatives to official government documents. This is advantageous, for example, because it permits the inventive system to (i) interrogate the government's database of bona-fide persons, (ii) prepare, on behalf of the government, an electronic or paper-based certificate that is as good as an officially executed government document, and (iii) provide the document virtually instantly for use in reconciliation with the fast-paced changing records of securities ownership and income entitlement.

While the present invention has been described with reference to certain exemplary embodiments, it will be understood by those skilled in the art that various changes may be made and equivalents may be substituted without departing from the scope of the invention. For example, the system and methods of the present invention can be applied to the collection, processing, verification and reporting of any type of information regarding a defined class of individuals, and where such information needs to be collected from various sources, verified and stored, activated through being related to or associated with some legally empowered or compliant underlying documentation, and reported in some manner. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed:

1. A computer system for effecting payments to beneficial owners of financial securities through a complex custodial chain of ownership, comprising:
   a system processor;
   a database accessible to the system processor, said database being adapted to store information to be incorporated into a document, information identifying financial securities and information identifying beneficial owners of said securities;
   a tracking element generator associated with said system processor;
   a document generator associated with said system processor for generating the document, the document comprising an unexecuted tax certification certificate;
   a communications module associated with said system processor;
   said system processor and document generator being adapted to incorporate data from said database into the unexecuted tax certification certificate;
   said system processor and tracking element generator being adapted to incorporate a multi-function tracking element into said unexecuted tax certification certificate, the tracking element containing encoded information used to determine how said unexecuted tax certification certificate should be handled;
   said system processor and communications module being adapted to forward said unexecuted tax certification certificate for execution by at least one of the beneficial owner of a security, an authorized representative of the beneficial owner, a custodian bank holding the security on behalf of the beneficial owner, or financial intermediaries within a custodial chain of ownership of the security and to receive said tax certification certificate after execution for electronic storage as an executed tax certification certificate;
   wherein:
      said tracking element allows the unexecuted tax certification certificate to be executed and electronically transmitted in the system, remains associated with the executed tax certification certificate for purposes of collecting, organizing, and handling the executed tax certification certificate, and automatically matches the executed tax certification certificate to financial security and beneficial owner information stored in the database;
      said tracking element includes tracking information, the tracking information being saved into said database with an electronic copy of the executed tax certification certificate to create an association between the executed tax certification certificate and the financial security and beneficial owner information stored in said database, thereby linking the financial security and beneficial owner information to the electronic copy of the executed tax certification certificate;
      after the saving of the executed tax certification certificate in the database, the executed tax certification certificate, together with the financial security information and the beneficial owner information linked with the executed tax certification certificate that is stored in said database, is visible to parties having authorized system access, the parties having authorized system access comprising at least a plurality of the beneficial owner, the authorized representative of the beneficial owner, the custodian bank holding the security on behalf of the beneficial owner, the financial intermediaries within the custodial chain of ownership of the security, an issuer of the financial security, and a party responsible for issuing a payment on the security;

said system processor uses said tracking element to identify the beneficial owner of the financial security associated with the executed tax certification certificate and, in response to the beneficial owner identification, commences a process for confirmation of the ownership of the financial security identified by said executed tax certification certificate; and said system is responsive to said confirmation, if received, to transmit payment instructions and associated documentation to the party responsible for issuing the payment to the identified beneficial owner.

2. The system of claim 1, wherein said document further comprises at least one of:
an exchange election for an investment;
an extension election for an investment;
a statement of eligibility of an investor;
a statement of exemption from restrictions or regulations.

3. The system of claim 1, wherein the tracking element comprises a barcode.

4. The system of claim 3, wherein the barcode comprises a two-dimensional array of squares.

5. The system of claim 3, wherein the system automatically reads the barcode directly from an electronic image of the executed tax certification certificate.

6. The system of claim 1, wherein said executed tax certification certificate is maintained by the system in an electronic library together with the tracking element and metadata about the executed tax certification certificate.

7. The system of claim 1, wherein the system operates as a securities processing nexus for financial institutions and other intermediaries to effect, review, archive and manage a plurality of transactions requiring executed documents.

8. The system of claim 1, wherein said system processor uses said tracking element to route authorization of payment instructions to the party responsible for issuing the payment to the identified beneficial owner.

9. The system of claim 1, wherein a statement establishing an eligibility of an investor is collected and organized in a library using said tracking elements.

10. The system of claim 1, wherein said tracking elements are used to automatically match physical scans or faxes of said tax certification certificates.

11. A method for effecting payments to beneficial owners of financial securities, comprising the steps of:
storing information in a database, said database being associated with a computer system;
generating a document using said computer system, said document comprising an unexecuted tax certification certificate and having information from said database, information identifying financial securities and information identifying beneficial owners of said securities incorporated therein;
embedding a multi-function tracking element into said unexecuted tax certification certificate, the tracking element containing encoded information used to determine how said tax certification certificate should be handled in said computer system;
maintaining a record of said tracking element in said computer system;
forwarding said unexecuted tax certification certificate together with the embedded tracking element to an authorized entity for execution, said authorized entity comprising at least one of the beneficial owner of a security, an authorized representative of the beneficial owner, a custodian bank holding the security on behalf of the beneficial owner, or financial intermediaries within a custodial chain of ownership of the security;
receiving said tax certification certificate back from said authorized entity together with the embedded tracking element after execution as an executed tax certification certificate;
using said tracking element to automatically match the executed tax certification certificate to financial security and beneficial owner information stored in the computer system;
saving the encoded information in the tracking element with an electronic copy of the executed tax certification certificate to create an association between the executed tax certification certificate and the financial security and beneficial owner information stored in the database, thereby linking the financial security and beneficial owner information to the electronic copy of the executed certification certificate;
after the saving of the executed tax certification certificate in the database, making the executed tax certification certificate, together with the financial security information and the beneficial owner information linked with the executed tax certification certificate that is stored in said database, visible to parties having authorized system access, the parties having authorized system access comprising at least a plurality of the beneficial owner, the authorized representative of the beneficial owner, the custodian bank holding the security on behalf of the beneficial owner, the financial intermediaries within the custodial chain of ownership of the security, an issuer of the financial security, and a party responsible for issuing a payment on the security;
wherein:
said tracking element allows the unexecuted tax certification certificate to be executed and electronically transmitted in the system and remains associated with the executed tax certification certificate for purposes of collecting, organizing, and handling the executed tax certification certificate;
said tracking element is used to identify the beneficial owner of the financial security associated with the executed tax certification certificate;
in response to the beneficial owner identification, a confirmation process is commenced for confirming the ownership of the financial security identified by said executed tax certification certificate; and
if confirmation of said ownership is obtained, payment instructions and associated documentation are transmitted to the party responsible for issuing the payment to the identified beneficial owner.

12. The method of claim 11, wherein said generating step produces a document that further comprises at least one of:
an exchange election for an investment;
an extension election for an investment;
a statement of eligibility of an investor;
a statement of exemption from restrictions or regulations.

13. The method of claim 11, wherein the tracking element comprises a barcode.

14. The method of claim 11, wherein said saving step stores the executed tax certification certificate in an electronic library together with the tracking element and metadata about the executed tax certification certificate.

15. The method of claim 11, further comprising collecting and organizing a letter in a library system, the collected and organized letter establishing an eligibility of an investor using said tracking element.

16. The method of claim 11, further comprising automatic matching of physical scans or faxes of said tax certification certificate to said kinformation stored in said database.

17. A system for controlling the provision of benefits to investors, comprising:
- a system processor;
- a library of electronically stored government certificates each containing a unique multi-function tracking element, the tracking element remaining with said government certificate and containing encoded information used to determine how said government certificates should be handled, said tracking element being adapted to:
  (i) allow the government certificate to be electronically transmitted for execution by an authorized entity comprising at least one of an investor, an authorized representative of the investor, and a custodian bank or a financial intermediary holding an investment or financial security on behalf of the investor, and to be received by the system after execution for electronic storage as an executed government certificate,
  (ii) automatically match the executed government certificate to data relating to a particular investor and a particular investment or financial security,
  (iii) save the encoded information with an electronic copy of said government certificate to associate the data relating to the particular investor and the particular investment or financial security to the electronic copy of the government certificate;
  (iv) remains associated with executed government certification purposes of collecting, organizing, and handling the executed government certificate; and
- wherein after the saving of the executed government certificate in the system, the executed government certificate, together with the data relating to the particular investor and the particular financial security, is visible to parties having authorized system access, the parties having authorized system access comprising at least a plurality of the investor, the authorized representative of the investor, the custodian bank or the financial intermediary, and a party responsible for issuing a benefit on the investment or payment on the financial security;
- said system processor being adapted to interrogate said library using said tracking elements to determine if the executed government certificate is present in the library for an investor seeking a benefit or payment requiring such a certificate;
- if the executed government certificate is located for the investor, said system processor commencing a confirmation process for approval of said benefit or said payment;
- said system processor allowing said benefit or said payment to be obtained by said investor if the required executed government certificate is present in the library and said approval is received; and
- said system processor denying said benefit or said payment to said investor if the required executed government certificate is not present in the library.

18. A system in accordance with claim 17, wherein said tracking element comprises a barcode provided on a coverpage associated with said certificate.

19. A system in accordance with claim 17, wherein said system processor is adapted to generate an application for a government certificate in the event no such certificate is already present in the library for said investor.

* * * * *

UNITED STATES PATENT AND TRADEMARK OFFICE
CERTIFICATE OF CORRECTION

PATENT NO. : 8,577,773 B2
APPLICATION NO. : 11/906732
DATED : November 5, 2013
INVENTOR(S) : Cappel et al.

It is certified that error appears in the above-identified patent and that said Letters Patent is hereby corrected as shown below:

In the Claims

Column 51, line 7: "certificate to said kinformation stored in said database." should read -- certificate to said information stored in said database. --

Signed and Sealed this
Tenth Day of December, 2013

Margaret A. Focarino
*Commissioner for Patents of the United States Patent and Trademark Office*